United States Patent
Imuta et al.

(10) Patent No.: US 6,583,237 B1
(45) Date of Patent: Jun. 24, 2003

(54) PROCESS FOR PRODUCING OLEFIN POLYMER AND OLEFIN POLYMERS

(75) Inventors: Jun-ichi Imuta, Sodegaura (JP); Tetsuhiro Matsumoto, Waki-cho (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/623,679

(22) PCT Filed: Jan. 21, 2000

(86) PCT No.: PCT/JP00/00301
§ 371 (c)(1),
(2), (4) Date: Sep. 7, 2000

(87) PCT Pub. No.: WO00/43426
PCT Pub. Date: Jul. 27, 2000

(30) Foreign Application Priority Data

Jan. 22, 1999 (JP) ............................................. 11-014621

(51) Int. Cl.⁷ ............................. C08F 2/38; C08F 4/44; B01J 31/38
(52) U.S. Cl. ........................ 526/89; 526/128; 526/129; 526/160; 526/161; 526/905; 526/943
(58) Field of Search ................................ 526/127, 161, 526/171, 89, 128, 160, 943, 905, 129; 502/152, 155

(56) References Cited

U.S. PATENT DOCUMENTS 5,525,690 A    6/1996  Chien et al. ................. 526/160
5,578,690 A  * 11/1996  Marks et al. ................ 526/347

FOREIGN PATENT DOCUMENTS

| EP | 389173 A | 9/1990 | |
| EP | 0-435250 A2 | 7/1991 | ......... C08F/210/02 |
| EP | 447959 A | 9/1991 | |
| EP | 578470 A | 1/1994 | |
| EP | 0-739910 A2 | 10/1996 | ........... C08F/10/02 |
| WO | WO 98/56835 | 12/1998 | ........... C08F/10/06 |

* cited by examiner

Primary Examiner—Robert D. Harlan
(74) Attorney, Agent, or Firm—Burns, Doane, Swecker & Mathis, LLP

(57) ABSTRACT

An olefin polymer production method is provided by which olefin polymers can be obtained at high polymerization activity under the conditions of reduced hydrogen concentration. Silyl-terminated olefin polymers may be obtained by this method. The olefin is polymerized using a catalyst of a transition metal compound (A) of Groups 3 to 10 of the periodic table, at least one compound (B) selected from organoaluminum oxycompounds (B-1), compounds (B-2) that react with the abovementioned compound (A) to form an ion pair, and organoaluminum compounds (B-3), under the coexistence of an organosilicon compound (C) or dialkylzinc compound (D) and in the presence or absence of hydrogen (E).

5 Claims, 2 Drawing Sheets

Fig. 1

Transition metal component

> Transition metal compound selected from groups 3 to 10 of the periodic table (with lanthanides and actinides being included in group 3)

Organometallic component

- Organoaluminum oxycompound
- Compound that reacts with the transition metal compound to from an ion pair
- Organoaluminum compound → Olefin Third component (Particulate carrier)

$R^1 R^2 R^3$ SiH
or
$Zn R^4 R^5$
(each of $R^1$ to $R^5$ is an alkyl group, etc.)

Hydrogen

Fig.2

Transition metal component

Compound, which is of a transition metal selected from among groups 3 to 10 of the periodic table (with lanthanides and actinides being included in group 3) and contains a ligand having a cyclopentadienyl skeleton (with the exception of such a compound having two indenyl groups that are bonded via ethylene)

Organometallic component

Organoaluminum oxycompound

Compound that reacts with the transition metal compound to from an ion pair

Organoaluminum compound

Olefin

Third component
( Particulate carrier )

$R^1 R^2 R^3 SiH$
or
$Zn R^4 R^5$
( each of $R^1$ to $R^5$ is an alkyl group, etc. )

US 6,583,237 B1

PROCESS FOR PRODUCING OLEFIN POLYMER AND OLEFIN POLYMERS

TECHNICAL FIELD

This invention concerns olefin polymer production methods and olefin polymers, and to be more detailed, concerns a process of producing olefin polymers by which olefin polymers can be obtained at high polymerization activity, a method of producing olefin polymers with a silyl group at the terminal, and silyl-terminated olefin polymers.

BACKGROUND ART

Known prior methods of producing ethylene homopolymers, ethylene.α-olefin copolymers, propylene homopolymers, propylene.α-olefin copolymers, and other olefin polymers include methods of polymerizing olefins under the presence of a titanium catalyst comprising an organoaluminum compound and a solid titanium catalyst component containing magnesium, a halogen, and an electron donor, or under the presence of a vanadium catalyst comprising a vanadium compound and an organoaluminum compound. Also is known a method of polymerizing an olefin under the presence of a metallocene catalyst comprising transition metal compound such as zirconocene and an orgnaoaluminum oxycompound (aluminoxane), and it is known that the use of a metallocene catalyst enables production of an oiefin polymer of high molecular weight at high activity and that the olefin polymer obtained has a narrow molecular weight distribution and a narrow composition distribution.

Though hydrogen is generally used to adjust the molecular weight in the production of an olefin polymer, if for example a polymer of low molecular weight is to be produced using the catalyst which is capable for giving high molecular weight such as the abovementioned metallocene catalyst, a large amount of hydrogen will have to be used. In this case, since the concentration of hydrogen in the polymerization system-will be high, significant lowering of the polymerization activity or undesirable rapid hydrogenation of a functional group may occur and thus favorable results may not be obtained. A chain transfer agent is thus desired with which the polymerization activity will not be lowered much in the production of an olefin polymer of low molecular weight using the catalyst which is capable for giving high molecular weight such as the metallocene catalyst.

With regard to chain transfer agents, the use of a dialkylzinc compound in the production of an ethylene copolymer under the presence of a titanium catalyst is. described in Japanese Laid-open Patent Publication No. 227604/1992, and the use of a silane compound in the production of an ethylene (co)polymer under the presence of a metallocene catalyst is described in Japanese Laid-open Patent Publication No. 95514/1997. Of the above, with the method of using a silane compound, the metallocene compound to be used is limited to being a metallocene compound having a (substituted) cyclopentadienyl group, and any effects attained by coexistence of hydrogen are not described in the corresponding publication.

Upon carrying out examinations in view of such prior arts, the present inventors have found that by using an organosilicon compound or a dialkylzinc compound in combination with hydrogen in the (co)polymerization of an olefin under the presence of a transition metal compound, an olefin polymer of low molecular weight or an olefin polymer with a silyl group at the terminal can be produced at high polymerization activity. The present inventors have also found that by using an organosilicon compound or a dialkylzinc compound in the (co)polymerization of an olefin under the presence of a specific transition metal compound containing a ligand having a cyclopentadienyl skeleton, an olefin polymer of low molecular weight or an olefin polymer with a silyl group at the terminal can be produced at high polymerization activity, and have thus come to complete the present invention.

OBJECT OF THE INVENTION

An object of this invention is to provide a process for producing an olefin polymer by which olefin polymers can be obtained at high polymerization activity, a process for producing an olefin polymer by which olefin polymers having a silyl group at the terminal can be obtained at high polymerization activity, and silyl-terminated olefin polymers.

DISCLOSURE OF THE INVENTION

A process for producing an olefin polymer according to the present invention is characterized in-that olefin polymerization or copolymerization is carried out under the presence of:

a catalyst comprising
(A) a compound of a transition metal selected from among groups 3 to 10 of the periodic table (with lanthanides and actinides being included in group 3) and
(B) at least one compound selected from among
 (B-1) organoaluminum oxycompounds,
 (B-2) compounds that react with the abovementioned compound (A) to form an ion pair, and
 (B-3) organoaluminum compounds and under the coexistence of
(C) an organosilicon compound respresented by the general formula (I) given below, or (D) a dialkylzinc compound represented by the general formula (II) given below, $$R^1R^2R^3SiH \qquad (I)$$

(In the above formula, $R^1$, $R^2$, and $R^3$ may be the same or may differ from each other, with each indicating a hydrogen atom, an alkyl group of 1 to 4 carbon atoms, an aryl group of 6 to 12 carbon atoms, an alkylaryl group of 7 to 20 carbon atoms, an arylalkyl group of 7 to 20 carbon atoms, an alkoxy group of 1 to 4 carbon atoms, a phenoxy group, a fluoroalkyl group of 3 to 6 carbon atoms, a dialkylamino group containing alkyl groups of 1 to 4 carbon atoms, or a diorganopolysiloxane chain containing 1 to 10 siloxane units.)

$$ZnR^4R^5 \qquad (II)$$

(In the above formula, $R^4$ and $R^5$ may be the same or may differ from each other, with each indicating an alkyl group of 1 to 20 carbon atoms.) and
(E) hydrogen.

In the present invention, preferably the abovementioned compound (A) is a transition metal compound (A-1) of a transition metal selected from among groups 3 to 10 of the periodic table (with lanthanides and actinides being included in group 3) containing a ligand having a cyclopentadienyl skeleton, more preferably the abovementioned compound (A) is a compound (A-2) of a transition metal selected from among group 4 of the periodic table containing a ligand having a cyclopentadienyl skeleton, and even more preferably, the abovementioned compound
(A) is a compound (A-3) represented by the following general formula (IV) or (V).

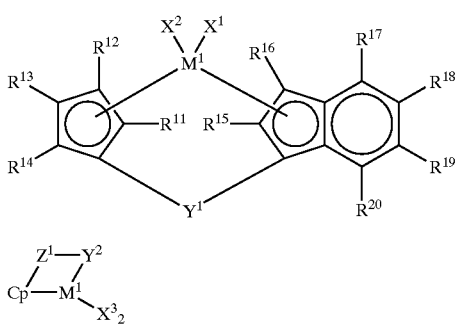

(IV)

(V)

(In the formula (IV), $M^1$ indicates an atom of a transition metal selected from among group 4 of the periodic table, $R^{11}$ to $R^{20}$ may be the same or may differ from each other, with each indicating a hydrocarbon group of 1 to 40 carbon atoms, a halogenated hydrocarbon group of 1 to 40 carbon atoms, an oxygen-containing group, a sulfur-containing group, a silicon-containing group, a halogen atom, or a hydrogen atom, the adjacent two groups among $R^{11}$ to $R^{20}$ may be bonded mutually to form an aromatic group along with the carbon atoms bonded to each group, each of such an aromatic group may be substituted with a hydrocarbon group of 1 to 40 carbon atoms, a halogenated hydrocarbon group of 1 to 40 carbon atoms, an oxygen-containing group, a sulfur-containing group, a silicon-containing group, or a halogen atom, $X^1$ and $X^2$ may be the same or may differ from each other, with each indicating a hydrocarbon group of 1 to 20 carbon atoms, a halogenated hydrocarbon group of 1 to 20 carbon atoms, an oxygen-containing group, a sulfur-containing group, a silicon-containing group, a hydrogen atom, or a halogen atom, and $Y^1$ indicates a bivalent hydrocarbon group of 1 to 20 carbon atoms, a bivalent halogenated hydrocarbon group of 1 to 20 carbon atoms, a bivalent silicon-containing group, a bivalent germanium-containing group, a bivalent tin-containing group, —O—, —CO—, —S—, —SO—, $SO_2$—, —Ge—, —Sn—, —$NR^{21}$—, —$P(R^{21})$—, —$P(O)(R^{21})$—, —$BR^{21}$—, or —$AlR^{21}$— (where the $R^{21}$'s may be the same or may differ from each other, with each indicating a hydrocarbon group of 1 to 20 carbon atoms, a halogenated hydrocarbon group of 1 to 20 carbon atoms, a hydrogen atom, or a halogen atom).

In the formula (V), $M^1$ indicates a transition metal atom selected from among group 4 of the periodic table, Cp indicates a cyclopentadienyl group or derivative thereof, which is π-bonded to $M^1$, $Z^1$ indicates an oxygen atom, a sulfur atom, a boron atom or a ligand containing an atom of group 14 of the periodic table, Y2 is a ligand containing an atom selected from among the nitrogen atom, phosphorus atom, oxygen atom and sulfur atom, and the $X^3$'s, may be the same or may differ from each other, with each indicating a hydrogen atom, a halogen atom, a hydrocarbon group of 1 to 20 carbon atoms and may have one or two or more or double bonds, a silyl group containing 20 or less silicon atoms, or a germyl group containing a germanium atom.).

Another process for producing an olefin polymerization according to the present invention is characterized in that an olefin of 3 or more carbon atoms is polymerized or two or more olefins are copolymerized under the presence of a catalyst comprising an abovementioned transition metal compound (A), at least one compound (B) selected from among organoaluminum oxycompounds (B-1), compounds (B-2) that react with the abovementioned compound (A) to form an ion pair, and organoaluminum compounds (B-3), and under the coexistence of an abovementioned organo-silicon compound (C) and hydrogen (E) to produce a silyl-terminated olefin polymer, wherein the terminal of which is a residual group of the organosilicon compound (C) represented by the general formula (I) given above and which has an isotactic index of 95 of more.

Still another process for producing an olefin polymer according to the present invention is characterized in that olefin polymerization or copolymerization is carried out under presence of a catalyst comprising (A-i) a transition metal compound of a transition metal selected from among groups 3 to 10 of the periodic table (with lanthanides and actinides being included in group 3) containing a ligand having a cyclopentadienyl skeleton (with the exception of such a compound having two indenyl groups that are bonded via ethylene), and (B) at least one compound selected from among
    (B-1) organoaluminum oxycompounds,
    (B-2) compounds that react with the abovementioned compound (A-i) to form an ion pair, and
    (B-3) organoaluminum compounds and under the coexistence of (C) an organosilicon compound represented by the general formula (I) given below, or (D) a dialkylzinc compound represented by the general formula (II) given below, $R^1R^2R^3SiH$ (I)

(In the above formula, $R^1$, $R^2$, and $R^3$ may be the same or may differ from each other, with each indicating a hydrogen atom, an alkyl group of 1 to 4 carbon atoms, an aryl group of 6 to 12 carbon atoms, an alkylaryl group of 7 to 20 carbon atoms, an arylalkyl group of 7 to 20 carbon atoms, an alkoxy group of 1 to 4 carbon atoms, a phenoxy group, a fluoroalkyl group of 3 to 6 carbon atoms, a dialkylamino group containing alkyl groups of 1 to 4 carbon atoms, or a diorganopolysiloxane chain containing 1 to 10 siloxane units.)

$ZnR^4R^5$ (II)

(In the above formula, $R^4$ and $R^5$ may be the same or may differ from each other, with each indicating an alkyl group of 1 to 20 carbon atoms.) and under the non-presence of hydrogen.

In the present invention, preferably the abovementioned compound (A-i) is a transition metal compound (A-ii) of a transition metal selected from among group 4 of the periodic table containing a ligand having a cyclopentadienyl skeleton (with the exception of such a compound having two indenyl groups that are bonded via ethylene), and more preferably, the abovementioned compound (A-i) is a compound (A-iii) represented by the following general formula (IV) (with the exception of such a compound having two indenyl groups that are bonded via ethylene)

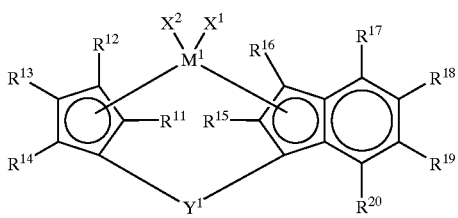

(IV)

(In the above formula, $M^1$ indicates an atom of a transition metal selected from among group 4 of the periodic table, $R^{11}$ to $R^{20}$ may be the same or may differ from each other, with each indicating a hydrocarbon group of 1 to 40 carbon atoms, a halogenated hydrocarbon group of 1 to 40 carbon atoms, an oxygen-containing group, a sulfur-containing group, a silicon-containing group, a halogen atom, or a hydrogen atom, the adjacent two groups among $R^{11}$ to $R^{20}$ may be bonded mutually to form an aromatic group along with the carbon atoms bonded to each group, each of such an aromatic group may be substituted with a hydrocarbon group of 1 to 40 carbon atoms, a halogenated hydrocarbon group of 1 to 40 carbon atoms, an oxygen-containing group, a sulfur-containing group, a silicon-containing group, or a halogen atom, $X^1$ and $X^2$ may be the same or may differ from each other, with each indicating a hydrocarbon group of 1 to 20 carbon atoms, a halogenated hydrocarbon group of 1 to 20 carbon atoms, an oxygen-containing group, a sulfur-containing group, a silicon-containing group, a hydrogen atom, or a halogen atom, and $Y^1$ indicates a bivalent hydrocarbon group of 1 to 20 carbon atoms, a bivalent halogenated hydrocarbon group of 1 to 20 carbon atoms, a bivalent silicon-containing group, a bivalent germanium-containing group, a bivalent tin-containing group, —O—, —CO—, —S—, —SO—, $S_2$—, —Ge—, —Sn—, —$NR^{21}$—, —$P(R^{21})$—, —$P(O)(R^{21})$—, —$BR^{21}$—, or —$AlR^{21}$— (where the $R^{21}$'s may be the same or may differ from each other, with each indicating a hydrocarbon group of 1 to 20 carbon atoms, a halogenated hydrocarbon group of 1 to 20 carbon atoms, a hydrogen atom, or a halogen atom).)

Yet another process for producing an olefin polymer according to the present invention is characterized in that an olefin of 3 or more carbon atoms is polymerized or two or more olefins are copolymerized under the presence of a catalyst comprising an abovementioned transition metal compound (A-i), at least one compound (B), selected from among organoaluminum oxycompounds (B1), compounds (B-2) that react with the abovementioned compound (A-i) to form an ion pair, and organoaluminum compounds (B-3), under the coexistence of an abovementioned organosilicon compound (C), and under the non-presence of hydrogen (E) to produce a silyl-terminated olefin polymer, wherein the terminal of which is a residual group of the organosilicon compound (C) expressed by the general formula (I) given above and which has an isotactic index of 95 of more.

A silyl-terminated olefin polymer according to the invention is characterized in that the terminal is a residual group of an organosilicon compound (C) represented by the general formula (I) given above and in having an isotactic index of 95 or more.

Such a silyl-terminated olefin may for example be produced by the process for producing the olefin polymer such as those described above.

BRIEF DESCRIPTION OF THE DRAWINGS

FIG. 1 is an explanatory diagram, which illustrates the preparation process of an olefin polymerization catalyst to be used in an olefin polymer production method of an embodiment of this invention.

FIG. 2 is an explanatory diagram, which illustrates the preparation process of an olefin polymerization catalyst to be used in an olefin polymer production method of another embodiment of this invention.

PREFERRED EMBODIMENTS OF THE INVENTION

The olefin polymer production methods and olefin polymers according to the present invention shall now be described more specifically.

In this specification, the term "polymerization" may refer not only to homopolymerization but to copolymerization inclusively as well, and the term "polymer" may refer not only to homopolymers but to copolymers inclusively as well.

With an olefin polymer production by this invention, olefin polymerization or copolymerization is carried out under the presence of:
a catalyst comprising
(A) a compound of a transition metal selected from among groups 3 to 10 of the periodic table (with lanthanides and actinides being included in group 3) and
(B) at least one compound selected from among
(B-1) organoaluminum oxycompounds,
(B-2) compounds that react with the abovementioned compound (A) to form an ion pair, and
(B-3) organoaluminum compounds and under the coexistence of
(C) an organosilicon compound represented by the general formula (I) given below, or (D) a dialkylzinc compound represented by the general formula (II) given below, and
(E) hydrogen.

The respective components used in this invention shall now be described first.

(A) Transition Metal Compound

The transition metal compound (A) to be used in the present invention is a compound of a transition metal selected from among groups 3 to 10 of the periodic table (with group 3 including the lanthanides and actinides).

Specific examples of a transition metal selected from among groups 3 to 10 of the periodic table (with group 3 including the lanthanides and actinides) include scandium, titanium, zirconium, hafnium, vanadium, niobium, tantalum, palladium, nickel, cobalt, rhodium, yttrium, chromium, molybdenum, tungsten, manganese, rhenium, iron, ruthenium, etc., and the transition metal is preferably scandium, titanium, zirconium, hafnium, vanadium, niobium, tantalum, palladium, nickel, cobalt, rhodium, etc., more preferably titanium, zirconium, hafnium, cobalt, rhodium, etc., and especially preferably titanium, zirconium, or hafnium.

Examples of such a transition metal compound (A) include transition metal compounds, which have been used conventionally as catalysts in olefin polymerization, and such transition metal compounds include titanium compounds, such as $TiCl_3$, $TiCl_4$, compounds derived therefrom and complexes containing these metallocene compounds, transition metal imine compounds, transition metal imide compounds, transition metal amide compounds, transition metal diphenoxy compounds, transition metal compounds having a salicylarydimine ligand, transition metal compounds proposed in J. Am. Chem. Soc. 1995, 117, 6414–6415, etc.

Transition metal compound (A) may for example be a transition metal compound in which a metal is bonded with the N, O, or S atom of a ligand, and in this case, the bond may be a covalent bond or a coordinate bond or a covalent bond and a coordinate bond may coexist. The aforementioned coexistence of a covalent bond and a coordinate bond refers for example to the bondings of metal with the N of imine and metal with an amide; the bondings of metal with the N of imine and metal with an oxygen anion; and bondings of metal with oxygen atom and metal with an amide. Specific examples of such a transition metal compound include compounds expressed by the general formula (IX) or (X) given below.

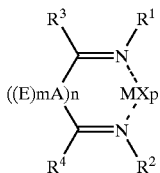

(IX)

In the above formula, M indicates a transition metal atom of any of groups 3 to 10 of the periodic table and is preferably titanium, zirconium, hafnium, vanadium, niobium, tantalum, chromium, iron, cobalt, nickel, ruthenium, rhodium, or palladium and especially preferably iron, cobalt, nickel, ruthenium, rhodium, or palladium.

$R^1$ to $R^4$ may be the same or may differ from each other, with each indicating a hydrogen atom, halogen atom, hydrocarbon group (with the exception that each of $R^1$ and $R^2$ be not a hydrocarbon group having a phenyl skeleton in which hydrogen occupies the ortho position with respect to N), halogenated hydrocarbon group (with the exception that each of $R^1$ and $R^2$ be not a halogenated hydrocarbon group having a phenyl skeleton in which hydrogen occupies the ortho position with respect to N), organosilyl group, alkoxy group, aryloxy group, ester group, acyl group, amide group, amino group, sulfonamide group, sulfonyl group, nitrile group, or nitro group.

Examples of halogen atoms include fluorine, chlorine, bromine and iodine. Specific examples of hydrocarbon groups include linear and branched alkyl groups of 1 to 20 carbon atoms, such as the methyl, ethyl, n-propyl, isopropyl, n-butyl, isobutyl, sec-butyl, tert-butyl, pentyl and hexyl groups; aryl groups of 6 to 20 carbon atoms (with the exception that each of $R^1$ and $R^2$ be not an aryl group in which hydrogen occupies the ortho position with respect to N), such as the phenyl, naphthyl and anthryl groups; substituted aryl groups with which an aforementioned aryl group has 1 to 5 substituting groups, such as the abovementioned halogen atoms, abovementioned alkyl groups of 1 to 20 carbon atoms, abovementioned aryl groups of 6 to 20 carbon atoms, the below-mentioned halogenated hydrocarbon groups, organosilyl groups, alkoxy groups, aryloxy groups, ester groups, acyl groups, amide groups, amino groups, sulfonamide groups, sulfonyl groups, nitrile groups, nitro groups, etc., (with the exception that each of $R^1$ and $R^2$ be not an aryl group in which hydrogen occupies the ortho position with respect to N); cycloalkyl groups, such as the cyclopentyl, cyclohexyl, norbornyl and adamantyl groups; alkenyl groups, such as the vinyl, propenyl and cyclohexenyl groups; and arylalkyl groups, such as the benzyl, phenylethyl and phenylpropyl groups.

Examples of halogenated hydrocarbon groups include groups with which a halogen is substituted to an abovementioned hydrocarbon group, the pentafluorophenyl group, etc.

Specific examples of organosilyl groups include the methylsilyl, dimethylsilyl, trimethylsilyl, ethylsilyl, diethylsilyl, triethylsilyl, phenylsilyl, dipheynylsilyl, triphenylsilyl, dimethylphenylsilyl and methyldiphenylsilyl groups.

Specific examples of alkoxy groups include the methoxy, ethoxy, n-propoxy, isopropoxy, n-butoxy, isobutoxy and tert-butoxy groups. Specific examples of aryloxy groups include the phenoxy, 2,6-dimethylphenoxy and 2,4,6-trimethylphenoxy groups.

Specific examples of ester groups include the acetyloxy, benzoyloxy, methoxycarbonyl, phenoxycarbbnyl and p-chlorophenoxycarbonyl groups. Specific examples of acyl groups include the formyl, acetyl, propionyl, butyryl, valeryl, palmitoyl, stearoyl, oleoyl, benzoyl, toloyl, salicyloyl, cinnamoyl, naphthoyl and furoyl groups.

Specific examples of amide groups include the acetamide, N-methylacetamide and N-methylbenzamide groups. Specific examples of amino groups include the dimethylamino, ethylmethylamino and diphenylamino groups.

Specific examples of sulfonamide groups include the phenylsulfonamide, N-methylphenylsulfonamide and N-methyl-p-toluenesulfonamide groups. Specific examples of sulfonyl groups include the mesyl, ethanesulfonyl, methoxysulfonyl, benzenesulfonyl, and tosyl groups.

Of the above, each of $R^1$ and $R^2$ is preferably a hydrocarbon group (with the exception of a hydrocarbon group that has a phenyl skeleton with a hydrogen at the ortho position with respect to N) or an organosilyl group. Also, each of $R^3$ and $R^4$ is preferably a hydrogen atom, a hydrocarbon group or an organosilyl group. Two or more groups and preferably adjacent groups among the groups indicated by $R^1$ to $R^4$ may be linked together to form an aromatic ring, aliphatic ring or other ring along with the carbon atoms bonded to each group.

m is an integer from 0 to 2. n is an integer from 0 to 3.

A indicates an atom of any of groups 13 to 16 of the periodic table, with specific examples including the boron atom, carbon atom, nitrogen atom, oxygen atom, silicon atom, phosphorus atom, sulfur atom, germanium atom, selenium atom, tin atom, etc., and is preferably the carbon atom, nitrogen atom or silicon atom. If A is the atom having an unshared electron pair such as the nitrogen atom, oxygen atom, phosphorus atom or sulfur atom, A may be coordinataed to M. If n is 2 or more, the plurality of A's may be the same or may differ from each other.

E is a substituent group having at least one atom selected from among carbon, hydrogen, oxygen, halogens, nitrogen, sulfur, phosphorus, boron and silicon. If there exists a plurality of groups indicated by E, each of the plurality of groups indicated by E may be the same or may differ from each other, and two or more groups indicated by E may be linked together to form a ring.

Specific examples of a bonding group indicated by —(($E_m$)A)$_n$—, that bind two nitrogen atoms include —CH$_2$—, —C(Me)$_2$—, —C(Ph)$_2$—, —Si(Me)$_2$—, —Si(Ph)$_2$—, —Si(Me)(Ph)—, —CH$_2$CH$_2$—, —CH$_2$Si(Me)$_2$—, —CH$_2$CH$_2$CH$_2$—, —CH$_2$C(Me)$_2$CH$_2$—, —CH$_2$C(Et)$_2$CH$_2$—, —CH$_2$C(nPr)$_2$CH$_2$—, —CH$_2$C(iPr)$_2$CH$_2$—, —CH$_2$C(nBu)$_2$CH$_2$—, —CH$_2$C(iBu)$_2$CH$_2$—, —CH$_2$C(sBu)$_2$CH$_2$—, —CH$_2$C(cPen)$_2$CH$_2$—, —CH$_2$C(cHex)$_2$CH$_2$—, —CH$_2$C(Ph)$_2$CH$_2$—, —CH$_2$C(Me)(Et)CH$_2$—, —CH$_2$C(Me)(iPr)CH$_2$—, —CH$_2$C(Me)(iBu)CH$_2$—, —CH$_2$C(Me)(tBu)CH$_2$—, —CH$_2$C(Me)(iPen)CH$_2$—, —CH$_2$C(Me)(Ph)CH$_2$—, —CH$_2$C(Et)(iPr)CH$_2$—, —CH$_2$C(Et)(iBu)CH$_2$—, —CH$_2$C(Et)(iPen)CH$_2$—, —CH$_2$C(iPr)(iBu)CH$_2$—, —CH$_2$C(iPr)(iPen)CH$_2$—, —CH$_2$Si(Me)$_2$CH$_2$—, —CH$_2$Si(Et)$_2$CH$_2$—, —CH$_2$Si(nBu)$_2$CH$_2$—, —CH$_2$Si(Ph)$_2$CH$_2$—, —CH(Me)CH$_2$CH(Me)—, —CH(Ph)CH$_2$CH(Ph)—, —Si(Me)$_2$OSi(Me)$_2$—, and the like.

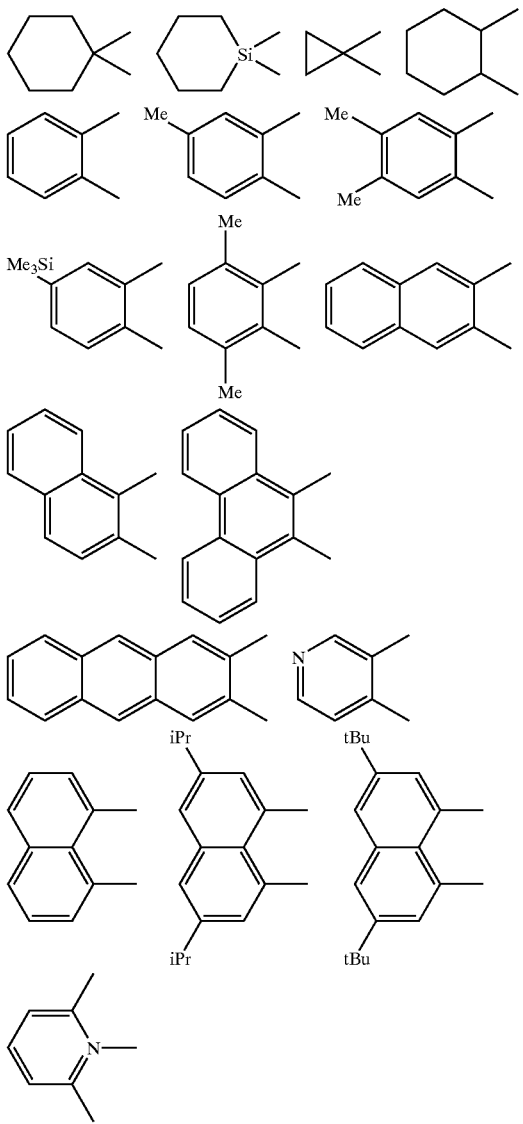

In the examples given above, Me indicates the methyl group, Et indicates the ethyl group, nPr indicates the n-propyl group, iPr indicates the isopropyl group, nBu indicates the n-butyl group, iBu indicates the isobutyl group, sBu indicates the sec-butyl group, t-Bu indicates the tert-butyl group, iPen indicates the isopentyl group, cPen indicates the cyclopentyl group, cHex indicates the cyclohexyl group, and Ph indicates the phenyl group.

p is a number that satisfies the valence of M and is an integer from 0 to 7. X indicates a hydrogen atom, halogen atom, hydrocarbon group of 1 to 20 carbon atoms, halogenated hydrocarbon group of 1 to 20 carbon atoms, oxygen-containing group, sulfur-containing group or silicon containing group. If p is 2 or more, the plurality of groups indicated by X may be the same or may differ from each other.

Examples of halogen atoms include fluorine, chlorine, bromine and iodine. Examples of hydrocarbon groups of 1 to 20 carbon atoms include alkyl groups, cycloalkyl groups, alkenyl groups, arylalkyl groups, aryl groups, etc., and to be more specific, include alkyl groups, such as the methyl, ethyl, propyl, butyl, hexyl, octyl, nonyl, dodecyl and icosyl groups; cycloalkyl groups, such as the cyclopentyl, cyclohexyl, norbornyl and adamantyl groups; alkenyl groups, such as the vinyl, propenyl and cyclohexenyl groups; arylalkyl groups, such as the benzyl, phenylethyl and phenylpropyl groups; and aryl groups, such as the phenyl, tolyl, dimethylphenyl, trimethylphenyl, ethylphenyl, propylphenyl, biphenyl, naphthyl, methylnapthyl, anthryl and phenanthryl groups.

Examples of halogenated hydrocarbon groups of 1 to 20 carbon atoms include groups with which a halogen or halogens is or are substituted to the abovementioned hydrocarbon group of 1 to 20 carbon atoms. Examples of oxygen-containing groups include the hydroxy group; alkoxy groups, such as the methoxy, ethoxy, propoxy, and butoxy groups; aryloxy groups, such as the phenoxy, methylphenoxy, dimethylphenoxy and napthoxy groups; and arylalkoxy groups, such as the phenylmethoxy and phenylethoxy groups.

Examples of sulfur-containing groups include substituent groups with which the oxygen in an abovementioned oxygen-containing group has been replaced by sulfur and also include sulfonate groups, such as the methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, and pentafluorobenzenesulfonate groups; and sulfinate groups, such as the methylsulfinate, phenylsulfinate, benzylsulfinate, p-toluenesulfinate, trimethylbenzenesulfinate, and pentafluorobenzenesulfinate groups.

Examples of silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as the trimethylsilylmethyl group; and silicon-substituted aryl groups, such as the trimethylsilylphenyl group.

Of the above, halogen atoms, hydrocarbon atoms of 1 to 20 carbon atoms, and sulfonate groups are preferable. Also, if p is 2 or more, two or more of the X's may be linked together to form a ring. Though specific examples of transition metal compounds represented by the above general formula (IX) are given below, such transition metal compounds are not limited to these examples.

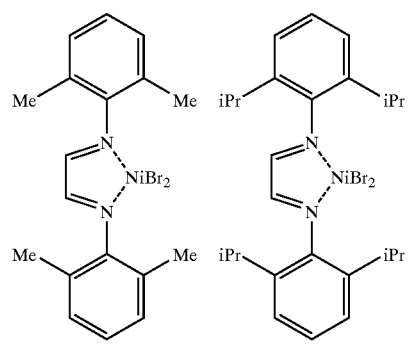

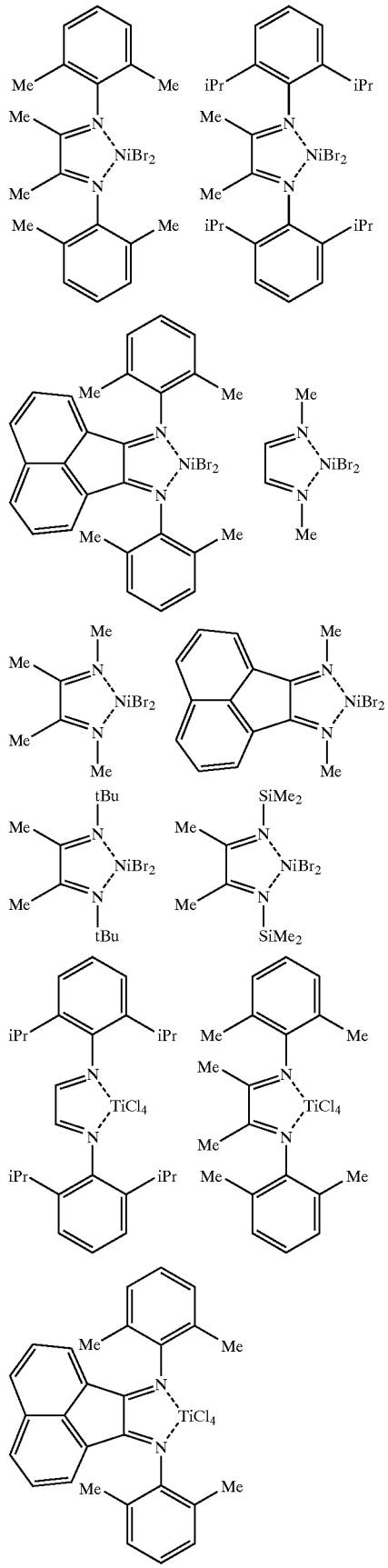
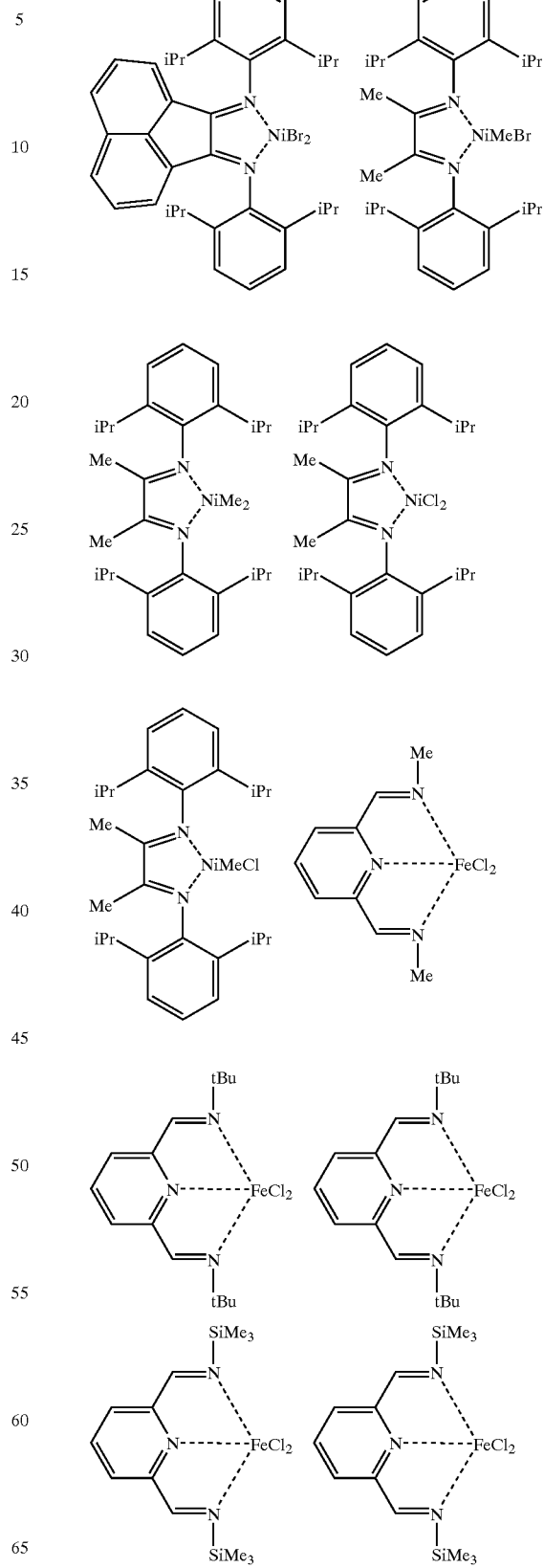

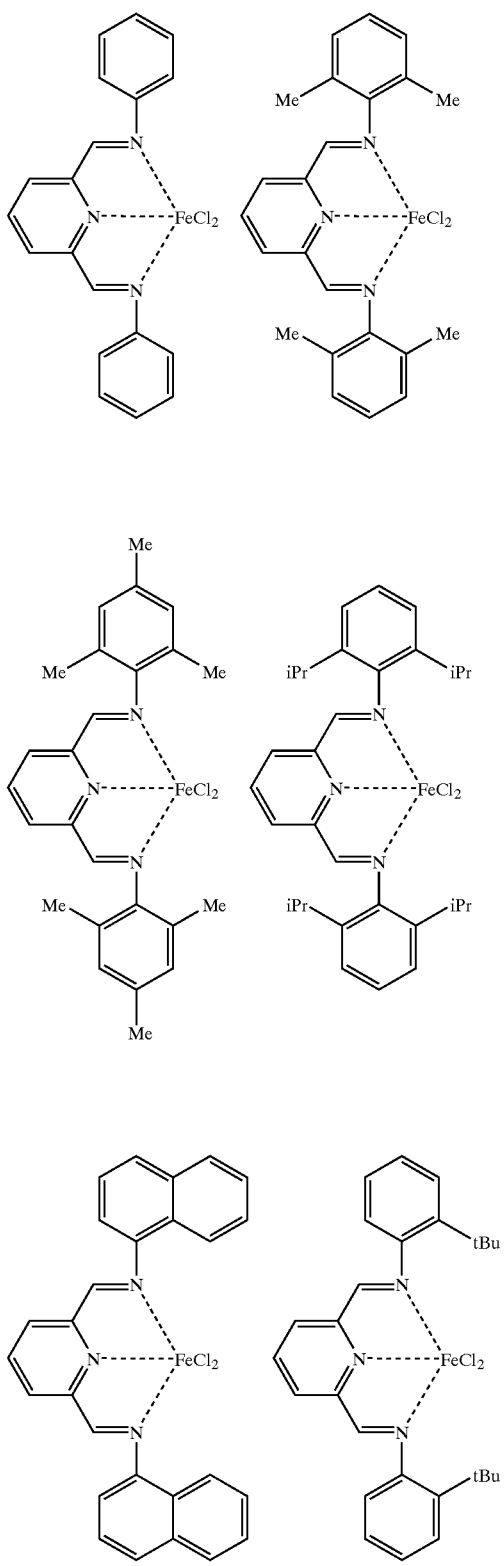
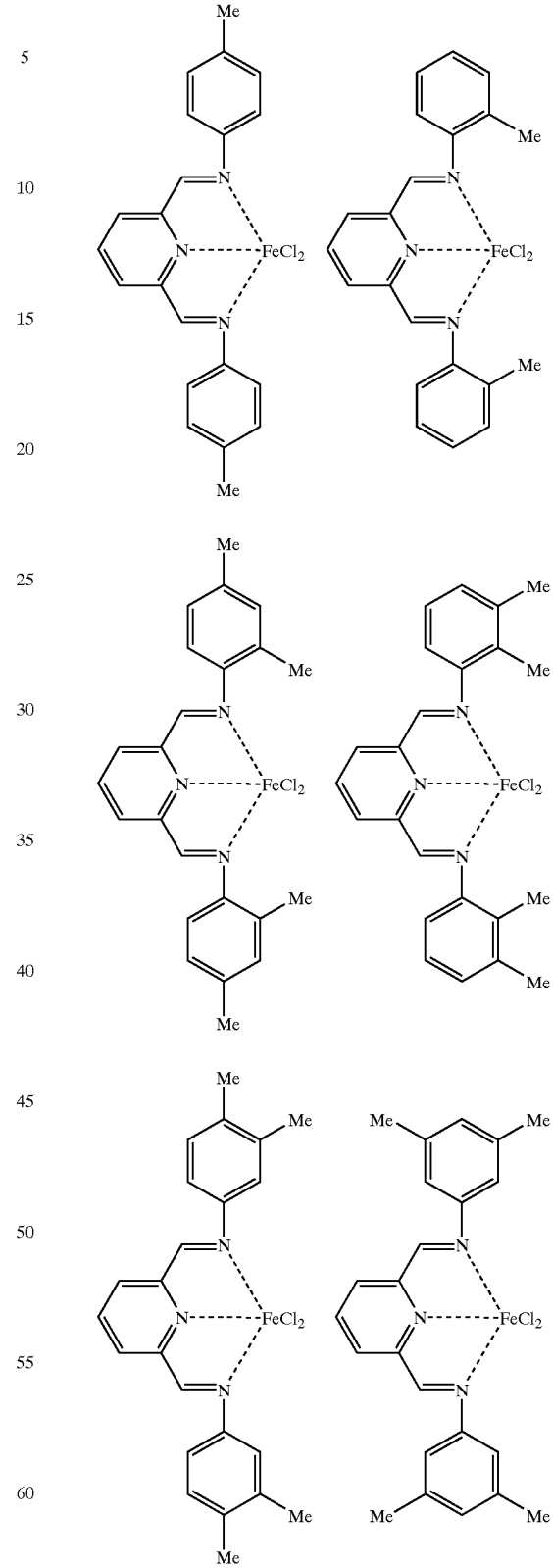

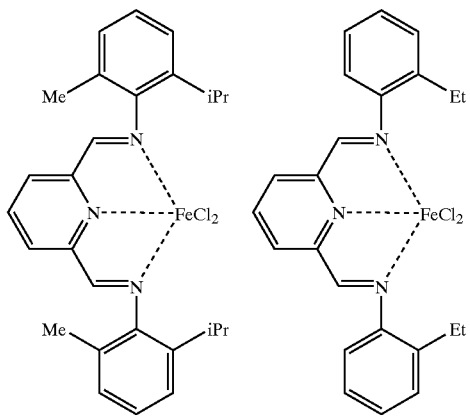
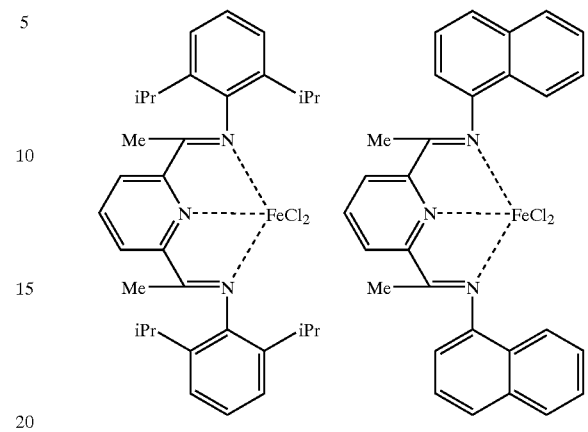
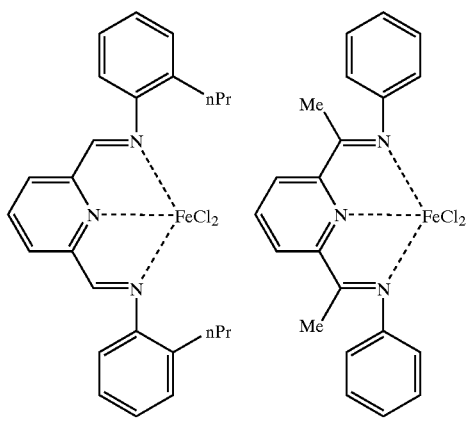
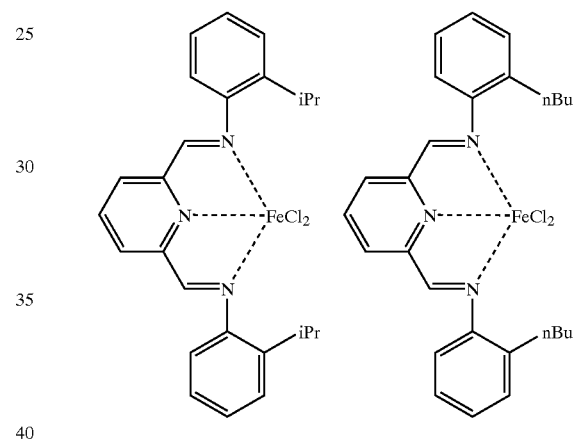
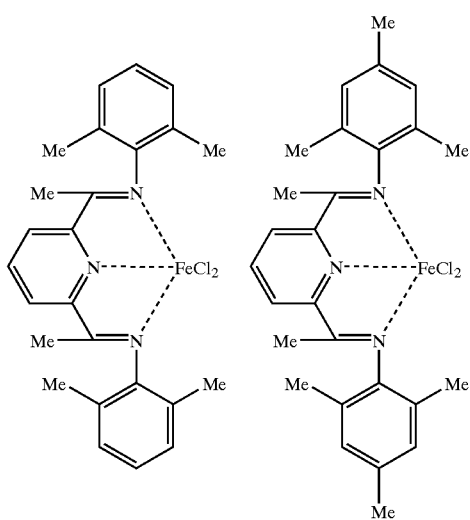
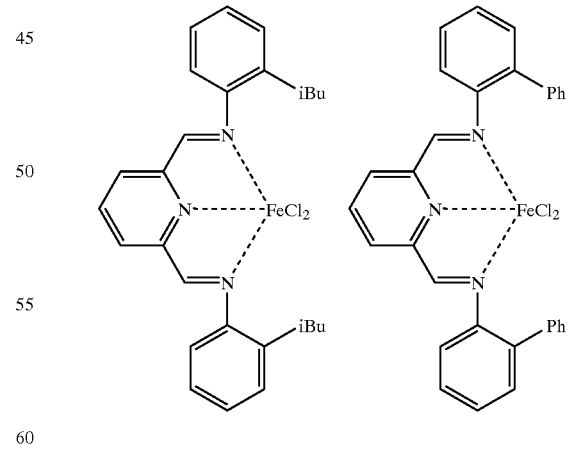

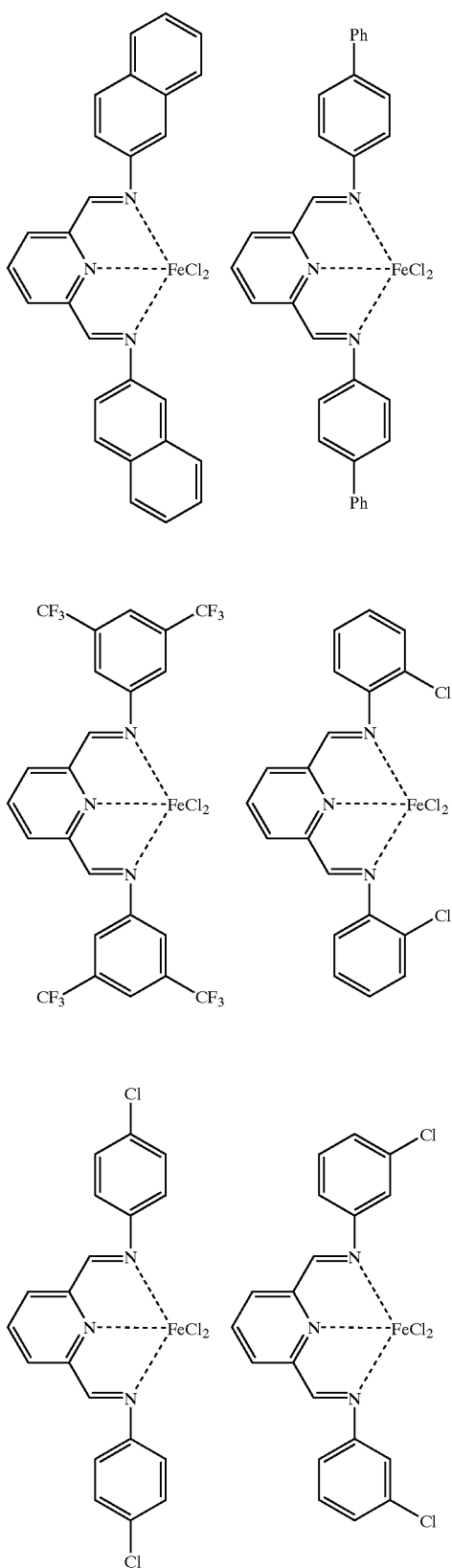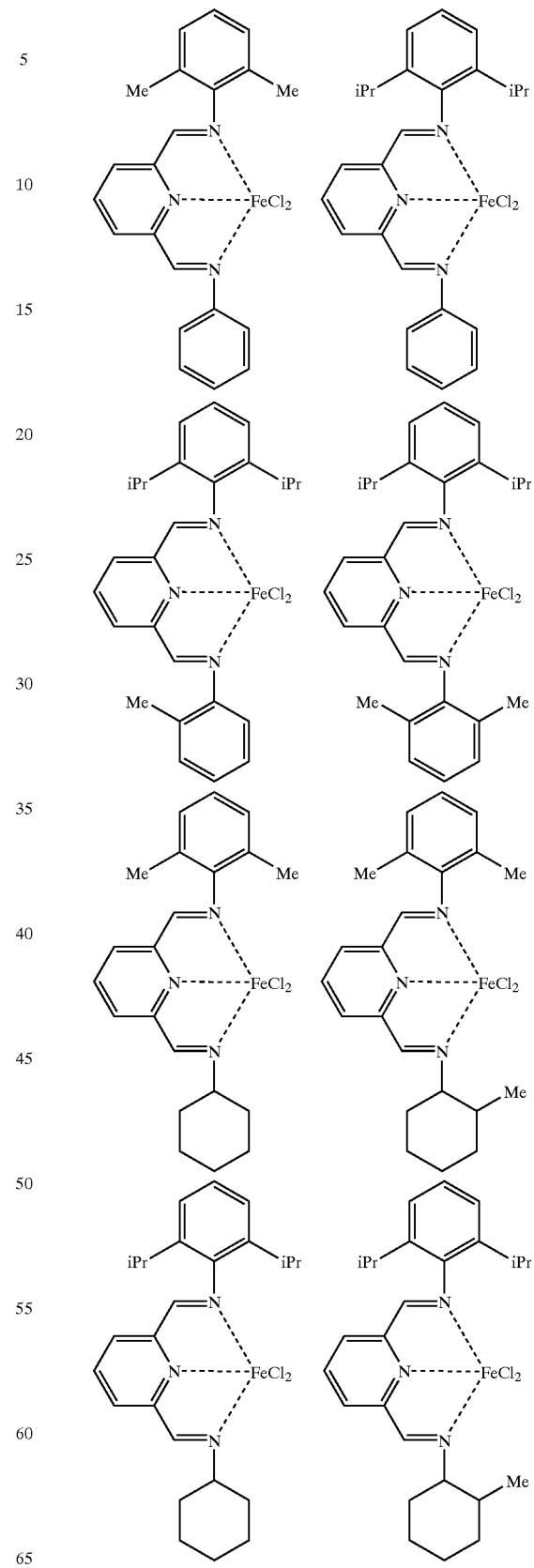

-continued

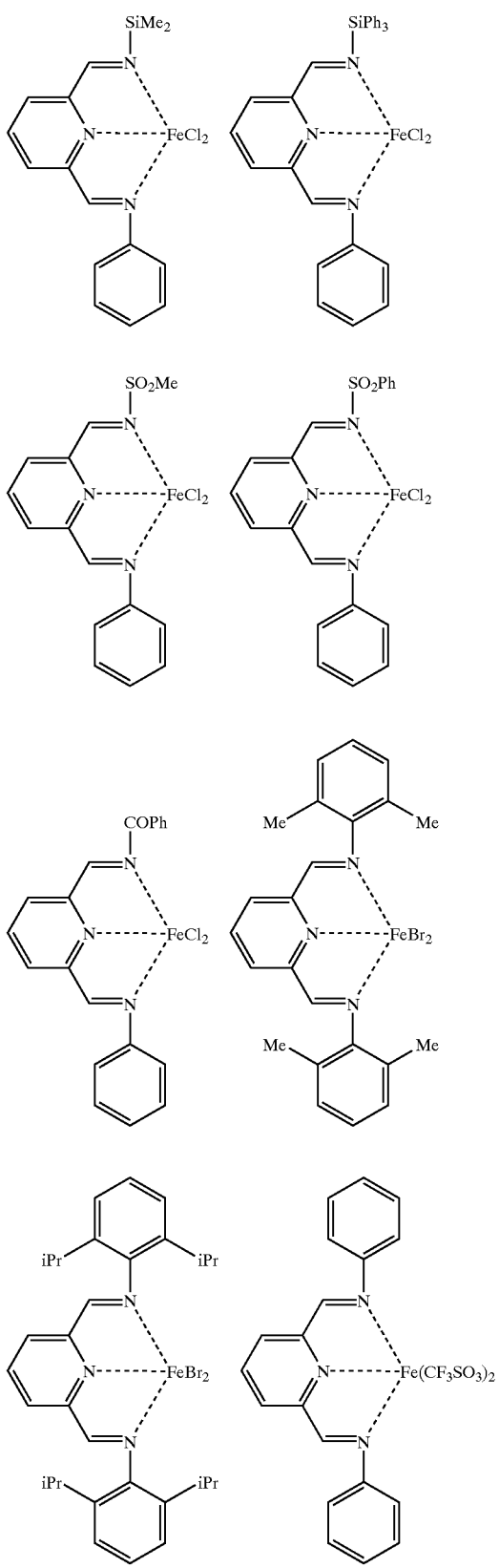

-continued

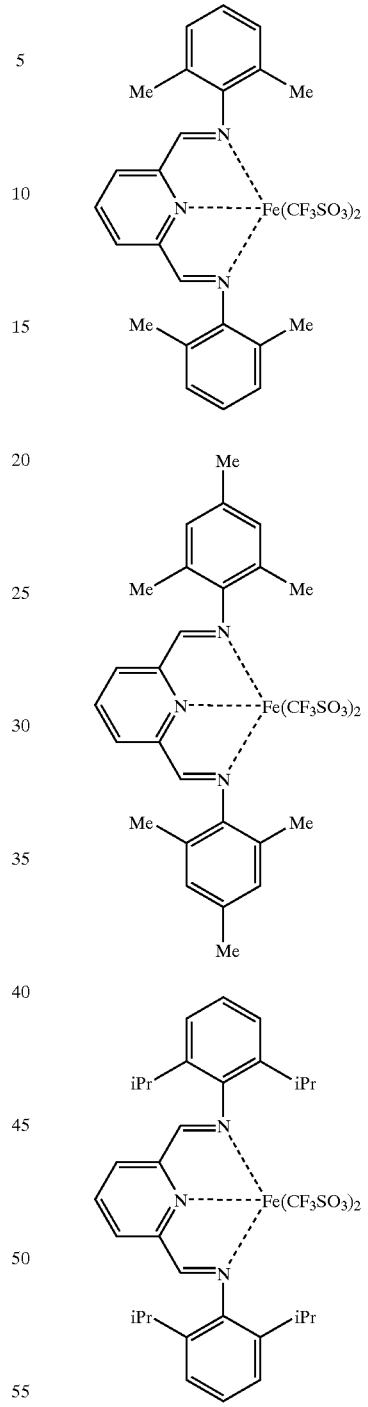

In the examples given above, Me indicates the methyl group, Et indicates the ethyl group, nPr indicates the n-propyl group, iPr indicates the isopropyl group, nBu indicates the n-butyl group, iBu indicates the isobutyl group, t-Bu indicates the tert-butyl group, and Ph indicates the phenyl group. In the present invention, a transition metal compound with which the titanium in an abovementioned compound has been replaced by zirconium or hafnium, a transition metal compound with which the nickel in an abovementioned compound has been replaced by palladium, or a transition metal compound with which the iron in an abovementioned compound has been replaced by cobalt, ruthenium, or rhodium may also be used. Such a compound may be used alone or in combination of two or more.

Transition metal compounds represented by the general formula (X) shall now be described.

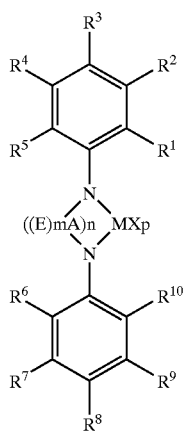

(X)

In the above formula, M indicates a transition metal atom of any of groups 3 to 6 of the periodic table and is preferably a transition metal atom of group 4 of the periodic table, such as titanium, zirconium or hafnium.

$R^1$ to $R^{10}$ may be the same or may differ from each other, with each indicating a hydrogen atom, halogen atom, hydrocarbon group, halogenated hydrocarbon group, organosilyl group, alkoxy group, aryloxy group, ester group, acyl group, amide group, amino group, sulfonamide group, sulfonyl group, nitrile group or nitro group. However, at least one of $R^1$ to $R^5$ is a group besides the hydrogen atom, and at least one of $R^6$ to $R^{10}$ is a group besides the hydrogen atom.

Examples of halogen atoms include fluorine, chlorine, bromine and iodine. Specific examples of hydrocarbon groups include linear or branched alkyl groups of 1 to 20 carbon atoms, such as the methyl, ethyl, n-propyl, isopropyl, n-butyl, isobutyl, sec-butyl, tert-butyl, pentyl and hexyl groups; aryl groups of 6 to 20 carbon atoms, such as the phenyl, naphthyl and anthryl groups; substituted aryl groups, with which an aforementioned aryl group has 1 to 5 substituent groups, such as the abovementioned halogen atoms, abovementioned alkyl groups of 1 to 20 carbon atoms, abovementioned aryl groups of 6 to 20 carbon atoms, the below-mentioned halogenated hydrocarbon groups, organosilyl groups, alkoxy groups, aryloxy groups, ester groups, acyl groups, amide groups, amino groups, sulfonamide groups, sulfonyl groups, nitrile groups, nitro groups, etc.; cycloalkyl groups, such as the cyclopentyl, cyclohexyl, norbornyl and adamantyl groups; alkenyl groups, such as the vinyl, propenyl, and cyclohexenyl groups; and arylalkyl groups, such as the benzyl, phenylethyl and phenylpropyl groups.

Examples of halogenated hydrocarbon groups include groups with which a halogen is substituted to the abovementioned hydrocarbon group. Specific examples of organosilyl groups include the methylsilyl, dimethylsilyl, trimethylsilyl, ethylsilyl, diethylsilyl, triethylsilyl, phenylsilyl, dipheynylsilyl, triphenylsilyl, dimethylphenylsilyl and methyldiphenylsilyl groups.

Specific examples of alkoxy groups include the methoxy, ethoxy, n-propoxy, isopropoxy, n-butoxy, isobutoxy and tert-butoxy groups. Specific examples of aryloxy groups include the phenoxy, 2,6-dimethylphenoxy, and 2,4,6-trimethylphenoxy groups.

Specific examples of ester groups include the acetyloxy, benzoyloxy, methoxycarbonyl, phenoxycarbonyl and p-chlorophenoxycarbonyl groups. Specific examples of acyl groups include the formyl, acetyl, propionyl, butyryl, valeryl, palmitoyl, stearoyl, oleoyl, benzoyl, toloyl, salicyloyl, cinnamoyl, naphthoyl and furoyl groups.

Specific examples of amide groups include the acetamide, N-methylacetamide and N-methylbenzamide groups. Specific examples of amino groups include the dimethylamino, ethylmethylamino and diphenylamino groups.

Specific examples of sulfonamide groups include the phenylsulfonamide, N-methylphenylsulfonamide and N-methyl-p-toluenesulfonamide groups. Specific examples of sulfonyl groups include the mesyl, ethanesulfonyl, methoxysulfonyl, benzenesulfonyl and tosyl groups.

Also, two or more of the groups and preferably adjacent groups indicated by $R^1$ to $R^5$ may be linked together to form an aromatic ring, aliphatic ring, or an other ring along with the carbon atoms bonded to each group, and two or more of the groups and preferably adjacent groups indicated by $R^6$ to $R^{10}$ may be linked together to form an aromatic ring, aliphatic ring, or other ring along with the carbon atoms bonded to each group.

m is an integer from 0 to 2. n is an integer from 1 to 5. A indicates an atom of any of groups 13 to 16 of the periodic table, with specific examples including the boron atom, carbon atom, nitrogen atom, oxygen atom, silicon atom, phosphorus atom, sulfur atom, germanium atom, selenium atom, tin atom, etc., and is preferably the carbon atom, nitrogen atom, or silicon atom. If A is the atom having an unshared electron pair such as the nitrogen atom, oxygen atom, phosphorus atom or sulfur atom, A may be coordinated to M. If n is 2 or more, the plurality of A's may be the same or may differ from each other.

E is a substituent group having at least one atom selected from among carbon, hydrogen, oxygen, halogens, nitrogen, sulfur, phosphorus, boron and silicon. If there exists a plurality of groups indicated by E, each of the plurality of groups indicated by E may be the same or may differ from each other, and two or more groups indicated by E may be linked together to form a ring.

Specific examples of a bonding group, indicated by —(($E_m$)A)$_n$—, that bind two nitrogen atoms include —CH$_2$—, —C(Me)$_2$—, —C(Ph)$_2$—, —Si(Me)$_2$—, —Si(Ph)$_2$—, —Si(Me)(Ph)—, —CH$_2$CH$_2$—, —CH$_2$Si(Me)$_2$—, —CH$_2$CH$_2$CH$_2$—, —CH$_2$C(Me)$_2$CH$_2$—, —CH$_2$C(Et)$_2$CH$_2$—, —CH$_2$C(nPr)$_2$CH$_2$—, —CH$_2$C(iPr)$_2$CH$_2$—, —CH$_2$C(nBu)$_2$CH$_2$—, —CH$_2$C(iBu)$_2$CH$_2$—, —CH$_2$C(sBu)$_2$CH$_2$—, —CH$_2$C(cPen)$_2$CH$_2$—, —CH$_2$C(cHex)$_2$CH$_2$—, —CH$_2$C(Ph)$_2$CH$_2$—, —CH$_2$C(Me)(Et)CH$_2$—, —CH$_2$C(Me)(iPr)CH$_2$—, —CH$_2$C(Me)(iBu)CH$_2$—, —CH$_2$C(Me)(tBu)CH$_2$—, —CH$_2$C(Me)(iPen)CH$_2$—, —CH$_2$C(Me)(Ph)CH$_2$—, —CH$_2$C(Et)(iPr)CH$_2$—, —CH$_2$C(Et)(iBu)CH$_2$—, —CH$_2$C(Et)(iPen)CH$_2$—, —CH$_2$C(iPr)(iBu)CH$_2$—, —CH$_2$C(iPr)(iPen)CH$_2$—, —CH$_2$Si(Me)$_2$CH$_2$—, —CH$_2$Si(Et)$_2$CH$_2$—, —CH$_2$Si(nBu)$_2$CH$_2$—, —CH$_2$Si(Ph)$_2$CH$_2$—, —CH(Me)CH$_2$CH(Me)—, —CH(Ph)CH$_2$CH(Ph)—, —Si(Me)$_2$OSi(Me)$_2$—, —CH$_2$CH$_2$CH$_2$CH$_2$—, —Si(Me)$_2$CH$_2$CH$_2$Si(Me)$_2$— and the like.

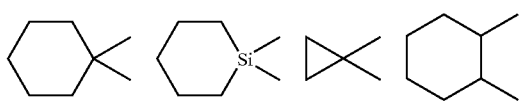
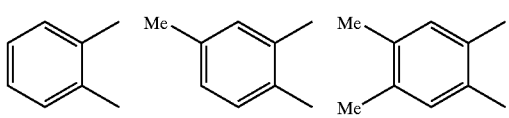
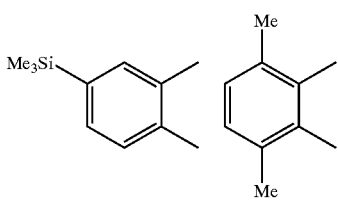
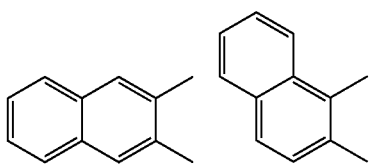
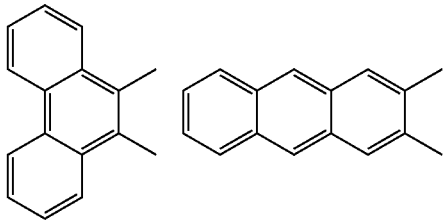
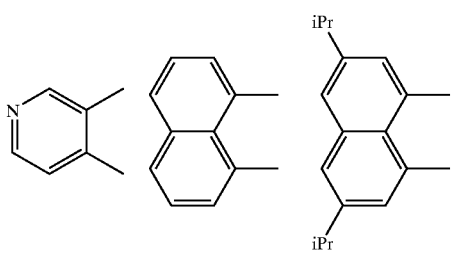
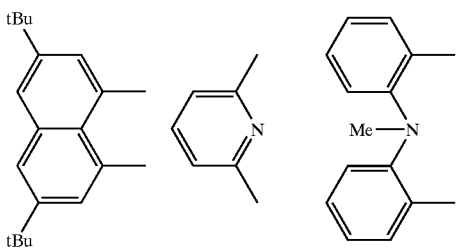
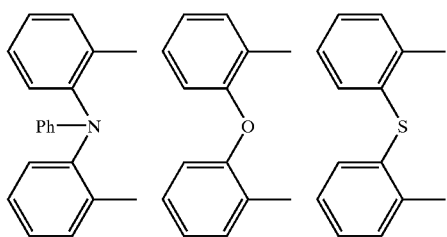

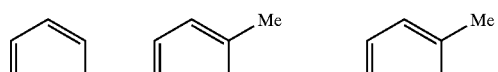
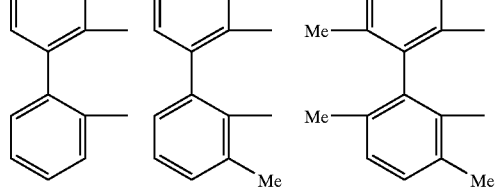
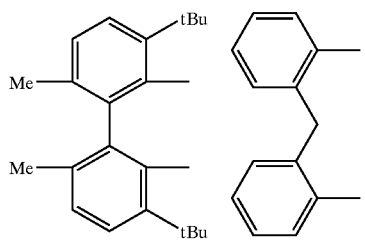
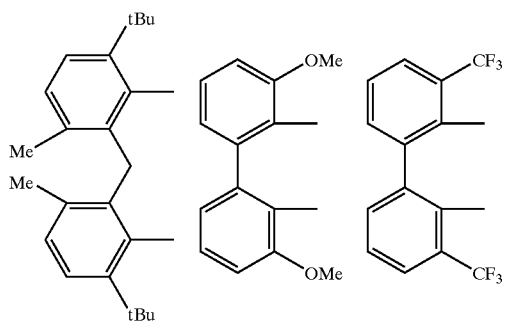
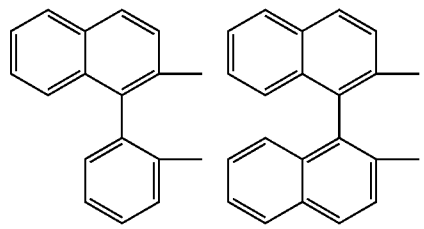

In the examples given above, Me indicates the methyl group, Et indicates the ethyl group, nPr indicates the n-propyl group, iPr indicates the isopropyl group, nBu indicates the n-butyl group, iBu indicates the isobutyl group, sBu indicates the sec-butyl group, t-Bu indicates the tert-butyl group, iPen indicates the isopentyl group, cPen indicates the cyclopentyl group, cHex indicates the cyclohexyl group, and Ph indicates the phenyl group.

p is a number that satisfies the valence of M and is an integer from 0 to 4. X indicates a hydrogen atom, halogen atom, hydrocarbon group of 1 to 20 carbon atoms, halogenated hydrocarbon group of 1 to 20 carbon atoms, oxygen-containing group, sulfur-containing group or silicon-containing group. If p is 2 or more, the plurality of groups indicated by X may be the same or may differ from each other.

Examples of halogen atoms include fluorine, chlorine, bromine and iodine. Examples of hydrocarbon groups of 1 to 20 carbon atoms include alkyl groups, cycloalkyl groups, alkenyl groups, arylalkyl groups, aryl groups, etc., and to be more specific, include alkyl groups, such as the methyl, ethyl, propyl, butyl, hexyl, octyl, nonyl, dodecyl and icosyl groups; cycloalkyl groups, such as the cyclopentyl, cyclohexyl, norbornyl and adamantyl groups; alkenyl groups, such as the vinyl, propenyl and cyclohexenyl groups; arylalkyl groups, such as the benzyl, phenylethyl and phenylpropyl groups; and aryl groups, such as the phenyl, tolyl, dimethylphenyl, trimethylphenyl, ethylphenyl, propylphenyl, biphenyl, naphthyl, methylnapthyl, anthryl and phenanthryl groups.

Examples of halogenated hydrocarbon groups of 1 to 20 carbon atoms include groups with which a halogen or halogens is or are substituted to the above-mentioned hydrocarbon group of 1 to 20 carbon atoms. Examples of oxygen-containing groups include the hydroxy group; alkoxy groups, such as the methoxy, ethoxy, propoxy and butoxy groups; aryloxy groups, such as the phenoxy, methylphenoxy, dimethylphenoxy and napthoxy groups; and arylalkoxy groups, such as the phenylmethoxy and phenylethoxy groups.

Examples of sulfur-containing groups include substituent groups with which the oxygen in an abovementioned oxygen-containing group has been replaced by sulfur and also include sulfonate groups, such as the methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate groups; and sulfinate groups, such as the methylsulfinate, phenylsulfinate, benzylsulfinate, p-toluenesulfinate, trimethylbenzenesulfinate and pentafluorobenzenesulfinate groups.

Examples of silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as the trimethylsilylmethyl group; and silicon-substituted aryl groups, such as the trimethylsilylphenyl group.

Of the above, halogen atoms, hydrocarbon atoms of 1 to 20 carbon atoms and sulfonate groups are preferable. Also, if p is 2 or more, two or more of the X's may be linked together to form a ring. Though specific examples of transition metal compounds expressed by the above general formula (I) are given below, such transition metal compounds are not limited to these examples.

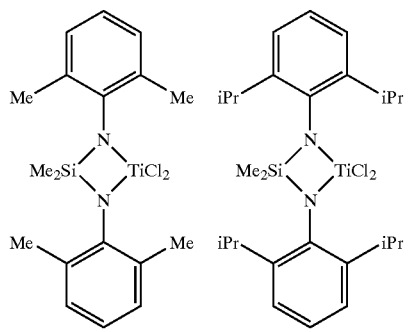

-continued

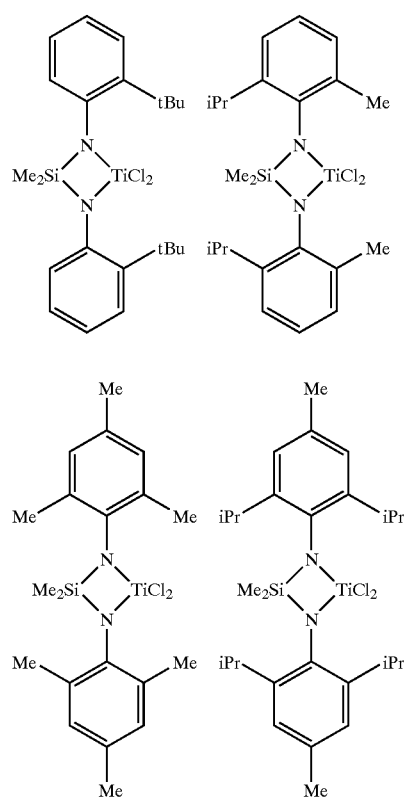

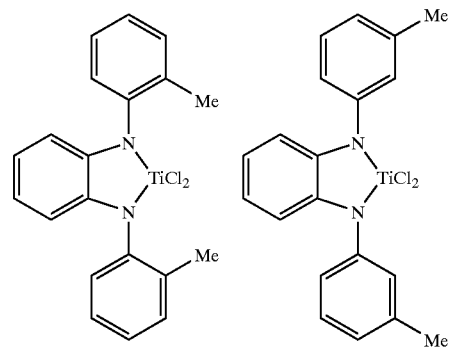

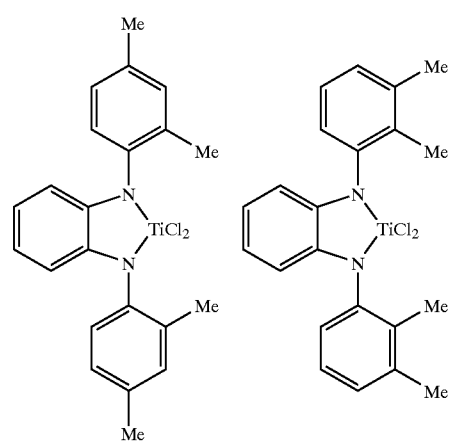

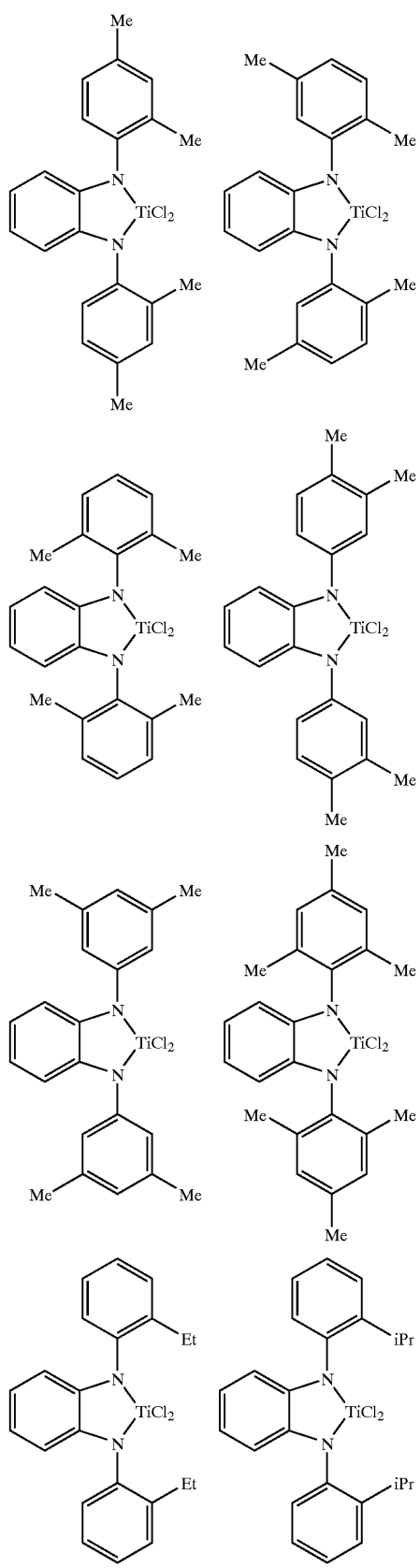
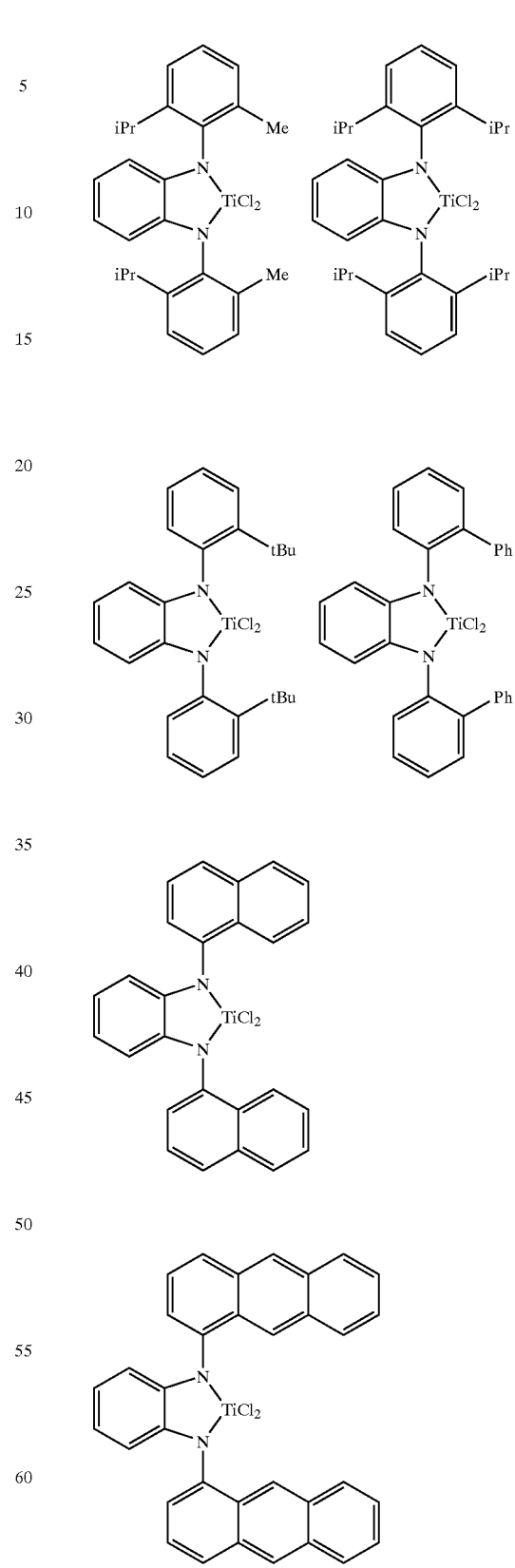

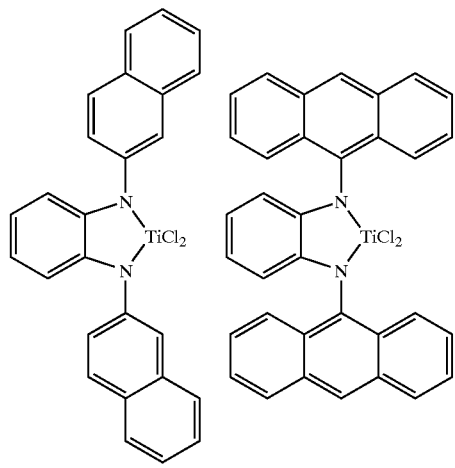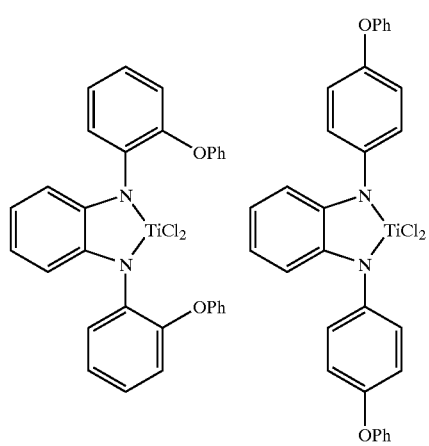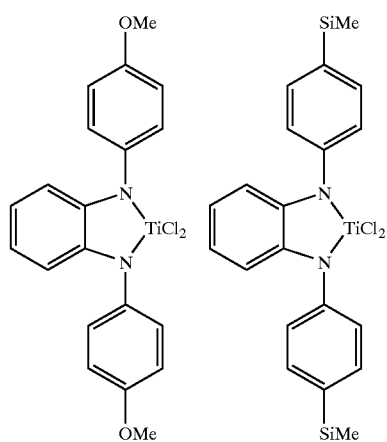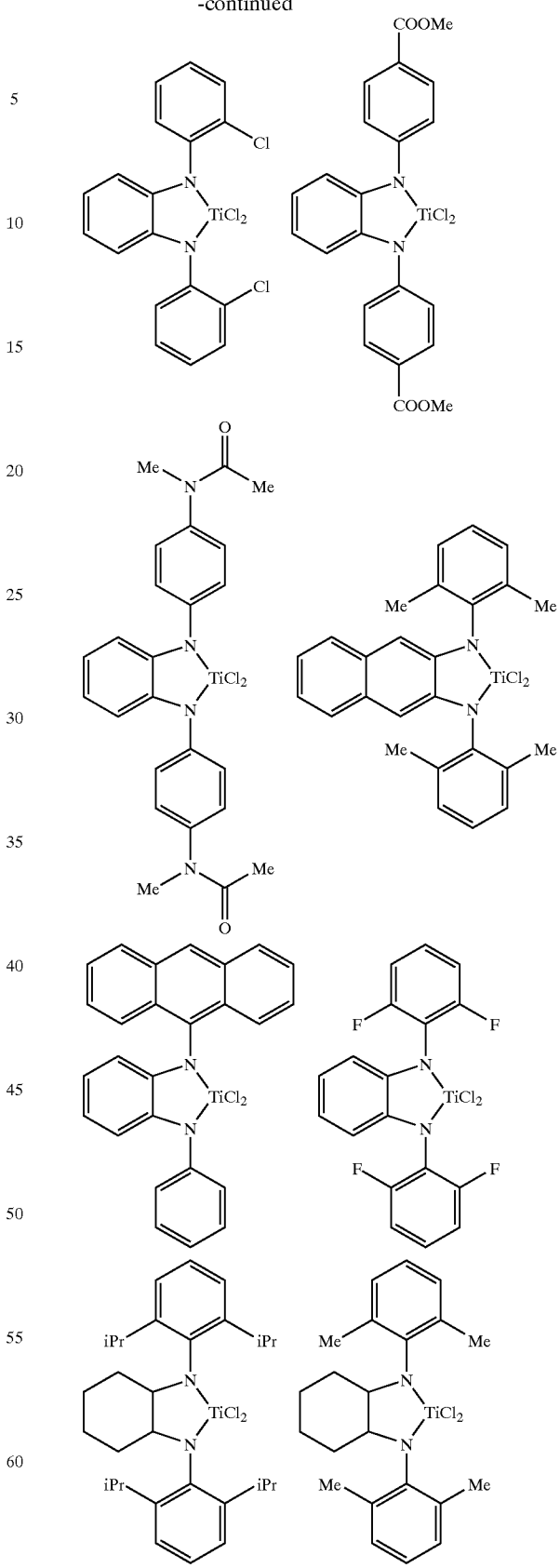

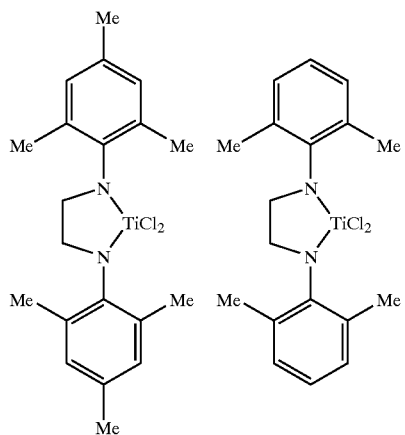
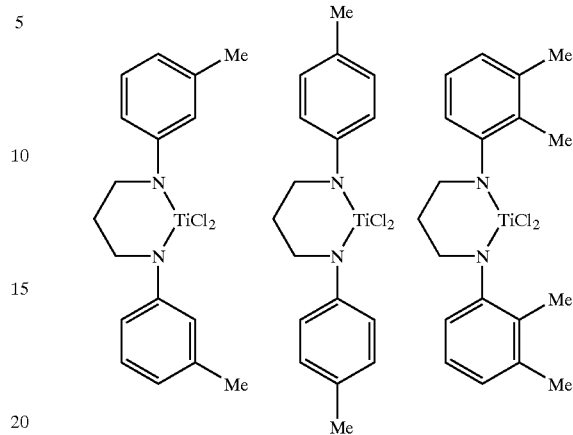
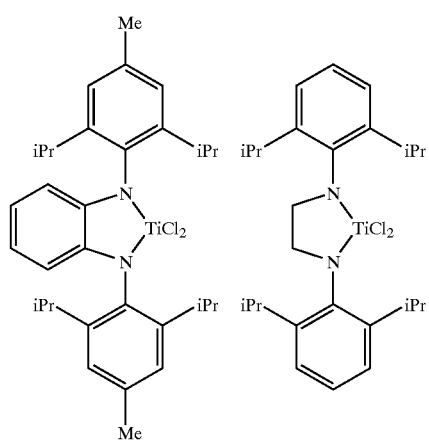
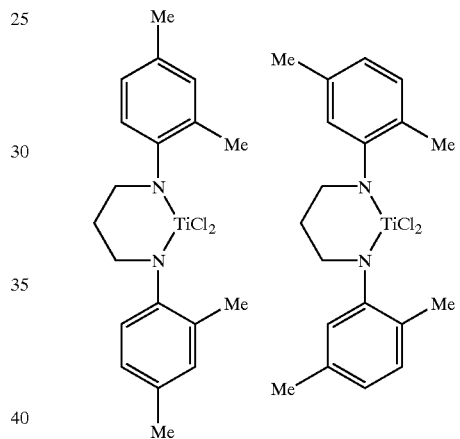
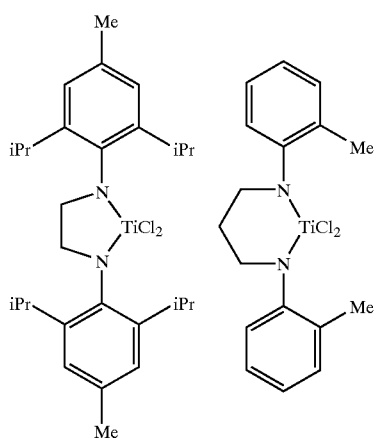
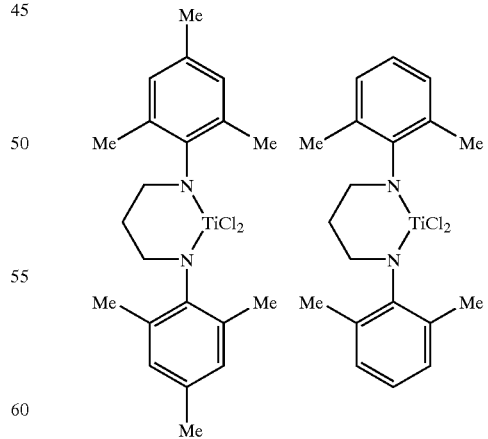

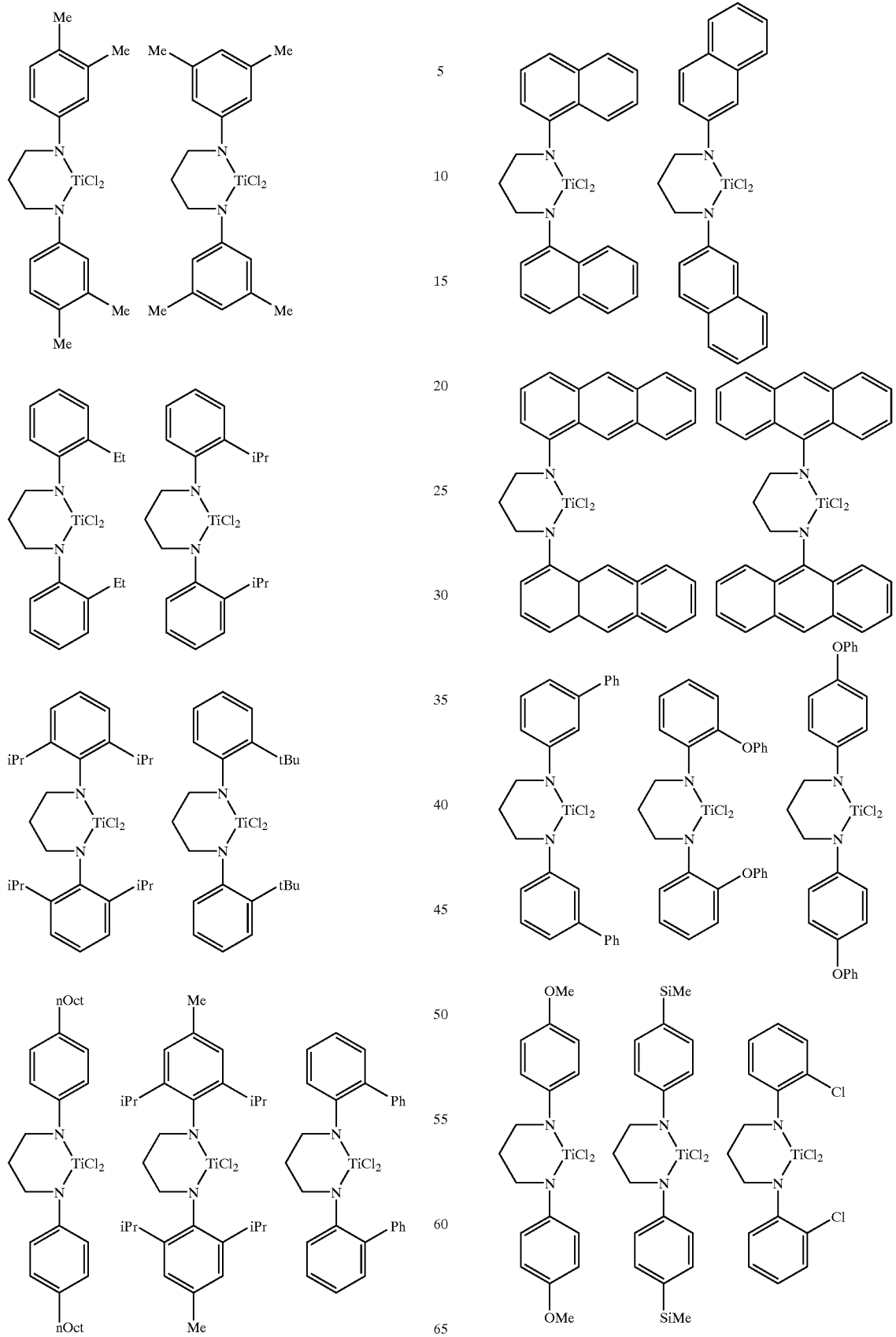

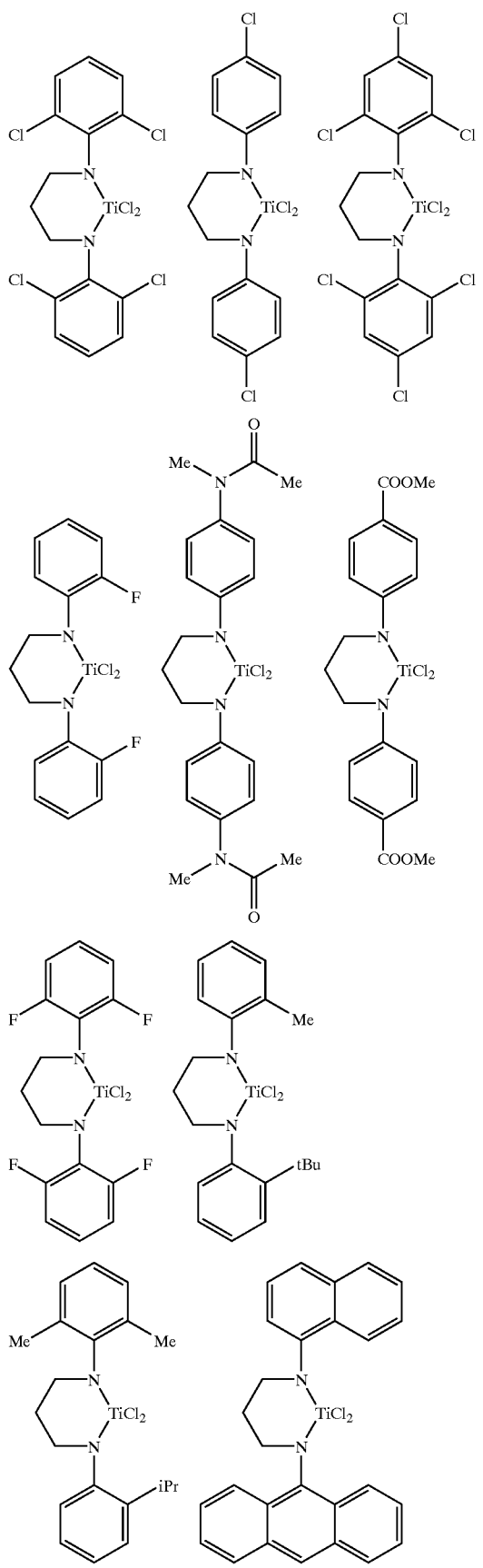
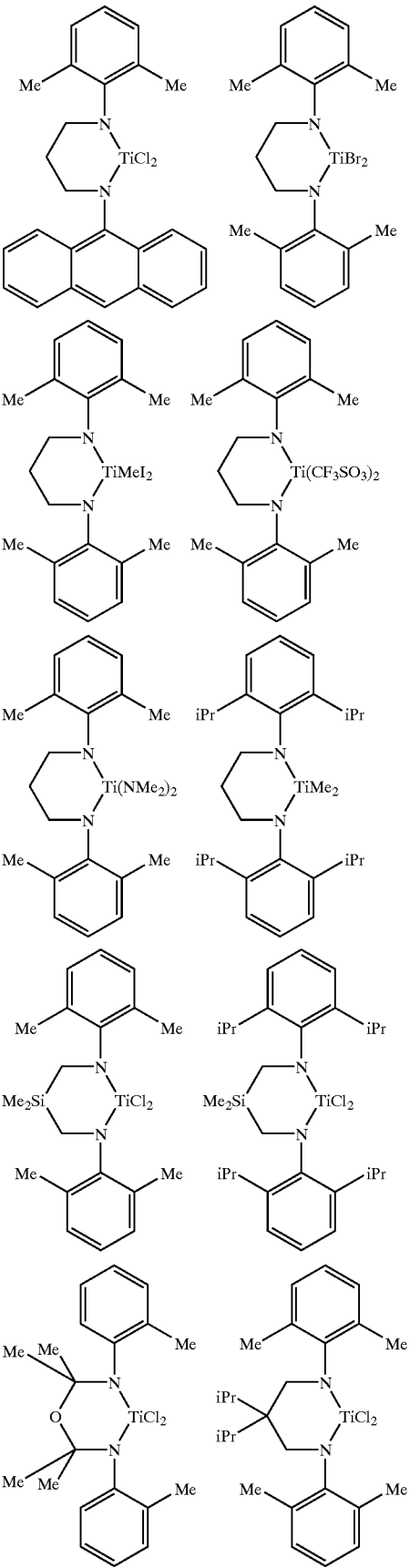

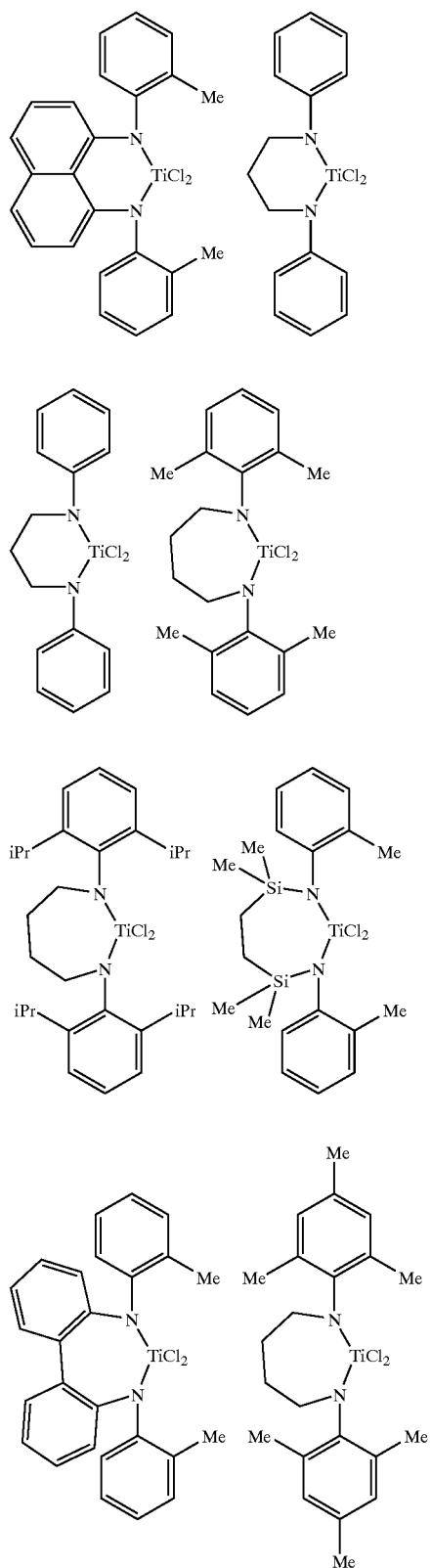
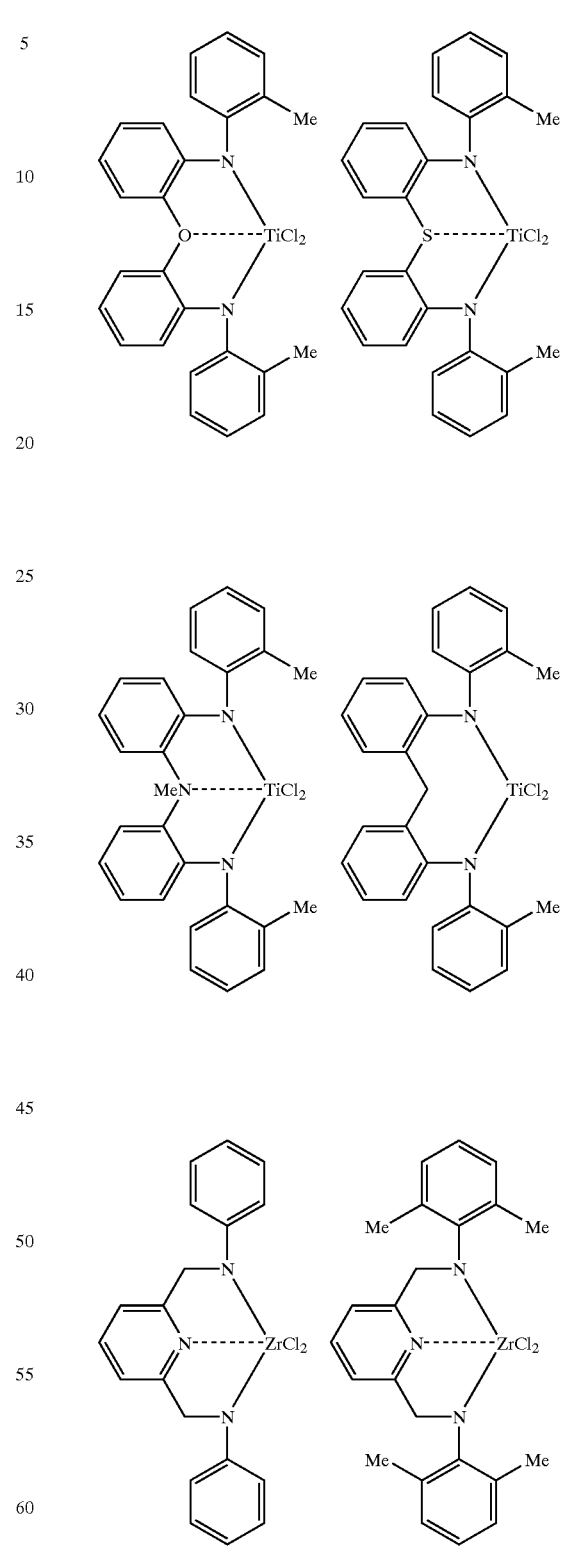

-continued
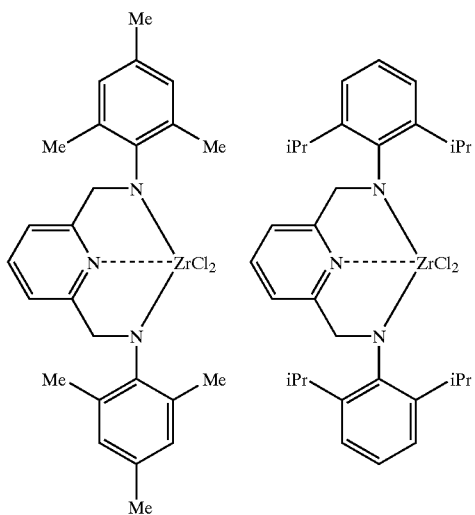
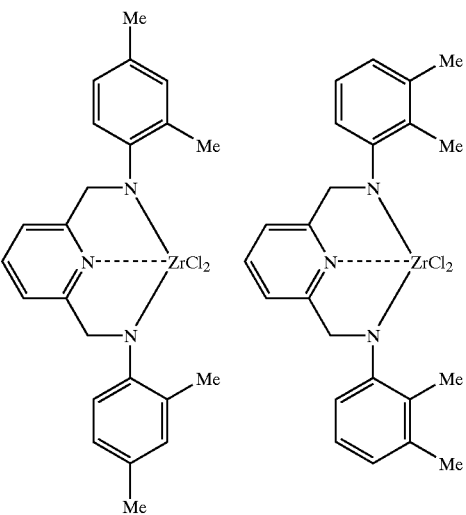
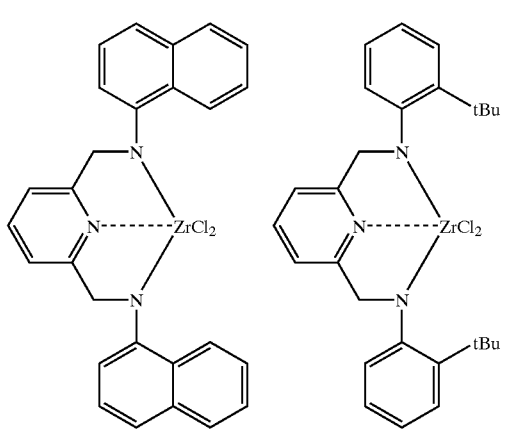
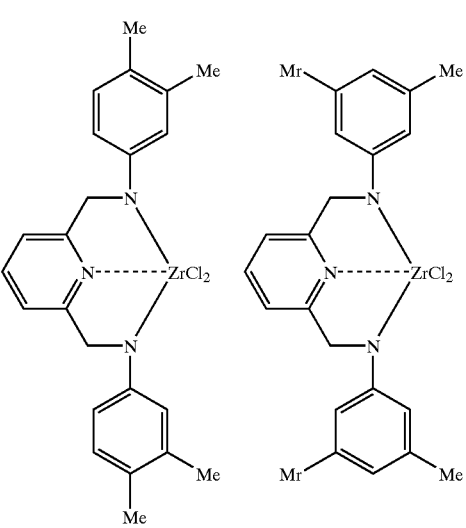
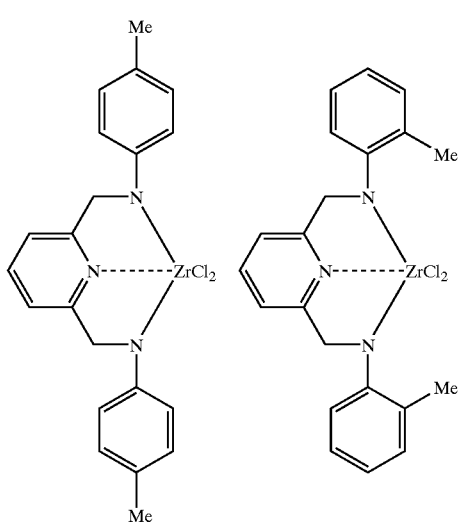
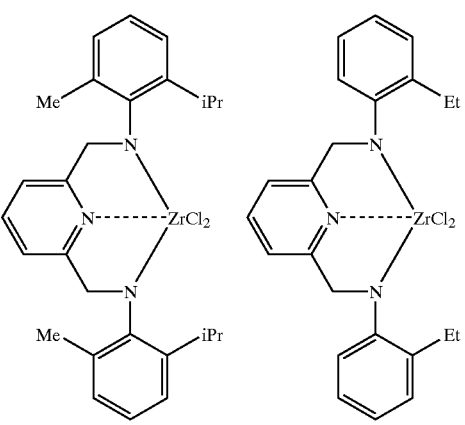

-continued
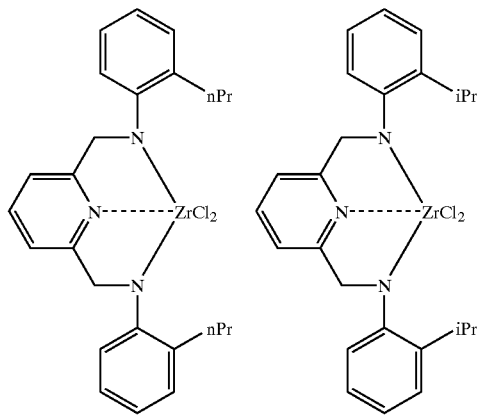
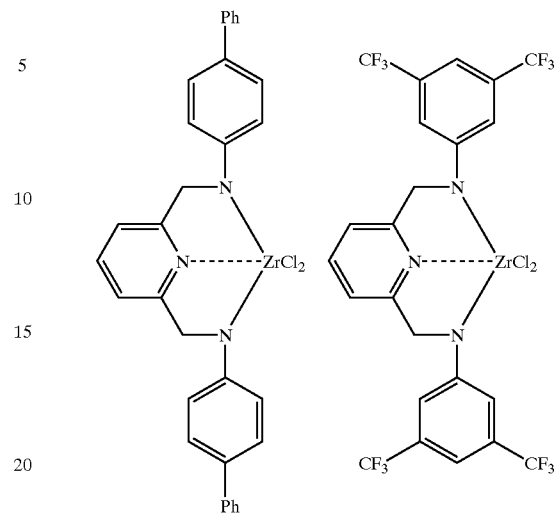
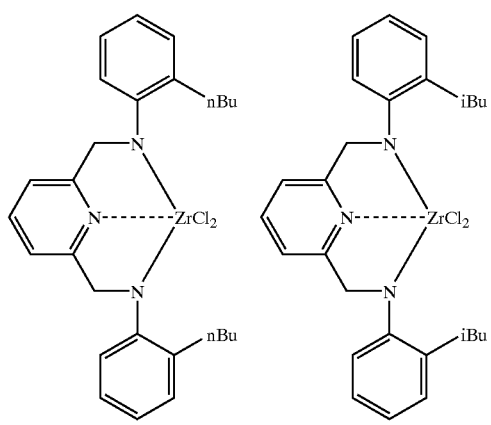
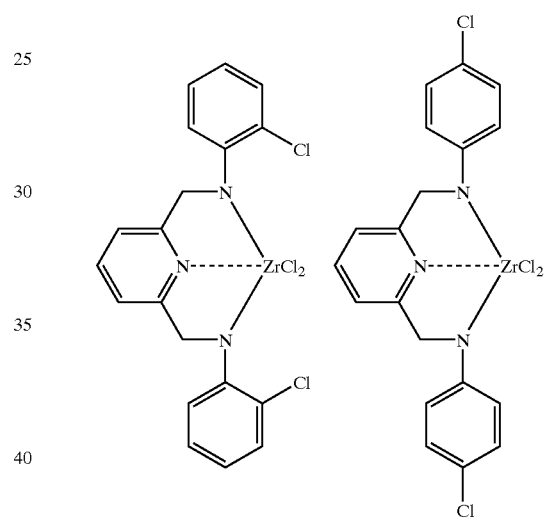
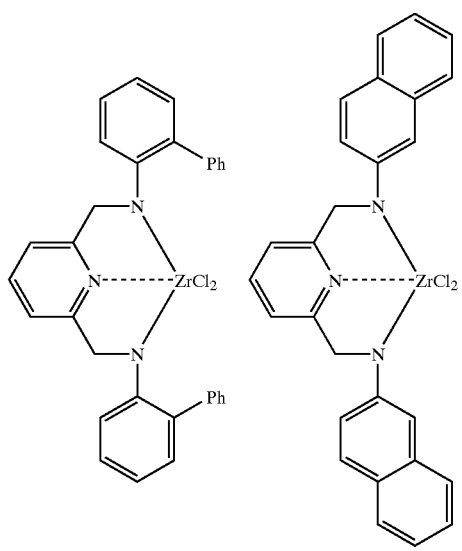
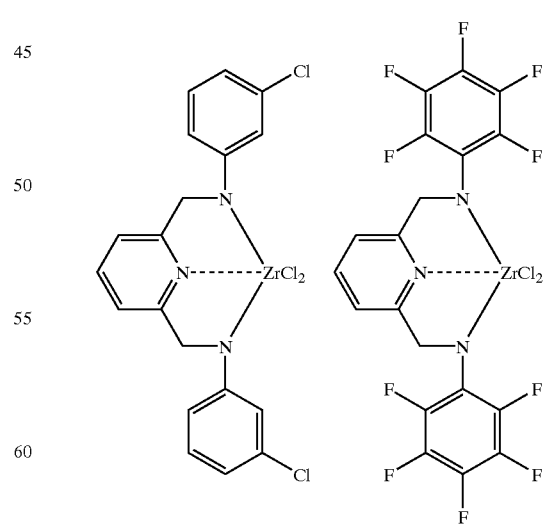

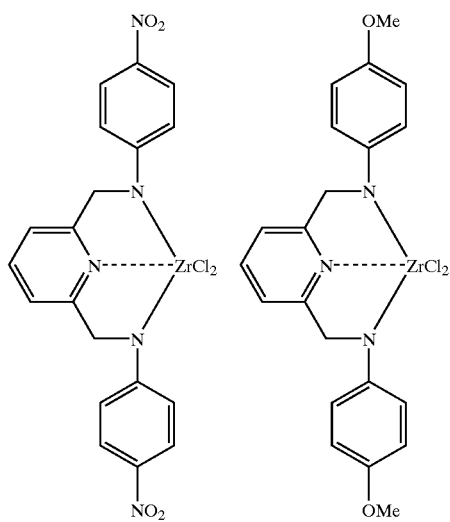
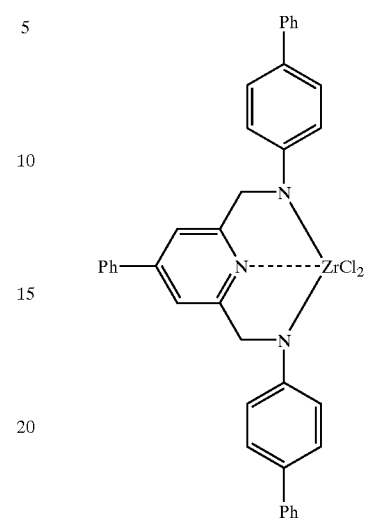
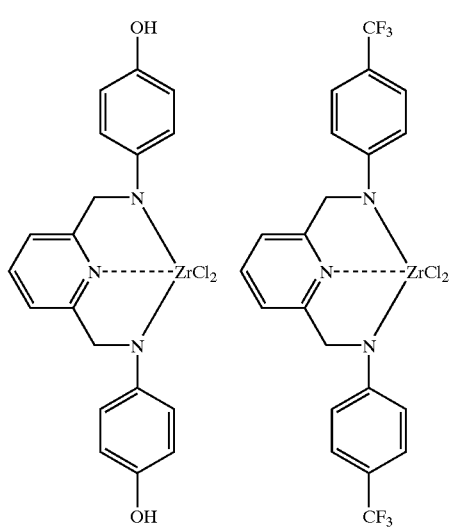
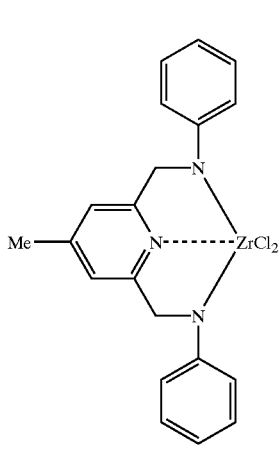

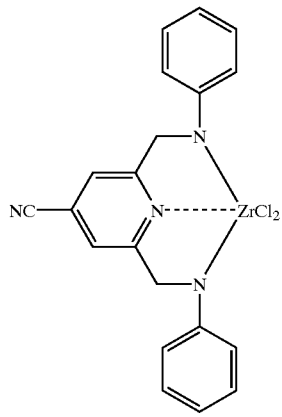
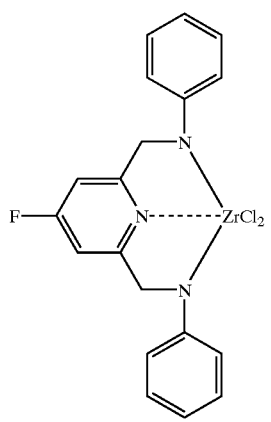
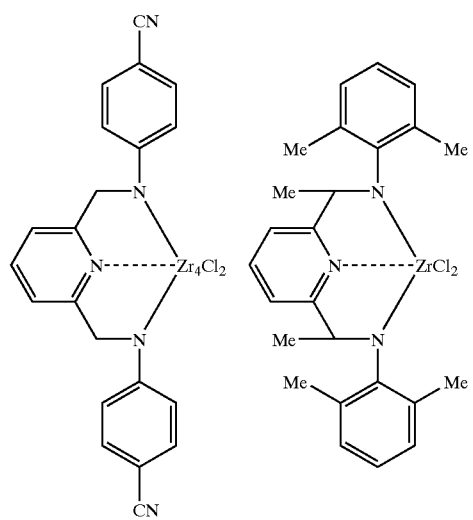
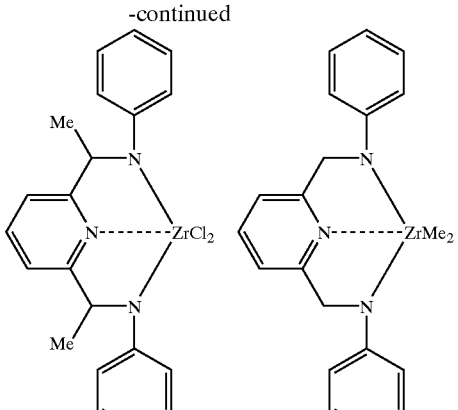
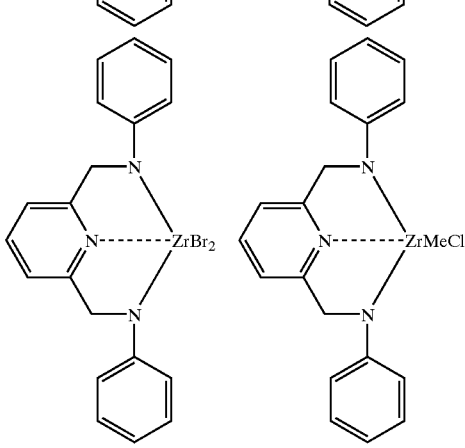
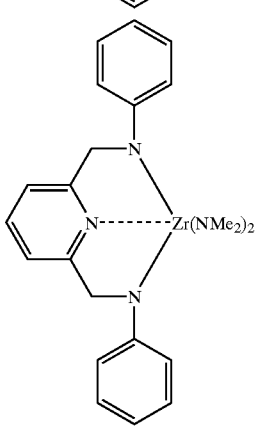
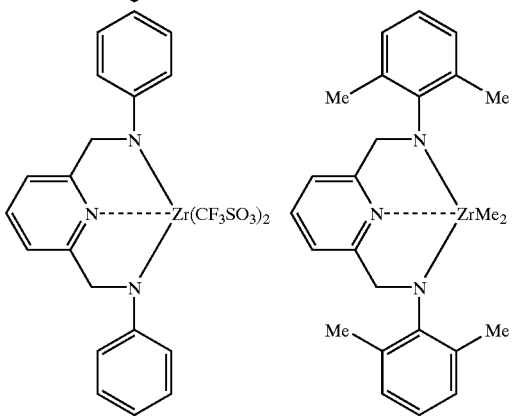

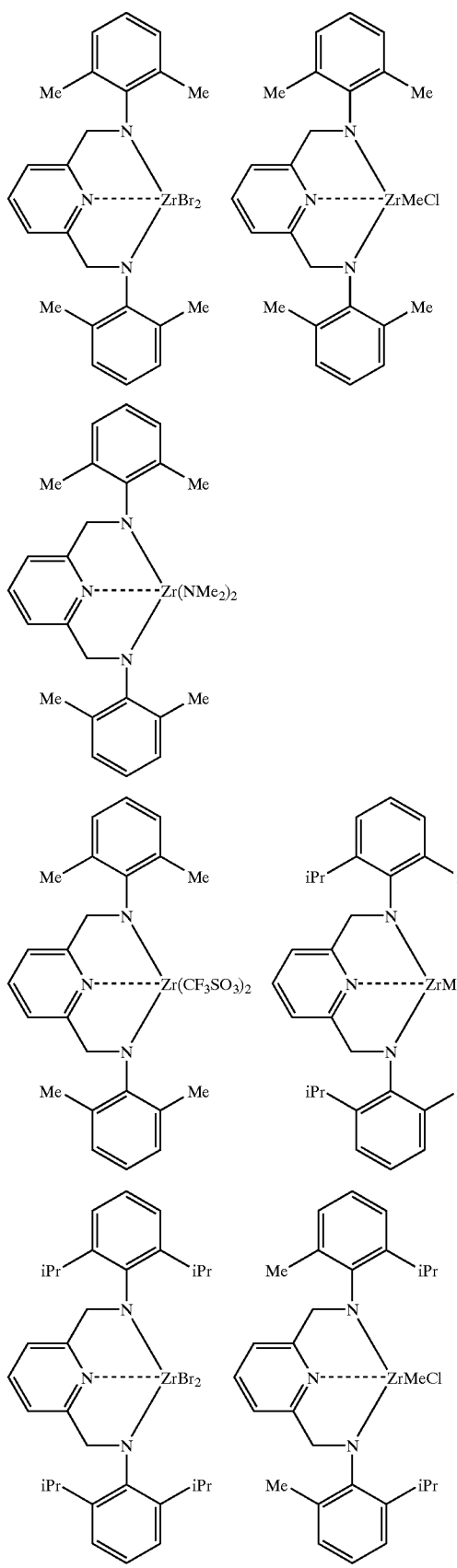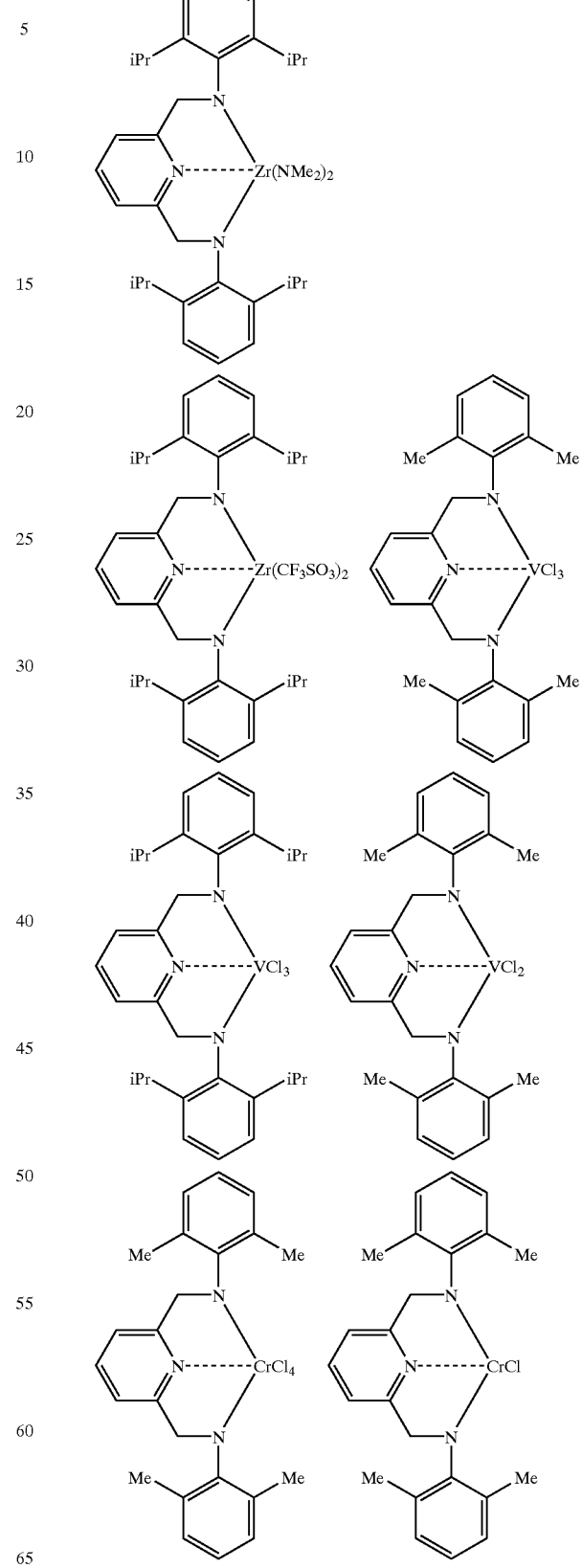

In the examples given above, Me indicates the methyl group, Et indicates the ethyl group, nPr indicates the n-propyl group, iPr indicates the isopropyl group, nBu indicates the n-butyl group, iBu indicates the isobutyl group, t-Bu indicates the tert-butyl group, nOct indicates the n-octyl group, and Ph indicates the phenyl group. In the present invention, a transition metal compound with which the titanium in an abovementioned compound has been replaced by zirconium or hafnium, a transition metal compound with which the zirconium in an abovementioned compound has been replaced by titanium or hafnium, or a transition metal compound with which the vanadium in an abovementioned compound has been replaced by tantalum or niobium may also be used. Such a compound may be used alone or in combination of two or more.

Specific examples of the transition metal compound (A) also include solid titanium catalyst components having for example titanium, magnesium and halogen as essential components.

Examples of magnesium compounds used in the preparation of a solid titanium catalyst component include magnesium compounds having reducing ability and magnesium compounds that do not have reducing ability.

Examples of magnesium compounds having reducing ability include organic magnesium compounds represented by the following formula.

$$X_nMgR_{2-n}$$

In the above formula, $0 \leq n < 2$, R is hydrogen or an alkyl group of 1 to 20 carbon atoms, aryl group or cycloalkyl group, and in the case where n is 0, the two R's may be the same or may differ from each other. X is a halogen.

Specific examples of such an organic magnesium compound having reducing ability include alkylmagnesium compounds, such as dirnethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylmagnesium chloride, butylmagnesium chloride, hexylmagnesium chloride and amylmagnesium chloride;

alkylmagnesium alkoxides, such as butylethoxymagnesium, ethylbutoxymagnesium and octylbutoxymagnesium; butylmagnesium hydride and magnesium hydride.

Besides the above, metal magnesium may also be used.

Specific examples of magnesium compounds having no reducing ability include magnesium halides, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; dialkoxymagnesiums, such as diethoxymagnesium, diisopropoxymagnesium, dibutoxymagnesium, di-n-octoxymagnesium, di-2-ethylhexoxymagnesium and methoxyethoxymagnesium; diaryloxymagnesiums, such as diphenoxymagnesium, di-methylphenoxymagnesium and phenoxymethylphenoxymagnesium; and carboxylic acid salts of magnesium, such as magnesium laurate and magnesium stearate.

Such magnesium compounds having no reducing ability may be compounds derived from the abovementioned magnesium compounds having reducing ability or may be compounds derived in the preparation of the catalyst component. To derive a magnesium compound having no reducing ability from a magnesium compound having reducing ability, a magnesium compound having reducing ability may for example be brought into contact with a polysiloxane compound, halogen-containing silane compound, halogen-containing aluminum compound, ester, alcohol, halogen-containing compound or a compound having an OH group or active carbon-oxygen bond.

The abovementioned magnesium compounds having reducing ability and magnesium compounds having no reducing ability may form a complex or double compound with aluminum, zinc, boron, beryllium, sodium, potassium, or other metal or may be a mixture with another metal compound. Furthermore, the magnesium compound may be used alone or in combination of two or more.

If a magnesium compound among magnesium compounds such as those mentioned above is a solid, it can be put in the liquid state using an electron donor (ii). Examples of electron donor (ii) include alcohols, phenols, ketones, aldehydes, ethers, amines, pyridines, metal acid esters, etc., and to be more specific, include alcohols of 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol; halogen-containing alcohols of 1 to 18 carbon atoms, such as trichloromethanol, trichloroethanol and trichlorohexanol; alkoxyalcohols, such as 2-propoxyethanol, 2-butoxyethanol, 2-ethoxypropanol, 3-ethoxypropanol, 1-methoxybutanol, 2-methoxybutanol and 2-ethoxybutanol; phenols of 6 to 20 carbon atoms that may have a lower alkyl group, such as phenol, cresol, xylenol, ethylphenol, propylphenol, nonylphenol, cumylphenol and naphthol; ketones of 3 to 15 carbon atoms, such as acetone, methyl ethyl ketone, methyl isobutyl ketone, acetophenone, benzophenone and benzoquinone; aldehydes of 2 to 15 carbon atoms, such as acetaldehyde, propionaldehyde, octylaldehyde, benzaldehyde, toladehyde and naphthaldehyde; ethers of 2 to 20 carbon atoms, such as methyl ether, ethyl ether, isopropyl ether, butyl ether, amyl ether, tetrahydrofuran, anisole and diphenyl ether; amines, such as trimethylamine, triethylamine, tributylamine, tribenzylamine and tetramethylethylenediamine; pyridines, such as pyridine, methylpyridine, ethylpyridine and dimethylpyridine; and metal acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium. The aforementioned compound may be used alone or in combination of two or more.

Among the above, alcohols, alkoxyalcohols and metal acid esters are used especially favorably. The solubilization reaction of the solid magnesium compound by the electron donor is generally carried out by a method in which the solid magnesium compound is brought into contact with the electron donor and then heated as necessary. The contacting temperature in this case is set in the range, 0 to 200° C., preferably 20 to 180° C., and more preferably 50 to 150° C.

Also, a hydrocarbon solvent, etc., may be made to coexist in the abovementioned solubilization reaction. Specific examples of such a hydrocarbon include aliphatic hydrocarbons, such as pentane, hexane, heptane, octane, decane, dodecane, tetradecane and kerosene; alicyclic hydrocarbons, such as cyclopentane, methylcyclopentane, cyclohexane, methylcyclohexane, cyclooctane and cyclohexene; aromatic hydrocarbons, such as benzene, toluene and xylene; and halogenated hydrocarbons, such as dichloroethane, dichloropropane, trichloroethylene, chlorobenzene and 2,4-dichlorotoluene.

Though many magnesium compounds besides those mentioned above may also be used as the magnesium compound to be used in the preparation of the solid titanium catalyst component, the magnesium compound preferably exists in the form of a halogen-containing magnesium compound in the solid titanium catalyst component obtained in the final stage, and thus in the case where a magnesium compound that does not contain any halogen is to be used, it is preferably subject to a contact reaction with a halogen-containing compound in the process of preparation.

Among the above, a magnesium compound having no reducing ability is preferably contained in the catalyst component. Such a magnesium compound that contains halogen is especially preferable, and among such compounds, magnesium chloride, alkoxymagnesium chloride or aryloxymagnesium chloride is even more preferably contained in the catalyst component.

Quadrivalent titanium compounds are especially preferable for use as the titanium compound to be used in preparing the solid titanium catalyst component. Compounds represented by the following formula can be given as examples of such quadrivalent titanium compounds.

$$Ti(OR)_g X_{4-g}$$

In the formula, R is a hydrocarbon group, X is a halogen atom, and $0 \leq g \leq 4$. Specific examples of such compounds include tetrahalogenated titaniums, such as TiCl4, TiBr$_4$ and TiI$_4$;

trihalogenated alkoxytitaniums, such as Ti(OCH$_3$)Cl$_3$, Ti(OC$_2$H$_5$)Cl$_3$, Ti(On-C$_4$H$_9$)C$_3$, Ti(OC$_2$H$_5$)Br$_3$ and Ti(O-iso-C$_4$H$_9$)Br$_3$;

dihalogenated dialkoxytitaniums, such as Ti(OCH$_3$)$_2$Cl$_2$, Ti(OC$_2$H$_5$)$_2$Cl$_2$, Ti(On-C$_4$H$_9$)$_2$Cl$_2$ and Ti(OC$_2$H$_5$)$_2$Br$_2$;

monohalogenated trialkoxytitaniums, such as Ti(OCH$_3$)$_3$Cl, Ti(OC$_2$H$_5$)$_3$Cl, Ti(On-C$_4$H$_9$)$_3$Cl and Ti(OC$_2$H$_5$)$_3$Br; and tetraalkoxytitaniums, such as Ti(OCH$_3$)$_4$, Ti(OC$_2$H$_5$)$_4$, Ti(On-C$_4$H$_9$)$_4$, Ti(O-iso-C$_4$H$_9$)$_4$ and Ti(O-2-ethylhexyl)$_4$.

Among the above, tetrahalogenated titaniums are preferable, and titanium tetrachloride is especially preferable. Such a titanium compound may be used alone or in combination of two or more. The titanium compound may also be used together with an aromatic hydrocarbon or diluted with a hydrocarbon or halogenated hydrocarbon.

An electron donor is preferably used in preparing the solid titanium catalyst component, and an acid halide, acid amide, nitrile, acid anhydride, organic acid ester, polyether, etc., such as those given below may be used as the electron donor.

Specific examples of such an electron donor include acid halides of 2 to 15 carbon atoms, such as acetyl chloride, benzoyl chloride, toluyl chloride and anisyl chloride;

acid amides, such as N,N-dimethyl acetamide, N,N-diethyl benzamide and N,N-dimethyl toluamide;

nitrites, such as acetonitrile, benzonitrile and tolynitrile;

acid anhydrides, such as acetic anhydride, phthalic anhydride and benzoic anhydride; and organic acid esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarin, phthalide and ethyl carbonate.

Also with regard to organic acid esters, the multivalent carboxylic acid esters having skeleton represented by the following general formulae may be given as preferable examples.

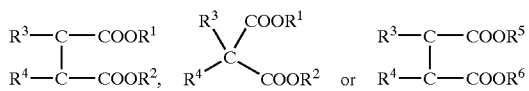

(In the above formulae, $R^1$ is a substituted or non-substituted hydrocarbon group, each of $R^2$, $R^5$, and $R^6$ is hydrogen or a substituted or non-substituted hydrocarbon group, and each of $R^3$ and $R^4$ is hydrogen or a substituted or non-substituted hydrocarbon group, with at least one preferably being a substituted or non-substituted hydrocarbon group. Also, $R^3$ and $R^4$ may be linked together to form a cyclic structure. If a hydrocarbon group among the hydrocarbon groups $R^1$ to $R^6$ is substituted, the substituent group contains hetero atom such as N, O, S and for example, has a group such as C—O—C, COOR, COOH, OH, SO$_3$H, —C—N—C—, NH$_2$, etc.)

Specific examples of such multivalent carboxylic acid esters include aliphatic polycarboxylic acid esters, alicyclic polycarboxylic acid esters, aromatic polycarboxylic acid esters and heterocyclic polycarboxylic acid esters.

Specific examples of preferable multivalent carboxylic acid esters having the skeleton represented by the general formulae given above include diethyl succinate, dibutyl succinate, diethyl methylsuccinate, diallyl methylsuccinate, diisobutyl α-methylglutarate, diisopropyl β-methylglutarate, diisobutyl methylmalonate, dibutyl ethylmalonate, diethyl ethylmalonate, diethyl isopropylmalonate, dibutyl isopropylmalonate, dibutyl butylmalonate, dibutyl phenylmalonate, diethyl diethylmalonate, dibutyl dibutylmalonate, diethyl dibutylmalonate, n-butyl maleate, dibutyl methylmaleate, dibutyl butylmaleate, di-2-ethylhexyl fumarate, di-n-hexyl cyclohexenecarboxylate, diethyl nadate, diisopropyl tetrahydrophthalate, diethyl phthalate, monoethyl phthalate, dipropyl phthalate, diisobutyl phthalate, diisopropyl phthalate, ethylisobutyl phthalate, di-n-butyl phthalate, di-n-heptyl phthalate, di-n-octyl phthalate, di-2-ethylhexyl phthalate, di(2-methylpentyl) phthalate, di(3-methylpentyl) phthalate, di(4-methylpentyl) phthalate, di(2,3-dimethylbutyl) phthalate, di(3-methylhexyl) phthalate, di(4-methylhexyl) phthalate, di(5-methylhexyl) phthalate, di(3-ethylpentyl) phthalate, di(3,4-dimethylpentyl) phthalate, di(2,4-dimethylpentyl) phthalate, di(2-methylhexyl) phthalate, di(2-methyloctyl) phthalate, didecyl phthalate, diphenyl phthalate, mixtures of the abovementioned phthalic acid diesters, diethyl naphthalenedicarboxylate, dibutyl naphthalenedicarboxylate, triethyl trimellitate, tributyl trimellitate, dibutyl 3,4-furandicarboxylate, diethyl adipate, dibutyl adipate, dioctyl sebacinate and dibutyl sebacinate.

Among the above, phthalic acid diesters are preferably used. Also, compounds (which may be referred to hereinafter as "polyethers"), having two or more ether bonds that exist with a plurality of atoms interposed therebetween, may be given as examples of electron donors. As polyethers, compounds, with which the atoms that exist between the ether bonds are carbon, silicon, oxygen, nitrogen, phosphorus, boron, sulfur, or two or more kinds of atom selected from among these atoms, may be given as examples. Among such compounds, those with which relatively bulky substituting groups are bonded to the atoms between the ether bonds and with which a plurality of carbon atoms are included among the atoms that exist between the two or more ether bonds are preferable, and for example, polyethers represented by the following general formula are preferable.

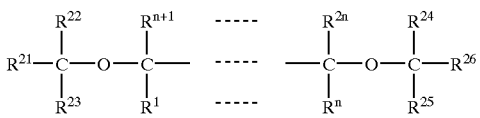

(In the above formula, n is an integer that satisfies $2 \leq n \leq 10$, each of $R^1$ to $R^{26}$ is a substituent group having at least one atom selected from among carbon, hydrogen, oxygen, halogens, nitrogen, sulfur, phosphorus, boron and silicon, arbitrary groups among $R^1$ to $R^{26}$ and preferably $R^1$ to $R^{2n}$ may form together a cyclic structure other than a benzene ring, and atoms besides carbon may be contained in the main chain.)

Specific examples of such polyether compounds include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,2-diisobutoxypropane, 1,2-diisobutoxyethane, 1,3-diisoamyloxyethane, 1,3-diisoamiloxypropane, 1,3-diisoneopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro(5,5)undecane, 3,7-dioxabicyclo(3,3,1) nonane, 3,7-dioxabicyclo(3,3,0)octane, 3,3-diisobutyl-1,5-oxononane, 6,6-diisobutyldioxyheptane, 1,1-dimethoxymethylcyclopentane, 1,1-bis(dimethoxymethyl) cyclohexane, 1,1-bis(methoxymethyl)bicyclo(2,2,1) heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane, 2-isobutyl-2-ethoxymethyl-1,3-dimethoxycyclohexane.

Specific examples of further polyethers include tris(p-methoxyphenyl)phosphine, methylphenylbis (methoxymethyl)silane, diphenylbis(methoxymethyl)silane, methylcyclohexylbis(methoxymethyl)silane, di-t-butylbis (methoxymethyl)silane, cyclohexyl-t-butylbis (methoxymethyl)silane, i-propyl-t-butylbis (methoxymethyl)silane and the like.

Of these, prefered are 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane and the like.

In the present invention, preferably an organic acid ester or polyether is used as the electron donor, and more preferably, an aromatic diester or polyether is used as the electron donor. Two or more of such electron donors may be used in combination. Also, it is sufficient for an electron donor, such as those given above as examples, to be contained in the solid titanium catalyst component in the final stage. Thus in preparing the solid titanium catalyst component, a compound given as an example above does not have to be used as it is, and another compound that can generate the compound, such as that given above, in the process of preparing the solid titanium catalyst component may be used instead. In this case, a compound other than those given above that produces two or more types of electron donors may also be used.

The method of preparing the solid titanium catalyst component from the compounds described above is not limited in particular, and the methods described below may be given as examples. In the methods described below, an organoaluminum compound (B-3) to be described later is used as the organometallic compound.

(1) A liquid-state magnesium compound formed from a magnesium compound, an abovementioned electron donor and a hydrocarbon solvent is subjected to a contact reaction with an organometallic compound if necessary, to thereby precipitate solids, and after or during the precipitation, is subjected to a contact reaction with a liquid-state titanium compound to obtain a solid component. This solid component is then subjected to a contact reaction at least once with an aromatic hydrocarbon, a titanium compound, and an electron donor. The contact of the solid component, aromatic hydrocarbon and titanium compound component is preferably carried out a plurality of times.

(2) A contact product of an inorganic carrier or organic carrier and a liquid-state organic magnesium compound is subject to a contact reaction with an organometallic compound if necessary, to thereby precipitate solids, and after or during the precipitation, is subjected to a contact reaction with a titanium compound in the liquid state to obtain a solid component. This solid component is then subject to a contact reaction at least once with an aromatic hydrocarbon, a titanium compound and an electron donor. In this process, the contact product may also be subjected to a contact reaction with a halogen-containing compound and/or an organometallic compound. This contact of the solid component, aromatic hydrocarbon and titanium compound component is preferably carried out a plurality of times.

The solid titanium catalyst component is used together with an organometallic catalyst component and if necessary, an electron donor (i).

As electron donor (i), a compound indicated above as an example of the electron donor of the solid titanium catalyst may be used or an organosilicon compound represented by the following general formula may also be used.

$$R_nSi(OR')_{4-n}$$

(In the above formula, R and R' are hydrocarbon groups and n is 0<n<4.)

Specific examples of organosilicon compounds expressed by such a general formula include the following compounds; trimethylmethoxysilane, trimethylethoxysilane, dimethyldimethoxysilane, dimethyldiethoxysilane, diisopropyldimethoxysilane, t-butylmethyldimethoxisilane, t-butylmethyldiethoxysilane, t-amylmethyldiethoxysilane, diphenyldimethoxysilane, phenylmethyldimethoxysilane, diphenyldiethoxysilane, bis o-tolyldimethoxysilane, bis m-tolyldimthoxysilane, bis p-tolyldimethoxysilane, bis p-tolyldiethoxysilane, bis ethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris (β-methoxyethoxysilane), vinyltriacetoxysilane, dimethyltetraethoxydisiloxane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Of these, prefered are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane Other examples of electron donor (i) that can be used in the present invention include nitrogen-containing electron donors, such as 2,6-substituted piperidines, 2,5-substituted piperidines, substituted methylenediamines, such as N,N,N', N'-tetramethylmethylenediamine, N,N,N',N'-tetraethylmethylenediamine, etc., and substituted imidazolidines, such as 1,3-dibenzylimidazolidine, 1,3-dibenzyl-2-phenylimidazolidine, etc., phosphorus-containing electron donors, such as triethyl phosphite, tri-n-propyl phosphite, triisopropyl phosphite, tri-n-butyl phosphite, triisobutyl phosphite, diethyl n-butyl phosphite, diethyl phenyl phosphite, and other phosphorous acid esters, etc., and oxygen-containing electron donors, such as 2,6-substituted tetrahydropyrans, 2,5-substituted tetrahydropyrans, etc. Two or more of such electron donors (i) may be used in combination.

As transition metal compound (A), a transition metal compound (A-1), which is of a transition metal of any of groups 3 to 10 of the periodic table (with lanthanides and actinides being included in group 3) and contains a ligand having a cyclopentadienyl skeleton is preferable, a transition metal compound (A-2), which is of a transition metal of group 4 of the periodic table and contains a ligand having a cyclopentadienyl skeleton, is more preferable, and a transition metal compound represented by general formula (IV) or (V) given below is even more preferable.

Examples of the transition metal compound (A-1), which is of a transition metal of any of groups 3 to 10 of the periodic table (with lanthanides and actinides being included in group 3) and contains a ligand having a cyclopentadienyl skeleton, include transition metal compounds represented by the following general formula (III-1).

$$M^1L_x \qquad \text{(III-1)}$$

In the above formula, $M^1$ indicates a transition metal atom selected from among groups 3 to 10 of the periodic table (with lanthanides and actinides being included in group 3), with specific examples including the same transition metal atoms mentioned above, and is preferably a transition metal atom of group 4 of the periodic table (zirconium, titanium, and hafnium) and, more preferably zirconium.

x is a number that satisfies the atomic valence of transition metal atom $M^1$ and indicates the number of ligands L that are coordinated to transition metal atom $M^1$.

L indicates a ligand that is coordinated to the transition metal atom, at least one of the L's is a ligand having a cyclopentadienyl skeleton, and each of the L's other than the ligand having a cyclopentadienyl skeleton is a hydrocarbon group of 1 to 20 carbon atoms, halogenated hydrocarbon group of 1 to 20 carbon atoms, oxygen-containing group, sulfur-containing group, silicon-containing group, halogen atom, or hydrogen atom, etc.

Examples of a ligand having a cyclopentadienyl skeleton include alkyl-substituted cyclopentadienyl groups, such as the cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group, and hexylcyclopentadienyl group, and also include the indenyl group, 4,5,6,7-tetrahydroindenyl group, fluorenyl group, etc. These groups may be substituted with a (halogenated) hydrocarbon group of 1 to 20 carbon atoms, oxygen-containing group, sulfur-containing group, silicon-containing group, halogen atom, etc.

If the compound represented by the above general formula (III-1) contains two or more ligands having cyclopentadienyl skeleton, two of such ligands having cyclopentadienyl skeleton may be bonded together via a bivalent bonding group, such as a (substituted) alkylene group, (substituted) silylene group, etc. Examples of a transition metal compound, in which two ligands having cyclopentadienyl skeleton are bonded via a bivalent bonding group and $M^1$ is a transition metal of group 4 of the periodic table, include transition metal compounds represented by the general formula (III-3) to be given below.

Specific examples of ligand L other than ligands having cyclopentadienyl skeleton include the following.

That is, such examples include hydrocarbon groups with 1 to 20 carbon atoms, such as alkyl groups, cycloalkyl groups, alkenyl groups, arylalkyl groups, aryl groups, etc., and to be more specific, alkyl groups, such as the methyl, ethyl, propyl, butyl, hexyl, octyl, nonyl, dodecyl and icosyl groups; cycloalkyl groups, such as the cyclopentyl, cyclohexyl, norbornyl and adamantyl groups; alkenyl groups, such as the vinyl, propenyl and cyclohexenyl groups; arylalkyl groups, such as the benzyl, phenylethyl and phenylpropyl groups; and aryl groups, such as the phenyl, tolyl, dimethylphenyl, trimethylphenyl, ethylphenyl, propylphenyl, biphenyl, naphthyl, methylnapthyl, anthryl and phenanthryl groups.

Examples of halogenated hydrocarbon groups of 1 to 20 carbon atoms include groups with which a halogen or halogens is or are substituted to the abovementioned hydrocarbon group with 1 to 20 carbon atoms.

Examples of oxygen-containing groups include the hydroxy group; alkoxy groups, such as the methoxy, ethoxy, propoxy and butoxy groups; aryloxy groups, such as the phenoxy, methylphenoxy, dimethylphenoxy and napthoxy groups; and arylalkoxy groups, such as the phenylmethoxy and phenylethoxy groups.

Examples of sulfur-containing groups include substituted groups with which the oxygen in the abovementioned oxygen-containing group has been replaced by sulfur and also include sulfonate groups, such as the methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate groups; and sulfinate groups, such as the methylsulfinate, phenylsulfinate, benzylsulfinate, p-toluenesulfinate, trimethylbenzenesulfinate and pentafluorobenzenesulfinate groups.

Examples of silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as the trimethylsilylmethyl group; and silicon-substituted aryl groups, such as the trimethylsilylphenyl group.

Examples of halogen atoms include the fluorine atom, chlorine atom, bromine atom, iodine atom, etc.

When the atomic valence of the transition metal compound is 4, examples of the transition metal compound are represented more specifically by the following general formula (III-2).

$$R^7R^8R^9R^{10}M^1 \qquad (III-2)$$

In the above formula, $M^1$ indicates a transition metal atom selected from among group 4 of the periodic table and is preferably the zirconium atom.

$R^7$ indicates a group (ligand) having a cyclopentadienyl skeleton, and $R^8$, $R^9$ and $R^{10}$ may be the same or may differ from each other, with each indicating a group (ligand) having a cyclopentadienyl skeleton, (halogenated) hydrocarbon group of 1 to 20 carbon atoms, oxygen-containing group, sulfur-containing group, silicon-containing group, halogen atom, or hydrogen atom, etc.

As the transition metal compound to be used in this invention and represented by the above general formula (III-2), a compound, with which at least one of $R^8$, $R^9$, and $R^{10}$ is a group (ligand) having a cyclopentadienyl skeleton, for example, a compound with which $R^7$ and $R^8$ are groups (ligands) having cyclopentadienyl skeleton is preferable. Also in the case where $R^7$ and $R^8$ are groups (ligands) having cyclopentadienyl skeleton, each of $R^9$ and $R^{10}$ is preferably a group having a cyclopentadienyl skeleton, alkyl group, cycloalkyl group, alkenyl group, arylalkyl group, aryl group, alkoxy group, aryloxy group, trialkylsilyl group, sulfonate group, halogen atom or hydrogen atom.

Specific examples of transition metal compounds expressed by the general formula (III-I) given above and with which $M^1$ is zirconium include bis(indenyl)zirconium dichloride, bis(indenyl)zirconium dibromide, bis(indenyl) zirconiumbis (p-toluenesulfonate), bis(4,5,6,7-tetrahydroindenyl)zirconium dichloride, bis(fluorenyl) zirconium dichloride, bis(cyclopentadienyl)zirconium dichloride, bis(cyclopentadienyl)zirconium dibromide, bis (cyclopentadienyl)methylzirconium monochloride, bis (cyclopentadienyl)ethylzirconium monochloride, bis (cyclopentadienyl)cyclohexylzirconium monochloride, bis (cyclopentadienyl)phenylzirconium monochloride, bis (cyclopentadienyl)benzylzirconium monochloride, bis (cyclopentadienyl)zirconiummonochloride monohydride, bis(cyclopentadienyl)methylzirconium monohydride, bis (cyclopentadienyl)dimethyl zirconium, bis (cyclopentadienyl)diphenyl zirconium, bis (cyclopentadienyl)dibenzyl zirconium, bis(cyclopentadienyl)zirconium methoxychloride, bis(cyclopentadienyl)zirconium ethoxychloride, bis(cyclopentadienyl)zirconiumbis(methanesulfonate), bis(cyclopentadienyl)zirconiumbis(p-toluenesulfonate), bis(cyclopentadienyl)zirconiumbis(trifluoromethanesulfonate), bis(methylcyclopentadienyl),zirconium dichoride, bis(dimethylcyclopentadienyl)zirconium dichloride, bis(dimethylcyclopentadienyl)zirconium ethoxychloride, bis(dimethylcyclopentadienyl)zirconiumbis(trifluoromethanesulfonate), bis(ethylcyclopentadienyl)zirconium dichloride, bis(methylethyicyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(methylbutylcyclopentadienyl)zirconiumbis(methanesulfonate), bis(trimethylcyclopentadienyl)zirconium dichloride, bis(tetramethylcyclopentadienyl)zirconium dichloride, bis(pentamethylcyclopentadienyl)zirconium dichloride, bis(hexylcyclopentadienyl)zirconium dichloride and bis(trimethylsilylcyclopentadienyl)zirconium dichloride.

In the examples given above, di-substituted forms of the cyclopentadienyl ring include 1,2- and 1,3- di-substituted forms, and tri-substituted forms of the cyclopentadienyl ring include 1,2,3- and 1,2,4- tri-substituted forms. Also, the alkyl groups, such as propyl, butyl, etc., include isomers such as n-, i-, sec- and tert-.

Compounds with which the zirconium in the zirconium compounds given above has been replaced by titanium or hafnium may also be given as examples.

Transition metal compounds, with which two ligands having cyclopentadienyl skeleton are bonded via a bivalent bonding group, include for example the compounds represented by the following general formula (III-3).

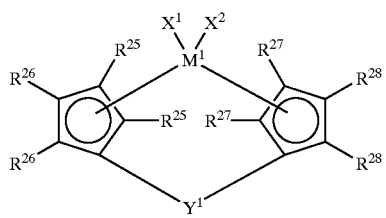

(III-3)

In the above formula, $M^1$ indicates a transition metal atom of group 4 of the periodic table, specifically zirconium, titanium or hafnium, and is preferably zirconium.

$R^{25}, R^{26}, R^{27}$ and $R^{28}$ may be the same or may differ from each other, with each indicating a hydrogen atom, nitrogen-containing group, phosphorus-containing group or the same hydrocarbon group of 1 to 20 carbon atoms, halogenated hydrocarbon group of 1 to 20 atoms, oxygen-containing group, sulfur-containing group, silicon-containing group, or halogen atom, etc., as L in general formula (III-1) given above.

Examples of nitrogen-containing groups include the amino group; alkylamino groups, such as the methylamino, dimethylamino, diethylamino, dipropylamino, dibutylamino and dicyclohexylamino groups; and arylamino and alkylarylamino groups, such as the phenylamino, diphenylamino, ditolylamino, dinaphthylamino and methylphenylamino groups.

Examples of phosphorus-containing groups include phosphino groups, such as the dimethylphosphino and diphenylphosphino groups.

Of the groups indicated by $R^{25}, R^{26}, R^{27}$ and $R^{28}$, portions of mutually adjacent groups may be linked together and form a ring along with the carbon atoms bonded to each group.

Though each of $R^{25}, R^{26}, R^{27}$ and $R^{28}$ is indicated at two positions, such groups, for example the $R^{25}$ and $R^{25}$ groups, may be the same group or may be different groups. Groups among the groups indicated by $R^{25}$ to $R^{28}$ that are provided with the same symbols indicate preferable combinations in cases where they are joined to form a ring.

Examples of the ring, formed by the joining of parts of mutually adjacent groups among the groups indicated by $R^{25}, R^{26}, R^{27}$ and $R^{28}$ and the carbon atoms bonded to these groups, include fused ring groups, such as the benzene ring, naphthalene ring, acenaphthene ring, indene ring, etc., and groups with which a hydrogen atom in an abovementioned group has been substituted with alkyl group such as methyl, ethyl, propyl or butyl.

Examples of halogen atoms include the same halogen atoms as those indicated above for L.

Of the above, each of $R^{25}, R^{26}, R^{27}$ and $R^{28}$ is preferably a hydrocarbon group of 1 to 20 carbon atoms or the hydrogen atom and especially preferably a hydrocarbon group of 1 to 4 carbon atoms, such as the methyl, ethyl, propyl or butyl group, a benzene ring formed by the bonding of hydrocarbon groups, or a group with which a hydrogen atom on a benzene ring formed by the bonding of a hydrocarbon group has been replaced by alkyl group such as methyl, ethyl, n-propyl, iso-propyl, n-butyl, iso-butyl or tert-butyl.

$X^1$ and $X^2$ may be the same or may differ from each other, with each indicating the same hydrocarbon group of 1 to 20 carbon atoms, halogenated hydrocarbon group of 1 to 20 carbon atoms, oxygen-containing group, sulfur-containing group, silicon-containing group, hydrogen atom, or halogen atom as the L in the general formula (III-1) given above. Of these, halogen atoms, hydrocarbon groups of 1 to 20 carbon atoms, and sulfonate groups are preferable.

$Y^1$ indicates a bivalent hydrocarbon group of 1 to 20 carbon atoms, bivalent halogenated hydrocarbon group of 1 to 20 carbon atoms, bivalent silicon-containing group, bivalent germanium-containing group, bivalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^{21}$— (where the R$^{21}$'s may be the same or may differ from each other, with each being a hydrocarbon group of 1 to 20 carbon atoms, halogenated hydrocarbon group of 1 to 20 carbon atoms, hydrogen atom, or halogen atom).

Specific examples of bivalent hydrocarbon groups of 1 to 20 carbon atoms include alkylene groups, such as the methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as the diphenylmethylene and diphenyl-1,2-ethylene.

Specific examples of bivalent hydrocarbon groups of 1 to 20 carbon atoms include bivalent hydrocarbon group of 1 to 20 carbon atoms has been halogenated, such as chloromethylene group.

Specific examples of bivalent silicon groups include alkylsilylene groups; alkylarylsilylene groups; and arylsilylene groups, such as silylene, methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilylene groups;

alkylaryldisilylene groups; and aryldisilylene groups, such as tetramethyl-1,2-disilylene and tetraphenyl-1,2-disilylene.

Examples of bivalent germanium-containing groups include groups with which the silicon in the abovementioned bivalent-silicon groups has been replaced by germanium.

Examples of bivalent tin-containing groups include groups with which the silicon in the abovementioned bivalent-silicon groups has been replaced by tin.

$R^{21}$ is the same kind of hydrocarbon group of 1 to 20 carbon atoms, halogenated hydrocarbon group of 1 to 20 carbon atoms, or halogen atom as the L in the general formula (III-1) given above.

Of the above, $Y^1$ is especially preferably a substituted silylene group, such as dimethylsilylene, diphenylsilylene and methylphenylsilylene.

Specific examples of transition metal compounds represented by the general formula (III-3) given above include ethylene-bis(indenyl)dimethyl zirconium, ethylene-bis(indenyl)zirconium dichloride, ethylene-bis(indenyl) zirconiumbis(trifluoromethanesulfonate), ethylene-bis(indenyl)zirconium bis(methanesulfonate), ethylene-bis(indenyl)zirconium bis(p-toluenesulfonate), ethylene-bis(indenyl)zirconiumbis(p-chlorobenzenesulfonate), ethylene-bis(4,5,6,7-tetrahydroindenyl)zirconium dichloride, isopropylidene-bis(cyclopentadienyl)(fluorenyl) zirconium dichloride, isopropylidene-bis(cyclopentadienyl)(methylcyclopentadienyl)zirconium dichloride, dimethylsilylene-bis(cyclopentadienyl)zirconium dichloride, dirmethylsilylene-bis(methylcyclopentadienyl) zirconium dichloride, dimethylsilylene-bis(dimethylcyclopentadienyl)zirconium dichloride, dimethylsilylene-bis(trimethylcyclopentadienyl)zirconium dichloride, dimethylsilylene-bis(indenyl)zirconium dichloride, dimethylsilylene-bis(indenyl)zirconiumbis(trifluoromethanesulfonate), dimethylsilylene-bis(4,5,6,7-tetrahydroindenyl)zirconium dichloride, dimethylsilylene-bis(cyclopentadienyl)(fluorenyl)zirconium dichloride, diphenylsilylene-bis(indenyl)zirconium dichloride, methylphenylsilylene-bis(indenyl)zirconium dichloride, rac-dimethylsilylene-bis(2,3,5-trimethylcyclopentadienyl) zirconium dichloride, rac-dimethylsilylene-bis(2,4,7-trimethylcyclopentadienyl)zirconium dichloride, rac-dimethylsilylene-bis(2-methyl-4-tert-butylcyclopentadienyl)zirconium dichloride, isopropylidene-(cyclopentadienyl)(fluorenyl)zirconium dichloride, dimethylsilylene-(3-tert-butylcyclopentadienyl)(indenyl)zirconium dichloride, isopropylidene-(4-methylcyclopentadienyl)(3-methylindenyl)zirconium dichloride, isopropylidene-(4-tert-butylcyclopentadienyl)(3-methylindenyl)zirconium dichloride, isopropylidene-(4-tert-butylcyclopentadienyl)(3-tert-butylindenyl)zirconium dichloride, dimethylsilylene-(4-methylcyclopentadienyl)(3-methylindenyl)zirconium dichloride, dimethylsilylene-(4-tert-butylcyclopentadienyl)(3-methylindenyl)zirconium dichloride, dimethylsilylene-(4-tert-butylcyclopentadienyl)(3-tert-butylindenyl)zirconium dichloride, dimethylsilylene-(3-tert-butylcyclopentadienyl)(fluorenyl)zirconium dichloride, and isopropylidene-(3-tert-butylcyclopentadienyl)(fluorenyl)zirconium dichloride.

Compounds with which the zirconium in the abovementioned zirconium compounds has been replaced by titanium or hafnium may also be given as examples.

More specifically, examples of transition metal compounds represented by the above general formula (III-3) include transition metal compounds represented by the general formulae (III-4) and (III-5) given below.

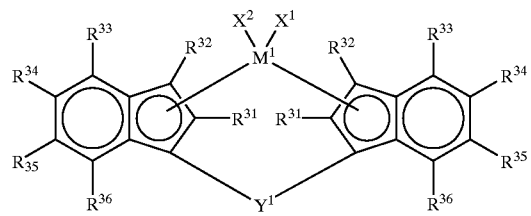

(III-4)

In the above formula, $M^1$ indicates a transition metal atom of group 4 of the periodic table, specifically titanium, zirconium or hafnium, and is preferably zirconium.

The $R^{31}$'s may be the same or may differ from each other, with each indicating a hydrocarbon group of 1 to 6 carbon atoms. Specific examples include alkyl groups, such as the methyl, ethyl, n-propyl, isopropyl, n-butyl, isobutyl, sec-butyl, tert-butyl, n-pentyl, neopentyl, n-hexyl and cyclohexyl groups; and alkenyl groups, such as the vinyl and propenyl groups. Among these, alkyl groups, with which the carbon atom bonded to the indenyl group is the primary carbon atom, is preferable, an alkyl group of 1 to 4 carbon atoms is more preferable, and the methyl-group and ethyl group are especially preferable.

$R^{32}$, $R^{34}$, $R^{35}$ and $R^{36}$ may be the same or may differ from each other, with each indicating a hydrogen atom, halogen atom, or the same kind of hydrocarbon group of 1 to 6 carbon atoms as $R^{31}$.

The $R^{33}$'s may be the same or may differ from each other, with each indicating a hydrogen atom or aryl group of 6 to 16 carbon atoms. Specific examples include the phenyl, α-naphthyl, β-naphthyl, anthryl, phenanthryl, pyrenyl, acenaphthyl, phenarenyl, aceanthrylenyl, tetrahydronaphthyl, indanyl and biphenyryl. Of these, $R^{33}$ is preferably the phenyl, naphthyl, anthryl or phenanthryl.

These aryl groups may be substituted by a halogen atom, such as fluorine, chlorine, bromine, or iodine, a hydrocarbon group with 1 to 20 atoms, for example, an alkyl group, such as the methyl, ethyl, propyl, butyl, hexyl, cyclohexyl, octyl, nonyl, dodecyl, icosyl, norbornyl or adamantyl group; an alkenyl group, such as the vinyl, propenyl or cyclohexenyl group; an arylalkyl group, such as the benzyl, phenylethyl or phenylpropyl group; or an aryl group, such as the phenyl, tolyl, dimethylphenyl, trimethylphenyl, ethylphenyl, propylphenyl, biphenyryl, α- or β-naphthyl, methylnaphthyl, anthryl, phenanthryl, benzylphenyl, pyrenyl, acenaphthyl, phenarenyl, aceanthrylenyl, tetrahydronaphthyl, indanyl or biphenyryl; or an organic silyl group, such as the trimethylsilyl, triethylsilyl or triphenylsilyl group.

$X^1$ and $X^2$ may be the same or may differ from each other and are respectively defined as being the same as $X^1$ and $X^2$ in the general formula (III-3) given above. Among the examples given above, each of $X^1$ and $X^2$ is preferably a halogen atom or a hydrocarbon group of 1 to 20 carbon atoms.

$Y^1$ is defined as being the same as $Y^1$ in the general formula (III-3) given above. Among the examples given above, $Y^1$ is preferably a bivalent silicon-containing group or a bivalent germanium-containing group, more preferably a bivalent silicon-containing group, and even more preferably an alkylsilylene, alkylarylsilylene or arylsilylene.

Specific examples of transition metal compounds represented by the general formula (III-4) given above include the following; rac-dimethylsilylene-bis(1-(2-methyl-4- phenylindenyl))zirconium dichloride, rac-dimethylsilylene-bis(1-(2-methyl-4-(α-naphthyl)indenyl))zirconium dichloride, rac-dimethylsilylene-bis(1-(2-methyl-4-(β-naphthyl)indenyl))zirconium dichloride, rac-dimethylsilylene-bis(1-(2-methyl-4-(1-anthryl)indenyl))zirconium dichloride, rac-dimethylsilylene-bis(1-(2-methyl-4-(2-anthryl)indenyl))zirconium dichloride, rac-dimethylsilylene-bis(1-(2-methyl-4-(9-anthryl)indenyl))zirconium dichloride, rac-dimethylsilylene-bis(1-(2-methyl-4-(9-phenanthryl)indenyl))zirconium dichloride, rac-dimethylsilylene-bis (1-(2-methyl-4-(p-fluorophenyl)indenyl))zirconium dichloride, rac-dimethylsilylene-bis(1-(2-methyl-4-(pentafluorophenyl)indenyl))zirconium dichloride, rac-dimethylsilylene-bis(1-(2-methyl-4-(p-chlorophenyl)indenyl))zirconium dichloride, rac-dimethylsilylene-bis(1-(2-methyl-4-(m-chlorophenyl)indenyl))zirconium dichloride, rac-dimethylsilylene-bis(1-(2-methyl-4-(o-chlorophenyl)indenyl))zirconium dichloride, rac-dimethylsilylene-bis(1-(2-methyl-4-(o,p-dichlorophenyl)phenylindenyl))zirconium dichloride, rac-dimethylsilylene-bis(1-(2-methyl-4-(p-bromophenyl)indenyl))zirconium dichloride, rac-dimethylsilylene-bis(1-(2-methyl-4-(p-tolyl)indenyl))zirconium dichloride, rac-dimethylsilylene-bis(1-(2-methyl-4-(m-tolyl)indenyl))zirconium dichloride, rac-dimethylsilylene-bis(1-(2-methyl-4-(o-tolyl)indenyl))zirconium dichloride, rac-dimethylsilylene-bis(1-(2-methyl-4-(o,o'-dimethylphenyl)-1-indenyl))zirconium dichloride, rac-dimethylsilylene-bis (1-(2-methyl-4-(p-ethylphenyl)indenyl))zirconium dichloride, rac-dimethylsilylene-bis(1-(2-methyl-4-(p-i-propylphenyl)indenyl))zirconium dichloride, rac-dimethylsilylene-bis(1-(2-methyl-4-(p-benzylphenyl)indenyl))zirconium dichloride, rac-dimethylsilylene-bis(1-(2-methyl-4-(p-biphenylyl)indenyl))zirconium dichloride, rac-dimethylsilylene-bis(1-(2-methyl-4-(m-biphenylyl)indenyl))zirconium dichloride, rac-dimethylsilylene-bis(1-(2-methyl-4-(p-trimethylsilylenephenyl)indenyl))zirconium dichloride, rac-dimethylsilylene-bis(1-(2-methyl-4-(m-trimethylsilylenephenyl)indenyl))zirconium dichloride, rac-dimethylsilylene-bis(1-(2-phenyl-4-phenylindenyl))zirconium dichloride, rac-diethylsilylene-bis(1-(2-methyl-4-phenylindenyl))zirconium dichloride, rac-di-(i-propyl)silylene-bis(1-(2-methyl-4-phenylindenyl))zirconium dichloride, rac-di-(n-butyl)silylene-bis(1-(2-methyl-4-phenylindenyl))zirconium dichloride, rac-dicyclohexylsilylene-bis(1-(2-methyl-4-phenylindenyl))zirconium dichloride, rac-methylphenylsilylene-bis(1-(2-methyl-4-phenylindenyl))zirconium dichloride, rac-diphenylsilylene-bis(1-(2-methyl-4-phenylindenyl))zirconium dichloride, rac-di(p-tolyl)silylene-bis(1-(2-methyl-4-phenylindenyl))zirconium dichloride, rac-di(p-chlorophenyl)silylene-bis(1-(2-methyl-4-phenylindenyl))zirconium dichloride, rac-methylene-bis(1-(2-methyl-4-phenylindenyl))zirconium dichloride, rac-ethylene-bis(1-(2-methyl-4-phenylindenyl))zirconium dichloride, rac-dimethylgermylene-bis(1-(2-methyl-4-phenylindenyl))zirconium dichloride, rac-dimethylstannylene-bis(1-(2-methyl-4-phenylindenyl))zirconium dichloride, rac-dimethylsilylene-bis(1-(2-methyl-4-phenylindenyl))zirconium dibromide, rac-dimethylsilylene-bis(1-(2-methyl-4-phenylindenyl))zirconium dimethyl, rac-dimethylsilylene-bis(1-(2-methyl-4-phenylindenyl))zirconium methylchloride, rac-dimethylsilylene-bis(1-(2-methyl-4-phenylindenyl))zirconium chloride $SO_2Me$, rac-dimethylsilylene-bis(1-(2-methyl-4-phenylindenyl))zirconium chloride $OSO_2Me$, rac-dimethylsilylene-bis(1-(2-ethyl-4-phenylindenyl))zirconium dichloride, rac-dimethylsilylene-bis(1-(2-ethyl-4-(α-naphthyl)indenyl))zirconium dichloride, rac-dimethylsilylene-bis(1-(2-ethyl-4-(β-naphthyl)indenyl))zirconium dichloride, rac-dimethylsilylene-bis(1-(2-ethyl-4-(2-methyl-1-naphthyl)indenyl))zirconium dichloride, rac-dimethylsilylene-bis(1-(2-ethyl-4-(5-acenaphthyl)indenyl))zirconium dichloride, rac-dimethylsilylene-bis(1-(2-ethyl-4-(9-anthryl)indenyl))zirconium dichloride, rac-dimethylsilylene-bis(1-(2-ethyl-4-(9-phenanthryl)indenyl))zirconium dichloride, rac-dimethylsilylene-bis(1-(2-ethyl-4-(o-methylphenyl)indenyl))zirconium dichloride, rac-dimethylsilylene-bis(1-(2-ethyl-4-(m-methylphenyl)indenyl))zirconium dichloride, rac-dimethylsilylene-bis(1-(2-ethyl-4-(p-methylphenyl)indenyl))zirconium dichloride, rac-dimethylsilylene-bis(1-(2-ethyl-4-(2,3-dimethylphenyl)indenyl))zirconium dichloride, rac-dimethylsilylene-bis(1-(2-ethyl-4-(2,4-dimethylphenyl)indenyl))zirconium dichloride, rac-dimethylsilylene-bis(1-(2-ethyl-4-(2,5-dimethylphenyl)indenyl))zirconium dichloride, rac-dimethylsilylene-bis(1-(2-ethyl-4-(2,4,6-trimethylphenyl)indenyl))zirconium dichloride, rac-dimethylsilylene-bis(1-(2-ethyl-4-(o-chlorophenyl)indenyl))zirconium dichloride, rac-dimethylsilylene-bis(1-(2-ethyl-4-(m-chlorophenyl)indenyl))zirconium dichloride, rac-dimethylsilylene-bis(1-(2-ethyl-4-(p-chlorophenyl)indenyl))zirconium dichloride, rac-dimethylsilylene-bis(1-(2-ethyl-4-(2,3-dichlorophenyl)indenyl))zirconium dichloride, rac-dimethylsilylene-bis(1-(2-ethyl-4-(2,6-dichlorophenyl)indenyl))zirconium dichloride, rac-dimethylsilylene-bis(1-(2-ethyl-4-(3,5-dichlorophenyl)indenyl))zirconium dichloride, rac-dimethylsilylene-bis(1-(2-ethyl-4-(2-bromophenyl)indenyl))zirconium dichloride, rac-dimethylsilylene-bis(1-(2-ethyl-4-(3-bromophenyl)indenyl))zirconium dichloride, rac-dimethylsilylene-bis(1-(2-ethyl-4-(4-bromophenyl)indenyl))zirconium dichloride, rac-dimethylsilylene-bis(1-(2-ethyl-4-(4-biphenylyl)indenyl))zirconium dichloride, rac-dimethylsilylene-bis(1-(2-ethyl-4-(4-trimethylsilylphenyl)indenyl))zirconium dichloride, rac-dimethylsilylene-bis(1-(2-n-propyl-4-phenylindenyl))zirconium dichloride, rac-dimethylsilylene-bis(1-(2-n-propyl-4-(α-naphthyl)indenyl))zirconium dichloride, rac-dimethylsilylene-bis(1-(2-n-propyl-4-(β-naphthyl)indenyl))zirconium dichloride, rac-dimethylsilylene-bis(1-(2-n-propyl-4-(2-methyl-1-naphthyl)indenyl))zirconium dichloride, rac-dimethylsilylene-bis(1-(2-n-propyl-4-(5-acenaphthyl)indenyl))zirconium dichloride, rac-dimethylsilylene-bis(1-(2-n-propyl-4-(9-anthryl)indenyl))zirconium dichloride, rac-dimethylsilylene-bis(1-(2-n-propyl-4-(9-phenanthryl)indenyl))zirconium dichloride, rac-dimethylsilylene-bis(1-(2-i-propyl-4-phenylindenyl))zirconium dichloride, rac-dimethylsilylene-bis(1-(2-i-propyl-4-(α-naphthyl)indenyl))zirconium dichloride, rac-dimethylsilylene-bis(1-(2-i-propyl-4-(β-naphthyl)indenyl))zirconium dichloride, rac-dimethylsilylene-bis(1-(2-i-propyl-4-(8-methyl-9-naphthyl)indenyl))zirconium dichloride, rac-dimethylsilylene-bis(1-(2-i-propyl-4-(5-acenaphthyl)indenyl))zirconium dichloride, rac-dimethylsilylene-bis(1-(2-i-propyl-4-(9-anthryl)indenyl))zirconium dichloride, rac-dimethylsilylene-bis(1-(2-i-propyl-4-(9-phenanthryl)indenyl))zirconium dichloride, rac-dimethylsilylene-bis(1-(2-s-butyl-4-phenylindenyl))zirconium dichloride, rac-dimethylsilylene-bis(1-(2-s-butyl-4-(α-naphthyl)indenyl))zirconium dichloride, rac-dimethylsilylene-bis(1-(2-s-butyl-4-(β-naphthyl)indenyl))zirconium dichloride, rac-dimethylsilylene-bis(1-(2-s-butyl-4-(2-methyl-1-naphthyl)indenyl))zirconium dichloride, rac-dimethylsilylene-bis(1-(2-s-butyl-4-(5-acenaphthyl)

indenyl))zirconium dichloride, rac-dimethylsilylene-bis(1-(2-s-butyl-4-(9-anthryl)indenyl))zirconium dichloride, rac-dimethylsilylene-bis(1-(2-s-butyl-4-(9-phenanthryl)indenyl))zirconium dichloride, rac-dimethylsilylene-bis(1-(2-n-pentyl-4-phenylindenyl))zirconium dichloride, rac-dimethylsilylene-bis(1-(2-n-pentyl-4-(α-naphthyl)indenyl))zirconium dichloride, rac-dimethylsilylene-bis(1-(2-n-butyl-4-phenylindenyl))zirconium dichloride, rac-dimethylsilylene-bis(1-(2-n-butyl-4-(α-naphthyl)indenyl))zirconium dichloride, rac-dimethylsilylene-bis(1-(2-n-butyl-4-(β-naphthyl)indenyl))zirconium dichloride, rac-dimethylsilylene-bis(1-(2-n-butyl-4-(2-methyl-1-naphthyl)indenyl))zirconium dichloride, rac-dimethylsilylene-bis(1-(2-n-butyl-4-(5-acenaphthyl)indenyl))zirconium dichloride, rac-dimethylsilylene-bis(1-(2-n-butyl-4-(9-anthryl)indenyl))zirconium dichloride, rac-dimethylsilylene-bis(1-(2-n-butyl-4-(9-phenanthryl)indenyl))zirconium dichloride, rac-dimethylsilylene-bis(1-(2-i-butyl-4-phenylindenyl))zirconium dichloride, rac-dimethylsilylene-bis(1-(2-i-butyl-4-(α-naphthyl)indenyl))zirconium dichloride, rac-dimethylsilylene-bis(1-(2-i-butyl-4-(β-naphthyl)indenyl))zirconium dichloride, rac-dimethylsilylene-bis(1-(2-i-butyl-4-(2-methyl-1-naphthyl)indenyl))zirconium dichloride, rac-dimethylsilylene-bis(1-(2-i-butyl-4-(5-acenaphthyl)indenyl))zirconium dichloride, rac-dimethylsilylene-bis(1-(2-i-butyl-4-(9-anthryl)indenyl))zirconium dichloride, rac-dimethylsilylene-bis(1-(2-i-butyl-4-(9-phenanthryl)indenyl))zirconium dichloride, rac-dimethylsilylene-bis(1-(2-neopentyl-4-phenylindenyl))zirconium dichloride, rac-dimethylsilylene-bis(1-(2-neopentyl-4-(α-naphthyl)indenyl))zirconium dichloride, rac-dimethylsilylene-bis(1-(2-n-hexyl-4-phenylindenyl))zirconium dichloride, rac-dimethylsilylene-bis(1-(2-n-hexyl-4-(α-naphthyl)indenyl))zirconium dichloride, rac-methylphenylsilylene-bis(1-(2-ethyl-4-phenylindenyl))zirconium dichloride, rac-methylphenylsilylene-bis(1-(2-ethyl-4-(α-naphthyl)indenyl))zirconium dichloride, rac-methylphenylsilylene-bis(1-(2-ethyl-4-(9-anthryl)indenyl))zirconium dichloride, rac-methylphenylsilylene-bis(1-(2-ethyl-4-(9-phenanthryl)indenyl))zirconium dichloride, rac-diphenylsililene-bis(1-(2-ethyl-4-phenylindenyl))zirconium dichloride, rac-diphenylsililene-bis(1-(2-ethyl-4-(α-naphthyl)indenyl))zirconium dichloride, rac-diphenylsililene-bis(1-(2-ethyl-4-(9-anthryl)indenyl))zirconium dichloride, rac-diphenylsililene-bis(1-(2-ehtyl-4-(9-phenanthryl)indenyl))zirconium dichloride, rac-diphenylsililene-bis(1-(2-ethyl-4-(4-biphenylyl)indenyl))zirconium dichloride, rac-methylene-bis(1-(2-ethyl-4-phenylindenyl))zirconium dichloride, rac-methylene-bis(1-(2-ethyl-4-(α-naphthyl)indenyl))zirconium dichloride, rac-ethylene-bis(1-(2-ethyl-4-phenylindenyl))zirconium dichloride, rac-ethylene-bis(1-(2-ethyl-4-(α-naphthyl)indenyl))zirconium dichloride, rac-ethylene-bis(1-(2-n-propyl-4-(α-naphthyl)indenyl))zirconium dichloride, rac-dimethylgermyl-bis(1-(2-ethyl-4-phenylindenyl))zirconium dichloride, rac-dimethylgermyl-bis(1-(2-ethyl-4-(α-naphthyl)indenyl))zirconium dichloride, and rac-dimethylgermyl-bis(1-(2-n-propyl-4-phenylindenyl))zirconium dichloride.

Compounds with which the zirconium in the abovementioned zirconium compounds has been replaced by titanium or hafnium may also be given as examples.

In the present invention, though a racemic composition of a transition metal compound expressed by the general formula (III-4) given above is normally used as the catalyst component, the R form or the S form may be used as well.

Such a transition metal compound expressed by general formula (III-4) may be produced in accordance with pp. 63 to 67 of the Journal of Organometallic Chem. 288 (1985) and the specification and embodiments given in European Patent Application Publication No. 0,320,762.

The transition metal compound represented by the general formula (III-5) shall now be described.

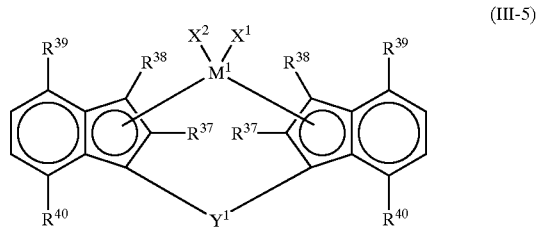

(III-5)

In the above formula, $M^1$ indicates a transition metal atom of group 4 of the periodic table, specifically zirconium, titanium or hafnium, and is preferably zirconium.

$R^{37}$ and $R^{38}$ may be the same or may differ from each other, with each indicating a hydrogen atom or the same kind of hydrocarbon group of 1 to 20 carbon atoms, halogenated hydrocarbon group of 1 to 20 atoms, oxygen-containing group, sulfur-containing group, silicon-containing group, or halogen atom, etc., as L in general formula (III-1) given above, or the same kind of nitrogen-containing group or phosphorus-containing group as $R^{25}$ to $R^{28}$ in general formula (III-3) given above.

Of these, $R^{37}$ is preferably a hydrocarbon group of 1 to 20 carbon atoms and especially preferably a hydrocarbon group of 1 to 3 carbon atoms, such as the methyl, ethyl or propyl. $R^{38}$ is preferably a hydrogen atom or a hydrocarbon group with 1 to 20 carbon atoms and especially preferably a hydrogen atom or a hydrocarbon group with 1 to 3 carbon atoms, such as the methyl, ethyl or propyl.

$R^{39}$ and $R^{40}$ may be the same or may differ from each other, with each indicating an alkyl group of 1 to 20 carbon atoms. Specific examples include linear and branched alkyl groups of 1 to 20 carbon atoms, such as the methyl, ethyl, n-propyl, isopropyl, n-butyl, isobutyl, sec-butyl, tert-butyl, n-pentyl, neopentyl, n-hexyl, cyclohexyl, octyl, nonyl, dodecyl and icosyl; and cycloalkyl groups, such as the norbornyl and adamantyl.

Of the above, $R^{39}$ is preferably a secondary or tertiary alkyl group.

$X^1$ and $X^2$ may be the same or may differ from each other and are respectively defined as being the same as $X^1$ and $X^2$ in the general formula (III-3) given above.

$Y^1$ is defined as being the same as $Y^1$ in the general formula (III-3) given above.

Specific examples of transition metal compounds represented by the above general formula (III-5) include the following; rac-dimethylsilylene-bis(1-(2,7-dimethyl-4-ethylindenyl))zirconium dichloride, rac-dimethylsilylene-bis(1-(2,7-dimethyl-4-n-propylindenyl))zirconium dichloride, rac-dimethylsilylene-bis(1-(2,7-dimethyl-4-i-propylindenyl))zirconium dichloride, rac-dimethylsilylene-bis(1-(2,7-dimethyl-4-n-butylindenyl))zirconium dichloride, rac-dimethylsilylene-bis(1-(2,7-dimethyl-4-sec-butylindenyl))zirconium dichloride, rac-dimethylsilylene-bis(1-(2,7-dimethyl-4-t-butylindenyl))zirconium dichloride, rac-dimethylsilylene-bis(1-(2,7-dimethyl-4-n-pentylindenyl))zirconium dichloride, rac-dimethylsilylene-bis(1-(2,7-dimethyl-4-n-hexylindenyl))zirconium dichloride, rac-dimethylsilylene-bis(1-(2,7-dimethyl-4-cyclohexylindenyl))zirconium dichloride, rac-dimethylsilylene-bis(1-(2,7-dimethyl-4- methylcyclohexylindenyl))zirconium dichloride, rac-dimethylsilylene-bis(1-(2,7-dimethyl-4-phenylethylindenyl))zirconium dichloride, rac-dimethylsilylene-bis(1-(2,7-dimethyl-4-phenyldichloromethylindenyl))zirconium dichloride, rac-dimethylsilylene-bis(1-(2,7-dimethyl-4-chloromethylindenyl))zirconium dichloride, rac-dimethylsilylene-bis(1-(2,7-dimethyl-4-trimethylsilylmethylindenyl))zirconium dichloride, rac-dimethylsilylene-bis(1-(2,7-dimethyl-4-trimethylsiloxymethylindenyl))zirconium dichloride, rac-diethylsilylene-bis(1-(2,7-dimethyl-4-i-propylindenyl))zirconium dichloride, rac-di(i-propyl)silylene-bis(1-(2,7-dimethyl-4-i-propylindenyl))zirconium dichloride, rac-di(n-butyl)silylene-bis(1-(2,7-dimethyl-4-i-propylindenyl))zirconium dichloride, rac-di(cyclohexyl)silylene-bis(1-(2,7-dimethyl-4-i-propylindenyl))zirconium dichloride, rac-methylphenylsilylene-bis(1-(2,7-dimethyl-4-i-propylindenyl))zirconium dichloride, rac-methylphenylsilylene-bis(1-(2,7-dimethyl-4-t-butylindenyl))zirconium dichloride, rac-diphenylsilylene-bis(1-(2,7-dimethyl-4-t-butylindenyl))zirconium dichloride, rac-diphenylsilylene-bis(1-(2,7-dimethyl-4-i-propylindenyl))zirconium dichloride, rac-diphenylsilylene-bis(1-(2,7-dimethyl-4-ethylindenyl))zirconium dichloride, rac-di(p-tolyl)silylene-bis(1-(2,7-dimethyl-4-i-propylindenyl))zirconium dichloride, rac-di(p-chlorophenyl)silylene-bis(1-(2,7-dimethyl-4-i-propylindenyl))zirconium dichloride, rac-dimethylsilylene-bis(1-(2-methyl-4-i-propyl-7-ethylindenyl))zirconium dibromide, rac-dimethylsilylene-bis(1-(2,3,7-trimethyl-4-ethylindenyl))zirconium dichloride, rac-dimethylsilylene-bis(1-(2,3,7-trimethyl-4-n-propylindenyl))zirconium dichloride, rac-dimethylsilylene-bis(1-(2,3,7-trimethyl-4-i-propylindenyl))zirconium dichloride, rac-dimethylsilylene-bis(1-(2,3,7-trimethyl-4-n-butylindenyl))zirconium dichloride, rac-dimethylsilylene-bis(1-(2,3,7-trimethyl-4-sec-butylindenyl))zirconium dichloride, rac-dimethylsilylene-bis(1-(2,3,7-trimethyl-4-t-butylindenyl))zirconium dichloride, rac-dimethylsilylene-bis(1-(2,3,7-trimethyl-4-n-pentylindenyl))zirconium dichloride, rac-dimethylsilylene-bis(1-(2,3,7-trimethyl-4-n-hexylindenyl))zirconium dichloride, rac-dimethylsilylene-bis(1-(2,3,7-trimethyl-4-cyclohexylindenyl))zirconium dichloride, rac-dimethylsilylene-bis(1-(2,3,7-trimethyl-4-methylcyclohexylindenyl))zirconium dichloride, rac-dimethylsilylene-bis(1-(2,3,7-trimethyl-4-trimethylsilylmethylindenyl))zirconium dichloride, rac-dimethylsilylene-bis(1-(2,3,7-trimethyl-4-trimethylsiloxymethylindenyl))zirconium dichloride, rac-dimethylsilylene-bis(1-(2,3,7-trimethyl-4-phenylethylindenyl))zirconium dichloride, rac-dimethylsilylene-bis(1-(2,3,7-trimethyl-4-phenyldichloromethylindenyl))zirconium dichloride, rac-dimethylsilylene-bis(1-(2,3,7-trimethyl-4-chloromethylindenyl))zirconium dichloride, rac-diethylsilylene-bis(1-(2,3,7-trimethyl-4-i-propylindenyl))zirconium dichloride, rac-di(i-propyl)silylene-bis(1-(2,3,7-trimethyl-4-i-propylindenyl))zirconium dichloride, rac-di(n-butyl)silylene-bis(1-(2,3,7-trimethyl-4-i-propylindenyl))zirconium dichloride, rac-di(cyclohexyl)silylene-bis(1-(2,3,7-trimethyl-4-i-propylindenyl))zirconium dichloride, rac-methylphenylsilylene-bis(1-(2,3,7-trimethyl-4-i-propylindenyl))zirconium dichloride, rac-methylphenylsilylene-bis(1-(2,3,7-trimethyl-4-t-butylindenyl))zirconium dichloride, rac-diphenylsilylene-bis(1-(2,3,7-trimethyl-4-t-butylindenyl))zirconium dichloride, rac-diphenylsilylene-bis(1-(2,3,7-trimethyl-4-i-propylindenyl))zirconium dichloride, rac-diphenylsilylene-bis(1-(2,3,7-trimethyl-4-ethylindenyl))zirconium dichloride, rac-di(p-tolyl)silylene-bis(1-(2,3,7-trimethyl-4-i-propylindenyl))zirconium dichloride, rac-di(p-chlorophenyl)silylene-bis(1-(2,3,7-trimethyl-4-i-propylindenyl))zirconium dichloride, rac-dimethylsilylene-bis(1-(2-methyl-4-i-propyl-7-methylindenyl))zirconium dimethyl, rac-dimethylsilylene-bis(1-(2-methyl-4-i-propyl-7-methylindenyl))zirconium methylchloride, rac-dimethylsilylene-bis(1-(2-methyl-4-i-propyl-7-methylindenyl))zirconium-bis(methanesulfonate), rac-dimethylsilylene-bis(1-(2-methyl-4-i-propyl-7-methylindenyl))zirconium-bis(p-phenylsulfinate), rac-dimethylsilylene-bis(1-(2-methyl-3-methyl-4-i-propyl-7-methylindenyl))zirconium dichloride, rac-dimethylsilylene-bis(1-(2-methyl-4,6-di-i-propylindenyl))zirconium dichloride, rac-dimethylsilylene-bis(1-(2-ethyl-4-i-propyl-7-methylindenyl))zirconium dichloride, rac-dimethylsilylene-bis(1-(2-phenyl-4-i-propyl-7-methylindenyl))zirconium dichloride, rac-dimethylsilylene-bis(1-(2-methylindenyl))zirconium dichloride, rac-ethylene-bis(1-(2,4,7-trimethylindenyl))zirconium dichloride and rac-isopropylidene-bis(1-(2,4,7-trimethylindenyl))zirconium dichloride.

Compounds with which the zirconium in the abovementioned zirconium compounds has been replaced by titanium or hafnium may also be given as examples.

Among the above, compounds having a branched alkyl group, such as the i-propyl, sec-butyl or tert-butyl at the fourth position are especially preferable.

In the present invention, though a racemic composition of a transition metal compound represented by the general formula (III-5) given above is normally used as the catalyst component, the R form or the S form may be used as well.

Such a transition metal compound represented by general formula (III-5) may be produced by a known method, for example, the method described in Japanese Laid-open Patent Publication No. 268307/1992.

The transition metal compound represented by the following general formula (IV) shall now be described.

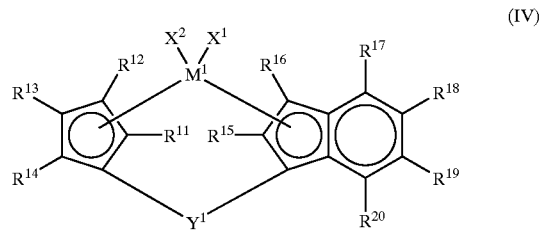

(IV)

In the formula, $M^1$ indicates a transition metal atom of group 4 of the periodic table, specifically zirconium, titanium or hafnium, and is preferably zirconium.

$R^{11}$ to $R^{20}$ may be the same or may differ from each other, with each indicating a hydrocarbon group of 1 to 40 carbon atoms, halogenated hydrocarbon group of 1 to 40 carbon atoms, oxygen-containing group, sulfur-containing group, silicon-containing group, halogen atom or hydrogen atom, etc.

Specific examples of hydrocarbon groups of 1 to 40 carbons include alkyl groups of 1 to 20 atoms, such as the methyl, ethyl, propyl, butyl, hexyl, cyclohexyl, octyl, nonyl, dodecyl and icosyl; aryl groups of 6 to 20 carbon atoms, such as the phenyl, α- and β-naphthyl, biphenyryl, anthryl and phenanthryl; arylalkyl groups of 7 to 40 carbon atoms, such as the benzyl, phenylethyl, phenylpropyl, phenanthrylmethyl, phenanthrylethyl and phenanthrylpropyl; arylalkenyl groups of 8 to 40 carbon atoms, such as the vinylphenanthryl; alkylaryl groups of 7 to 40 carbon atoms, such as the methylphenanthryl, ethylphenanthryl and propylphenanthryl, and alkenyl groups of 2 to 10 carbon atoms, such as the vinyl, propenyl and cyclohexenyl.

Examples of halogenated hydrocarbon groups of 1 to 40 carbon atoms include groups with which the abovementioned hydrocarbon groups of 1 to 40 carbon atoms have been substituted with halogen.

The same groups and atoms given as examples above for general formula (III-1) may be given as examples of oxygen-containing groups, sulfur-containing groups, silicon-containing groups and halogen atoms.

Combinations of two adjacent groups among $R^{11}$ to $R^{20}$, for example, $R^{11}$ and $R^{12}$, $R^{13}$ and $R^{14}$, and $R^{15}$ and $R^{16}$ may be linked mutually to form aromatic rings respectively along with the carbon atoms bonded to the respective groups, and these aromatic rings may be substituted with a hydrocarbon group of 1 to 40 carbon atoms, halogenated hydrocarbon group of 1 to 40 carbon atoms, oxygen-containing group, sulfur-containing group, silicon-containing group, halogen atom, etc.

In this case, the transition metal compound represented by general formula (IV) is expressed by any of the following general formulae (i) to (iv).

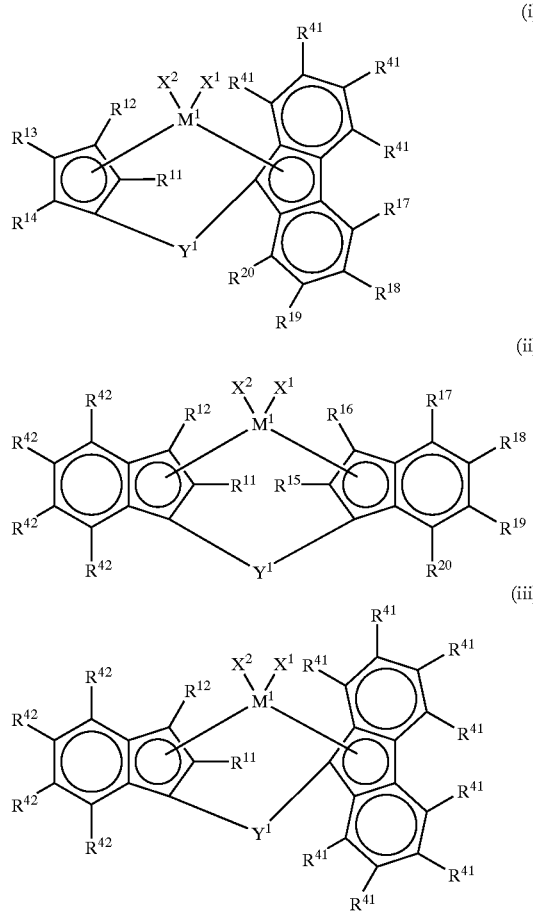

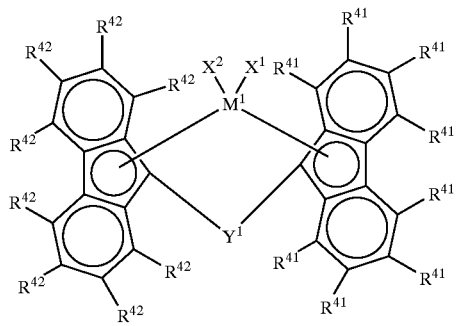

In the formulae, $R^{41}$ to $R^{42}$ may be the same or may differ from each other, with each indicating a hydrocarbon group of 1 to 40 carbon atoms, halogenated hydrocarbon group of 1 to 40 carbon atoms, oxygen-containing group, sulfur-containing group, silicon-containing group, halogen atom or hydrogen atom, and specific examples thereof include the same groups and atoms as those given as examples of $R^{11}$ to $R^{20}$ in the general formula (IV) given above.

$X^1$ and $X^2$ may be the same or may differ from each other and are respectively defined as being the same as $X^1$ and $X^2$ in the general formula (III-3) given above.

$Y^1$ is defined as being the same as $Y^1$ in the general formula (III-3) given above.

Specific examples of transition metal compounds represented by the general formula (IV) given above include the following; ethylene-bis(indenyl)dimethyl zirconium, ethylene-bis(indenyl)zirconium dichloride, ethylene-bis(indenyl)zirconiumbis(trifluoromethanesulfonate), ethylene-bis(indenyl)zirconium bis(methanesulfonate), ethylene-bis(indenyl)zirconium bis(p-toluenesulfonate), ethylene-bis(indenyl)zirconiumbis(p-chlorobenzenesulfonate), ethylene-bis(4,5,6,7-tetrahydroindenyl)zirconium dichloride, isopropylidene-bis(cyclopentadienyl)(fluorenyl)zirconium dichloride, dimethylsilylene-bis(indenyl)zirconium dichloride, dimethylsilylene-bis(indenyl)zirconium bis (trifluoromethanesulfonate), dimethylsilylene-bis(4,5,6,7-tetrahydroindenyl)zirconium dichloride, dimethylsilylene-bis(cyclopentadienyl)(fluorenyl)zirconium dichloride, diphenylsilylene-bis(indenyl)zirconium dichloride, methylphenylsilylene-bis(indenyl)zirconium dichloride, isopropylidene-(cyclopentadienyl)(fluorenyl)zirconium dichloride, dimethylsilylene-(3-tert-butylcyclopentadienyl)(indenyl)zirconium dichloride, isopropylidene-(4-methylcyclopentadienyl)(3-methylindenyl)zirconium dichloride, isopropylidene-(4-tert-butylcyclopentadienyl)(3-methylindenyl)zirconium dichloride, isopropylidene-(4-tert-butylcyclopentadienyl)(3-tert-butylindenyl)zirconium dichloride, dimethylsilylene-(4-methylcyclopentadienyl)(3-methylindenyl)zirconium dichloride, dimethylsilylene-(4-tert-butylcyclopentadienyl)(3-methylindenyl)zirconium dichloride, dimethylsilylene-(4-tert-butylcyclopentadienyl)(3-tert-butylindenyl)zirconium dichloride, dimethylsilylene-(3-tert-butylcyclopentadienyl)(fluorenyl)zirconium dichloride, and isopropylidene-(3-tert-butylcyclopentadienyl)(fluorenyl)zirconium dichloride.

Compounds with which the zirconium in the abovementioned zirconium compounds has been replaced by titanium or hafnium may also be given as examples.

Further examples include the compounds given as examples of the transition metal compounds represented by the general formulae (III-4) and (III-5) given above.

Transition metal compounds represented by the general formula (IV) given above include the compounds represented by the following general formulae (iii-1) and (iii-2).

First, the compounds represented by general formula (iii-1) shall be described.

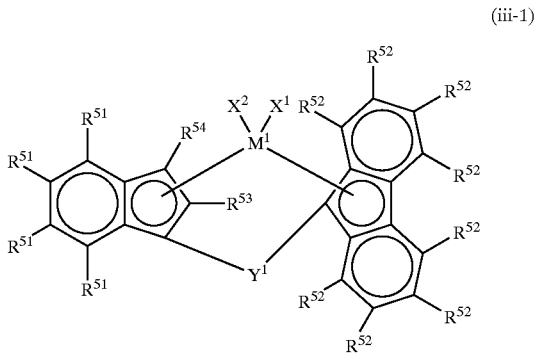

(iii-1)

In the above formula, $M^1$ indicates a transition metal atom of group 4 of the periodic table, specifically zirconium, titanium or hafnium, and is preferably zirconium.

The $R^{51}$'s may be the same or may differ from each other, with at least one or more of them being an aryl group of 11 to 20 carbon atoms, an arylalkyl group of 12 to 40 carbon atoms, an arylalkenyl group of 13 to 40 carbon atoms, an alkylaryl group of 12 to 40 carbon atoms, a silicon-containing group, or at least two adjacent groups among the groups indicated by $R^{51}$ may form a single or a plurality of aromatic or aliphatic ring or rings together with the carbon atoms bonded to the respective groups. In this case, each ring formed by the $R^{51}$'s has 4 to 20 carbon atoms as a whole, including the carbon atoms bonded to the $R^{51}$'s.

Examples of the single or plurality of aromatic or aliphatic ring or rings formed by at least two adjacent groups among groups indicated by $R^{51}$ together with the carbon atoms bonded to the respective groups include fused phenyl groups, fused cyclohexyl groups, fused cyclopentadienyl groups, fused dihydrocyclopentadienyl groups, fused indenyl groups, fused tetrahydroindenyl, fused fluorenyl groups, fused tetrahydrofluorenyl groups, fused octahydrofluorenyl groups, etc.

More specific examples of the case where at least two adjacent groups among groups indicated by $R^{51}$ and the carbon atoms bonded to the respective groups form a single or plurality of aromatic or aliphatic ring or rings are compounds in which the $R^{51}$'s at positions 4 and 5 of the indenyl group are bonded together to form a bivalent hydrocarbon group of 4 to 20 carbon atoms.

Such compound is represented by the following general formula (iii-1').

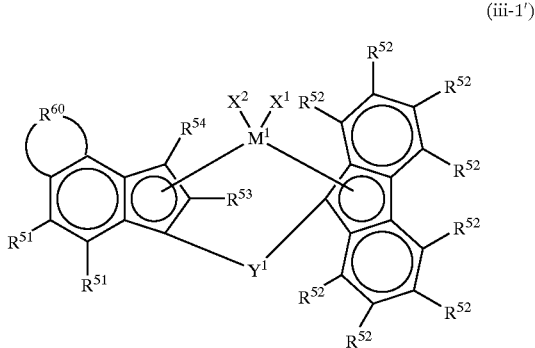

(iii-1')

An example of $R^{60}$ in the above general formula (iii-1') is the following structure in which an aromatic ring is formed along with the carbons at positions 4 and 5 of the indenyl group.

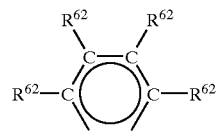

(In the above formula, $R^{62}$'s may be the same or may differ from each other, with each indicating a hydrogen atom or an alkyl group of 1 to 3 carbon atoms.)

The single or plurality of aromatic or aliphatic ring or rings formed by at least two adjacent groups among groups indicated by $R^{51}$ and the carbon atoms bonded to the respective groups may be substituted with a chain alkyl group, cyclic alkyl group, halogen atom, halogen-substituted alkyl group, aryl group, silicon-containing group, oxygen-containing group, nitrogen-containing group, or phosphorus-containing group.

Each of the $R^{51}$'s other than the aryl groups, arylalkyl groups, arylalkenyl groups, alkylaryl groups, and the $R^{51}$'s that form an aromatic or aliphatic ring, is a hydrogen atom, halogen atom, alkyl group of 1 to 10 carbon atoms or silicon-containing group.

Examples of aryl groups of 11 to 20 carbon atoms include the biphenylyl, anthryl and phenanthryl,
examples of arylalkyl groups of 12 to 40 carbon atoms include the phenanthrylmethyl, phenanthrylethyl and phenanthrylpropyl,
examples of arylalkenyl groups of 13 to 40 carbon atoms include the vinylphenanthryl,
examples of alkylaryl groups of 12 to 40 carbon atoms include the methylphenanthryl, ethylphenanthryl and propylphenanthryl,
examples of halogen atoms include fluorine, chlorine, bromine and iodine, and
examples of alkyl groups of 1 to 10 carbon atoms include the methyl, ethyl, propyl, butyl, hexyl, cyclohexyl, octyl and nonyl.

Examples of silicon-containing groups include the methylsilyl, phenylsilyl, dimethylsilyl, diethylsilyl, diphenylsilyl, trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl.

The abovementioned alkyl groups, aryl groups, arylalkyl groups, arylalkenyl groups and alkylaryl groups may be substituted with halogen.

The $R^{52}$'s may be the same or may differ from each other, with each indicating a hydrogen atom, halogen atom, alkyl group of 1 to 10 carbon atoms, aryl group of 6 to 20 carbon atoms, alkenyl group of 2 to 10 carbon atoms, arylalkyl group of 7 to 40 carbon atoms, arylalkenyl group of 8 to 40 carbon atoms, alkylaryl group of 7 to 40 carbon atoms, silicon-containing group, oxygen-containing group, sulfur-containing group, nitrogen-containing group or phosphorus-containing group.

At least two adjacent groups among the groups indicated by $R^{52}$ may form a single or a plurality of aromatic or aliphatic ring or rings together with the carbon atoms bonded to the respective groups. In this case, each ring formed by the $R^{52}$'s has 4 to 20 carbon atoms as a whole, including the carbon atoms bonded to the $R^{52}$'s, and the $R^{52}$'s other than the $R^{52}$'s that form an aromatic or aliphatic ring is a hydrogen atom, halogen atom, alkyl group of 1 to 10 carbon atoms or silicon-containing group.

Examples of the groups made up by the forming of a single or plurality of aromatic or aliphatic ring or rings by two groups indicated by $R^{52}$ include the form in which the fluorenyl group takes on the following structure.

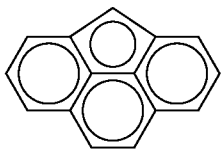

Examples of alkyl groups of 1 to 10 carbon atoms and examples of halogen atoms include the same groups and atoms given above.

Examples of aryl groups of 6 to 20 carbon atoms include the phenyl, biphenyl, α- and β-naphthyl, anthryl and phenanthryl, examples of arylalkyl groups of 7 to 40 carbon atoms include the benzyl, phenylethyl, phenylpropyl, phenanthrylmethyl, phenanthrylethyl and phenanthrylpropyl, examples of arylalkenyl groups of 8 to 40 carbon atoms include the styryl and vinylphenanthryl, examples of alkylaryl groups of 7 to 40 carbon atoms include the tolyl, dimethylphenyl, trimethylphenyl, ethylphenyl, propylphenyl, methylnaphthyl, methylphenanthryl, ethylphenanthryl and propylphenanthryl, examples of alkenyl groups of 2 to 10 carbon atoms include the vinyl, propyl and cyclohexenyl, examples of silicon-containing groups include the same groups as mentioned above, examples of oxygen-containing groups and sulfur-containing groups include the same groups as that given for L in the above-described general formula (III-1), and examples of nitrogen-containing groups and phosphorus-containing groups include the same groups as that given for $R^{25}$ to $R^{28}$ in the above-described general formula (III-3).

Of the above, $R^{52}$ is preferably a hydrogen atom or alkyl group and especially preferably a hydrogen atom or hydrocarbon group of 1 to 3 carbon atoms, namely the methyl, ethyl or propyl.

2,7-dialkyl-fluorenyl groups may given as favorable examples of a fluorenyl group having a substituent group such as $R^{52}$, and examples of the alkyl group of the 2,7-dialkyl in this case include alkyl groups of 1 to 5 carbon atoms.

The $R^{51}$'s and $R^{52}$'s described above may be the same or may differ from each other.

$R^{53}$ and $R^{53}$ may be the same or may differ from each other, with each indicating the same hydrogen atom, halogen atom, alkyl group of 1 to 10 carbon atoms, aryl group of 6 to 20 carbon atoms, alkenyl group of 2 to 10 carbon atoms, arylalkyl group of 7 to 40 carbon atoms, arylalkenyl group of 8 to 40 carbon atoms, alkylaryl group of 7 to 40 carbon atoms, silicon-containing group, oxygen-containing group, sulfur-containing group, nitrogen-containing group, or phosphorus-containing group as mentioned above.

Of the above, at least one of either $R^{53}$ or $R^{54}$ is preferably an alkyl group of 1 to 3 carbon atoms.

$X^4$ and $X^5$ may be the same or may differ from each other, with each indicating the same hydrogen atom, halogen atom, hydrocarbon group of 1 to 20 carbon atoms, halogenated hydrocarbon group of 1 to 20 carbon atoms, oxygen-containing group, sulfur-containing group or nitrogen-containing group as those given above for $X^1$ and $X^2$ in the above-described general formula (III-3) or $X^4$ and $X^5$ may form a conjugated diene residual.

Specific examples of the conjugated diene residual formed by $X^4$ and $X^5$ include $\eta^4$-1,4-diphenyl-1,3-butadiene, $\eta^4$-1,3-butadiene, $\eta^4$-1,4-dibenyzl-1,3-butadiene, $\eta^4$-1-phenyl-1,3-pentadiene, $\eta^4$-3-methyl-1,3-pentadiene, $\eta^4$-1,4-bis(trimethylsilyl)-1,3-butadiene, 2,3-dimethylbutadiene, $\eta^4$-2,4-hexadiene and isoprene. Of these, the 1,3-butadiene, 2,4-hexadiene, 1-phenyl-1,3-pentadiene and 1,4-diphenylbutadiene residues are preferable, and these residual groups may be substituted with a hydrocarbon group with 1 to 10 carbon atoms.

Of the above, $X^4$ or $X^5$ is preferably a halogen atom, hydrocarbon group of 1 to 20 carbon atoms or sulfur-containing group.

$Y^1$ is defined as being the same as $Y^1$ in the above-described general formula (III-3). Among the examples given, $Y^1$ is preferably a bivalent hydrocarbon group of 1 to 5 carbon atoms, bivalent silicon-containing group or bivalent germanium-containing group, more preferably a bivalent silicon-containing group, and especially preferably an alkylsilylene, alkylarylsilylene or arylsilylene group. Also among such bivalent groups, groups with which the shortest linking part of —$Y^1$— is formed from one or two atoms are preferable.

Specific examples of transition metal compounds represented by the above-described general formula (iii-1) include the following; ethylene(2-methyl-4(9-phenanthryl)-1-indenyl)(9-fluorenyl)zirconium dichloride, ethylene(2-methyl-4(9-phenanthryl)-1-indenyl)(2,7-dimethyl-9-fluorenyl)zirconium dichloride, ethylene(2-methyl-4(9-phenanthryl)-1-indenyl)(2,7-di-t-butyl-9-fluorenyl)zirconium dichloride, ethylene(2-methyl-4,5-benzo-1-indenyl)(9-fluorenyl)zirconium dichloride, ethylene(2-methyl-4,5-benzo-1-indenyl)(2,7-dimethyl-9-fluorenyl)zirconium dichloride, ethylene(2-methyl-4,5-benzo-1-indenyl)(2,7-di-t-butyl-9-fluorenyl)zirconium dichloride, ethylene(2-methyl-4,5-benzo-1-indenyl)(2,7-dibromo-9-fluorenyl)zirconium dichloride, ethylene(2,6-dimethyl-4,5-benzo-1-indenyl)(2,7-di-t-butyl-9-fluorenyl)zirconium dichloride, ethylene(2,6-dimethyl-4,5-benzo-1-indenyl)(2,7-dibromo-9-fluorenyl)zirconium dichloride, ethylene(2-methyl-α-acenaphtho-1-indenyl) (9-fluorenyl)zirconium dichloride, ethylene(2-methyl-α-acenaphtho-1-indenyl) (2,7-dimethyl-9-fluorenyl)zirconium dichloride, ethylene(2-methyl-α-acenaphtho-1-indenyl) (2,7-di-t-butyl-9-fluorenyl)zirconium dichloride, dimethylsilylene(2-methyl-4(9-phenanthryl)-1-indenyl)(9-fluorenyl)zirconium dichloride, dimethylsilylene(2-n-propyl-4(9-phenanthryl)-1-indenyl)(9-fluorenyl)zirconium dichloride, dimethylsilylene(2-methyl-4(9-phenanthryl)-1-indenyl)(2,7-dimethyl-9-fluorenyl)zirconium dichloride, dimethylsilylene(2-methyl-4(9-phenanthryl)-1-indenyl)(2,7-di-t-butyl-9-fluorenyl)zirconium dichloride, dimethylsilylene(2-methyl-4,5-benzo-1-indenyl)(9-fluorenyl)zirconium dichloride, dimethylsilylene(2-methyl-4,5-benzo-1-indenyl)(2,7-dimethyl-9-fluorenyl)zirconium dichloride, dimethylsilylene(2-methyl-4,5-benzo-1-indenyl) (2,7-di-t-butyl-9-fluorenyl)zirconium dichloride, dimethylsilylene(2-methyl-α-acenaphtho-1-indenyl) (9-fluorenyl)zirconium dichloride, dimethylsilylene(2-methyl-α-acenaphtho-1-indenyl) (2,7-dimethyl-9-fluorenyl) zirconium dichloride, dimethylsilylene(2-methyl-α-acenaphtho-1-indenyl) (2,7-di-t-butyl-9-fluorenyl)

zirconium dichloride, diphenylsilylene(2-methyl-4(9-phenanthryl)-1-indenyl)(9-fluorenyl)zirconium dichloride, diphenylsilylene(2-methyl-4(9-phenanthryl)-1-indenyl)(2,7-dimethyl-9-fluorenyl)zirconium dichloride, diphenylsilylene(2-methyl-4(9-phenanthryl)-1-indenyl)(2,7-di-t-butyl-9-fluorenyl)zirconium dichloride, diphenylsilylene(2-methyl-4,5-benzo-1-indenyl)(9-fluorenyl)zirconium dichloride, diphenylsilylene(2-methyl-4,5-benzo-1-indenyl)(2,7-dimethyl-9-fluorenyl)zirconium dichloride, diphenylsilylene(2-methyl-4,5-benzo-1-indenyl) (2,7-di-t-butyl-9-fluorenyl)zirconium dichloride, diphenylsilylene(2-methyl-α-acenaphtho-1-indenyl) (9-fluorenyl)zirconium dichloride, diphenylsilylene(2-methyl-α-acenaphtho-1-indenyl) (2,7-dimethyl-9-fluorenyl)zirconium dichloride, diphenylsilylene(2-methyl-α-acenaphtho-1-indenyl) (2,7-di-t-butyl-9-fluorenyl)zirconium dichloride, methylphenylsilylene(2-methyl-4(9-phenanthryl)-1-indenyl)(9-fluorenyl)zirconium dichloride, methylphenylsilylene(2-methyl-4(9-phenanthryl)-1-indenyl)(2,7-dimethyl-9-fluorenyl)zirconium dichloride, methylphenylsilylene(2-methyl-4(9-phenanthryl)-1-indenyl)(2,7-di-t-butyl-9-fluorenyl)zirconium dichloride, methylphenylsilylene(2-methyl-4,5-benzo-1-indenyl)(9-fluorenyl)zirconium dichloride, methylphenylsilylene(2-methyl-4,5-benzo-1-indenyl)(2,7-dimethyl-9-fluorenyl)zirconium dichloride, methylphenylsilylene(2-methyl-4,5-benzo-1-indenyl)(2,7-di-t-butyl-9-fluorenyl)zirconium dichloride, methylphenylsilylene(2-methyl-α-acenaphtho-1-indenyl)(9-fluorenyl)zirconium dichloride, methylphenylsilylene(2-methyl-α-acenaphtho-1-indenyl)(2,7-dimethyl-9-fluorenyl)zirconium dichloride, methylphenylsilylene(2-methyl-α-acenaphtho-1-indenyl)(2,7-di-t-butyl-9-fluorenyl)zirconium dichloride, ethylene(3-methyl-4(9-phenanthryl)-1-indenyl)(9-fluorenyl)zirconium dichloride, ethylene(3-methyl-4(9-phenanthryl)-1-indenyl) (2,7-dimethyl-9-fluorenyl)zirconium dichloride, ethylene(3-methyl-4(9-phenanthryl)-1-indenyl)(2,7-di-t-butyl-9-fluorenyl)zirconium dichloride, ethylene(3-methyl-4,5-benzo-1-indenyl)(9-fluorenyl)zirconium dichloride, ethylene(3-methyl-4,5-benzo-1-indenyl)(2,7-dimethyl-9-fluorenyl)zirconium dichloride, ethylene(3-methyl-4,5-benzo-1-indenyl) (2,7-di-t-butyl-9-fluorenyl)zirconium dichloride, ethylene(3-methyl-α-acenaphtho-1-indenyl) (9-fluorenyl)zirconium dichloride, ethylene(3-methyl-α-acenaphtho-1-indenyl) (2,7-dimethyl-9-fluorenyl)zirconium dichloride, ethylene(3-methyl-α-acenaphtho-1-indenyl) (2,7-di-t-butyl-9-fluorenyl)zirconium dichloride, dimethylsilylene(3-methyl-4(9-phenanthryl)-1-indenyl)(9-fluorenyl)zirconium dichloride, dimethylsilylene(3-methyl-4(9-phenanthryl)-1-indenyl)(2,7-dimethyl-9-fluorenyl) zirconium dichloride, dimethylsilylene(3-methyl-4(9-phenanthryl)-1-indenyl)(2,7-di-t-butyl-9-fluorenyl) zirconium dichloride, dimethylsilylene(3-methyl-4,5-benzo-1-indenyl)(9-fluorenyl)zirconium dichloride, dimethylsilylene(3-methyl-4,5-benzo-1-indenyl)(2,7-dimethyl-9-fluorenyl)zirconium dichloride, dimethylsilylene(3-methyl-4,5-benzo-1-indenyl)(2,7-di-t-butyl-9-fluorenyl)zirconium dichloride, dimethylsilylene(3-methyl-α-acenaphtho-1-indenyl) (9-fluorenyl)zirconium dichloride, dimethylsilylene(3-methyl-α-acenaphtho-1-indenyl) (2,7-dimethyl-9-fluorenyl)zirconium dichloride, dimethylsilylene(3-methyl-α-acenaphtho-1-indenyl) (2,7-di-t-butyl-9-fluorenyl)zirconium dichloride, diphenylsilylene(3-methyl-4(9-phenanthryl)-1-indenyl)(9-fluorenyl)zirconium dichloride, diphenylsilylene(3-methyl-4(9-phenanthryl)-1-indenyl)(2,7-dimethyl-9-fluorenyl) zirconium dichloride, diphenylsilylene(3-methyl-4(9-phenanthryl)-1-indenyl)(2,7-di-t-butyl-9-fluorenyl) zirconium dichloride, diphenylsilylene(3-methyl-4,5-benzo-1-indenyl)(9-fluorenyl)zirconium dichloride, diphenylsilylene(3-methyl-4,5-benzo-1-indenyl)(2,7-dimethyl-9-fluorenyl)zirconium dichloride, diphenylsilylene(3-methyl-4,5-benzo-1-indenyl)(2,7-di-t-butyl-9-fluorenyl)zirconium dichloride, diphenylsilylene(3-methyl-α-acenaphtho-1-indenyl) (9-fluorenyl)zirconium dichloride, diphenylsilylene(3-methyl-α-acenaphtho-1-indenyl) (2,7-dimethyl-9-fluorenyl)zirconium dichloride, diphenylsilylene(3-methyl-α-acenaphtho-1-indenyl) (2,7-di-t-butyl-9-fluorenyl)zirconium dichloride, methylphenylsilylene(3-methyl-4(9-phenanthryl)-1-indenyl)(9-fluorenyl)zirconium dichloride, methylphenylsilylene(3-methyl-4(9-phenanthryl)-1-indenyl)(2,7-dimethyl-9-fluorenyl)zirconium dichloride, methylphenylsilylene(3-methyl-4(9-phenanthryl)-1-indenyl)(2,7-di-t-butyl-9-fluorenyl)zirconium dichloride, methylphenylsilylene(3-methyl-4,5-benzo-1-indenyl)(9-fluorenyl)zirconium dichloride, methylphenylsilylene(3-methyl-4,5-benzo-1-indenyl)(2,7-dimethyl-9-fluorenyl) zirconium dichloride, methylphenylsilylene(3-methyl-4,5-benzo-1-indenyl)(2,7-di-t-butyl-9-fluorenyl)zirconium dichloride, methylphenylsilylene(3-methyl-α-acenaphtho-1-indenyl)(9-fluorenyl)zirconium dichloride, methylphenylsilylene(3-methyl-α-acenaphtho-1-indenyl)(2,7-dimethyl-9-fluorenyl)zirconium dichloride, methylphenylsilylene(3-methyl-α-acenaphtho-1-indenyl)(2,7-di-t-butyl-9-fluorenyl)zirconium dichloride, ethylene(2-methyl-4,5-benzo-1-indenyl)(2,7-ditrimethylsilyl-9-fluorenyl)zirconium dichloride, ethylene(2,6-dimethyl-4,5-benzo-1-indenyl)(2,7-di-t-butyl-9-fluorenyl)zirconium dichloride, ethylene(2,7-dimethyl-4,5-benzo-1-indenyl)(2,7-di-t-butyl-9-fluorenyl)zirconium dichloride, ethylene(2,7-dimethyl-4,5-(2-methyl-benzo)-1-indenyl)(2,7-di-t-butyl-9-fluorenyl)zirconium dichloride, dimethylsilylene(2-methyl-4,5-benzo-1-indenyl)(2,7-ditrimethylsilyl-9-fluorenyl) zirconium dichloride, dimethylsilylene(2-methyl-4,5-benzo-1-indenyl)(2,7-di-t-butyl-9-fluorenyl)zirconium bis (methanesulfonate), dimethylsilylene(2-methyl-4,5-benzo-1-indenyl)(2,7-di-t-butyl-9-fluorenyl)zirconium bis (trifluoromethanesulfonate), dimethylsilylene(2,6-dimethyl-4,5-benzo-1-indenyl)(2,7-di(trimethylsilyl)-9-fluorenyl) zirconium dichloride, dimethylsilylene(2,6-dimethyl-4,5-benzo-1-indenyl)(2,7-di(trimethylsilyl)-9-fluorenyl) zirconium bis(methanesulfonate), dimethylsilylene(2,6-dimethyl-4,5-benzo-1-indenyl)(2,7-di(trimethylsilyl)-9-fluorenyl)zirconium bis(trifluoromethanemethanesulfonate), dimethylsilylene(2,6-dimethyl-4,5-benzo-1-indenyl)(2,7-di-t-butyl-9-fluorenyl)zirconium dichloride, dimethylsilylene (2,7-dimethyl-4,5-benzo-1-indenyl)(2,7-di-t-butyl-9-fluorenyl)zirconium dichloride, dimethylsilylene(2,7-dimethyl-4,5-(2-methyl-benzo)-1-indenyl)(2,7-di-t-butyl-9-fluorenyl)zirconium dichloride, dimethylsilylene(2-methyl-4,5-benzo-1-indenyl)(2,7-dibromo-9-fluorenyl)zirconium dichloride, dimethylsilylene(2,6-dimethyl-4,5-benzo-1-indenyl)(2,7-dibromo-9-fluorenyl)zirconium dichloride, dimethylsilylene(2-methyl-4,5-benzo-1-indenyl)(2,7-di-t-butoxy-9-fluorenyl)zirconium dichloride, dimethylsilylene (2,6-dimethyl-4,5-benzo-1-indenyl)(2,7-di-t-butoxy-9-fluorenyl)zirconium dichloride, dimethylsilylene(2-methyl-4,5-benzo-1-indenyl)(2,7-diphenyl-9-fluorenyl)zirconium dichloride, dimethylsilylene(2,6-dimethyl-4,5-benzo-1-indenyl)(2,7-diphenyl-9-fluorenyl)zirconium dichloride, dimethylsilylene(2-methyl-4,5-benzo-1-indenyl)(2,7-di-i-propyl-9-fluorenyl)zirconium dichloride, dimethylsilylene (2,6-dimethyl-4,5-benzo-1-indenyl)(2,7-di-i-propyl-9- fluorenyl)zirconium dichloride, dimethylsilylene(2,6-dimethyl-4,5-benzo-1-indenyl)(2,7-dimethyl-9-fluorenyl)zirconium dichloride, dimethylsilylene(2,6-dimethyl-4,5-(1-methyl-benzo)-1-indenyl)(2,7-di-t-butyl-9-fluorenyl)zirconium dichloride, dimethylsilylene(2,7-dimethyl-4,5-(2-methyl-benzo)-1-indenyl)(2,7-di(trimethylsilyl)-9-fluorenyl)zirconium dichloride, dimethylsilylene(2,7-dimethyl-4,5-(2-methyl-benzo)-1-indenyl)(2,7-dibromo-9-fluorenyl)zirconium dichloride, dimethylsilylene(2,7-dimethyl-4,5-(2-methyl-benzo)-1-indenyl)(2,7-di-t-butoxy-9-fluorenyl)zirconium dichloride, dimethylsilylene(2,7-dimethyl-4,5-(2-methyl-benzo)-1-indenyl)(2,7-diphenyl-9-fluorenyl)zirconium dichloride, dimethylsilylene(2,7-dimethyl-4,5-(2-methyl-benzo)-1-indenyl)(2,7-di-i-propyl-9-fluorenyl)zirconium dichloride, dimethylsilylene(2,7-dimethyl-4,5-(2-methyl-benzo)-1-indenyl)(2,7-dimethyl-9-fluorenyl)zirconium dichloride, dimethylsilylene(2,7-dimethyl-4,5-(1-methyl-benzo)-1-indenyl)(2,7-di-t-butyl-9-fluorenyl)zirconium dichloride, dimethylsilylene(2,7-dimethyl-4,5-(1-methyl-benzo)-1-indenyl)(2,7-di(trimethylsilyl)-9-fluorenyl)zirconium dichloride, dimethylsilylene(2,7-dimethyl-4,5-(1-methyl-benzo)-1-indenyl)(2,7-dibromo-9-fluorenyl)zirconium dichloride, dimethylsilylene(2,7-dimethyl-4,5-(1-methyl-benzo)-1-indenyl)(2,7-di-t-butoxy-9-fluorenyl)zirconium dichloride, dimethylsilylene(2,7-dimethyl-4,5-(1-methyl-benzo)-1-indenyl)(2,7-diphenyl-9-fluorenyl)zirconium dichloride, dimethylsilylene(2,7-dimethyl-4,5-(1-methyl-benzo)-1-indenyl)(2,7-di-i-propyl-9-fluorenyl)zirconium dichloride, dimethylsilylene(2,7-dimethyl-4,5-(1-methyl-benzo)-1-indenyl)(2,7-dimethyl-9-fluorenyl)zirconium dichloride, dimethylsilylene(2-methyl-4,5-benzo-1-indenyl)(2,7-dibromo-9-fluorenyl)zirconium bis(methanesulfonate), dimethylsilylene(2,6-dimethyl-4,5-benzo-1-indenyl)(2,7-dibromo-9-fluorenyl)zirconium bis(methanesulfonate), dimethylsilylene(2-methyl-4,5-benzo-1-indenyl)(2,7-di-t-butoxy-9-fluorenyl)zirconium bis(methanesulfonate), dimethylsilylene(2,6-dimethyl-4,5-benzo-1-indenyl)(2,7-di-t-butoxy-9-fluorenyl)zirconium bis(methanesulfonate), dimethylsilylene(2-methyl-4,5-benzo-1-indenyl)(2,7-diphenyl-9-fluorenyl)zirconium bis(methanesulfonate), dimethylsilylene(2,6-dimethyl-4,5-benzo-1-indenyl)(2,7-diphenyl-9-fluorenyl)zirconium bis(methanesulfonate), dimethylsilylene(2-methyl-4,5-benzo-1-indenyl)(2,7-di-i-propyl-9-fluorenyl)zirconium bis(methanesulfonate), dimethylsilylene(2,6-dimethyl-4,5-benzo-1-indenyl)(2,7-di-i-propyl-9-fluorenyl)zirconium bis(methanesulfonate), dimethylsilylene(2,6-dimethyl-4,5-benzo-1-indenyl)(2,7-dimethyl-9-fluorenyl)zirconium bis(methanesulfonate), dimethylsilylene(2,7-dimethyl-4,5-(2-methyl-benzo)-1-indenyl)(2,7-di(trimethylsilyl)-9-fluorenyl)zirconium bis(methanesulfonate), dimethylsilylene(2,7-dimethyl-4,5-(2-methyl-benzo)-1-indenyl)(2,7-dibromo-9-fluorenyl)zirconium bis(methanesulfonate), dimethylsilylene(2,7-dimethyl-4,5-(2-methyl-benzo)-1-indenyl)(2,7-di-t-butoxy-9-fluorenyl)zirconium bis(methanesulfonate), dimethylsilylene(2,7-dimethyl-4,5-(2-methyl-benzo)-1-indenyl)(2,7-diphenyl-9-fluorenyl)zirconium bis(methanesulfonate), dimethylsilylene(2,7-dimethyl-4,5-(2-methyl-benzo)-1-indenyl)(2,7-di-i-propyl-9-fluorenyl)zirconium bis(methanesulfonate), dimethylsilylene(2,7-dimethyl-4,5-(2-methyl-benzo)-1-indenyl)(2,7-dimethyl-9-fluorenyl)zirconium bis(methanesulfonate), dimethylsilylene(2,7-dimethyl-4,5-(1-methyl-benzo)-1-indenyl)(2,7-di-t-butyl-9-fluorenyl)zirconium bis(methanesulfonate), dimethylsilylene(2,7-dimethyl-4,5-(1-methyl-benzo)-1-indenyl)(2,7-di(trimethylsilyl)-9-fluorenyl)zirconium bis(methanesulfonate), dimethylsilylene(2,7-dimethyl-4,5-(1-methyl-benzo)-1-indenyl)(2,7-dibromo-9-fluorenyl)zirconium bis(methanesulfonate), dimethylsilylene(2,7-dimethyl-4,5-(1-methyl-benzo)-1-indenyl)(2,7-di-t-butoxy-9-fluorenyl)zirconium bis(methanesulfonate), dimethylsilylene(2,7-dimethyl-4,5-(1-methyl-benzo)-1-indenyl)(2,7-diphenyl-9-fluorenyl)zirconium bis(methanesulfonate), dimethylsilylene(2,7-dimethyl-4,5-(1-methyl-benzo)-1-indenyl)(2,7-di-i-propyl-9-fluorenyl)zirconium bis(methanesulfonate), dimethylsilylene(2,7-dimethyl-4,5-(1-methyl-benzo)-1-indenyl)(2,7-dimethyl-9-fluorenyl)zirconium bis(methanesulfonate), dimethylsilylene(2-methyl-4,5-benzo-1-indenyl)(2,7-dibromo-9-(4,5-methylenephenanthryl))zirconium dichloride, dimethylsilylene(2,6-dimethyl-4,5-benzo-1-indenyl)(2,7-dibromo-9-(4,5-methylenephenanthryl))zirconium dichloride, dimethylsilylene(2-methyl-4,5-benzo-1-indenyl)(2,7-di-t-butoxy-9-(4,5-methylenephenanthryl))zirconium dichloride, dimethylsilylene(2,6-dimethyl-4,5-benzo-1-indenyl)(2,7-di-t-butoxy-9-(4,5-methylenephenanthryl))zirconium dichloride, dimethylsilylene(2-methyl-4,5-benzo-1-indenyl)(2,7-diphenyl-9-(4,5-methylenephenanthryl))zirconium dichloride, dimethylsilylene(2,6-dimethyl-4,5-benzo-1-indenyl)(2,7-diphenyl-9-(4,5-methylenephenanthryl))zirconium dichloride, dimethylsilylene(2-methyl-4,5-benzo-1-indenyl)(2,7-di-i-propyl-9-(4,5-methylenephenanthryl))zirconium dichloride, dimethylsilylene(2,6-dimethyl-4,5-benzo-1-indenyl)(2,7-di-i-propyl-9-(4,5-methylenephenanthryl))zirconium dichloride, dimethylsilylene(2,6-dimethyl-4,5-benzo-1-indenyl)(2,7-dimethyl-9-(4,5-methylenephenanthryl))zirconium dichloride, dimethylsilylene(2,7-dimethyl-4,5-(2-methyl-benzo)-1-indenyl)(2,7-di(trimethylsilyl)-9-(4,5-methylenephenanthryl))zirconium dichloride, dimethylsilylene(2,7-dimethyl-4,5-(2-methyl-benzo)-1-indenyl)(2,7-dibromo-9-(4,5-methylenephenanthryl))zirconium dichloride, dimethylsilylene(2,7-dimethyl-4,5-(2-methyl-benzo)-1-indenyl)(2,7-di-t-butoxy-9-(4,5-methylenephenanthryl))zirconium dichloride, dimethylsilylene(2,7-dimethyl-4,5-(2-methyl-benzo)-1-indenyl)(2,7-diphenyl-9-(4,5-methylenephenanthryl))zirconium dichloride, dimethylsilylene(2,7-dimethyl-4,5-(2-methyl-benzo)-1-indenyl)(2,7-di-i-propyl-9-(4,5-methylenephenanthryl))zirconium dichloride, dimethylsilylene(2,7-dimethyl-4,5-(2-methyl-benzo)-1-indenyl)(2,7-dimethyl-9-(4,5-methylenephenanthryl))zirconium dichloride, dimethylsilylene(2,7-dimethyl-4,5-(1-methyl-benzo)-1-indenyl)(2,7-di-t-butyl-9-(4,5-methylenephenanthryl))zirconium dichloride, dimethylsilylene(2,7-dimethyl-4,5-(1-methyl-benzo)-1-indenyl)(2,7-di(trimethylsilyl)-9-(4,5-methylenephenanthryl))zirconium dichloride, dimethylsilylene(2,7-dimethyl-4,5-(1-methyl-benzo)-1-indenyl)(2,7-dibromo-9-(4,5-methylenephenanthryl))zirconium dichloride, dimethylsilylene(2,7-dimethyl-4,5-(1-methyl-benzo)-1-indenyl)(2,7-di-t-butoxy-9-(4,5-methylenephenanthryl))zirconium dichloride, dimethylsilylene(2,7-dimethyl-4,5-(1-methyl-benzo)-1-indenyl)(2,7-diphenyl-9-(4,5-methylenephenanthryl))zirconium dichloride, dimethylsilylene(2,7-dimethyl-4,5-(1-methyl-benzo)-1-indenyl)(2,7-di-i-propyl-9-(4,5-methylenephenanthryl))zirconium dichloride, dimethylsilylene(2,7-dimethyl-4,5-(1-methyl-benzo)-1-indenyl)(2,7-dimethyl-9-(4,5-methylenephenanthryl))zirconium dichloride, dimethylsilylene(2-methyl-4,5-benzo-1-indenyl)(2,7-di-t-butyl-9-(4,5-methylenephenanthryl))

zirconium dichloride, dimethylsilylene(2-methyl-4,5-benzo-1-indenyl)(2,7-di(trimethylsilyl)-9-(4,5-methylenephenanthryl))zirconium dichloride, dimethylsilylene(2,6-dimethyl-4,5-benzo-1-indenyl)(2,7-di-t-butyl-9-(4,5-methylenephenanthryl))zirconium dichloride, dimethylsilylene(2,6-dimethyl-4,5-benzo-1-indenyl)(2,7-di(trimethylsilyl)-9-(4,5-methylenephenanthryl))zirconium dichloride, dimethylsilylene(2,7-dimethyl-4,5-(2-methyl-benzo)-1-indenyl)(2,7-di-t-butyl-9-(4,5-methylenephenanthryl))zirconium dichloride, dimethylsilylene(2,7-dimethyl-4,5-(2-methyl-benzo)-1-indenyl)(2,7-di(trimethylsilyl)-9-(4,5-methylenephenanthryl))zirconium dichloride, dimethylmethylene(2-methyl-4,5-benzo-1-indenyl)(2,7-dibromo-9-fluorenyl)zirconium dichloride, dimethylmethylene(2,6-dimethyl-4,5-benzo-1-indenyl)(2,7-dibromo-9-fluorenyl)zirconium dichloride, dimethylmethylene(2-methyl-4,5-benzo-1-indenyl)(2,7-di-t-butoxy-9-fluorenyl)zirconium dichloride, dimethylmethylene(2,6-dimethyl-4,5-benzo-1-indenyl)(2,7-di-t-butoxy-9-fluorenyl)zirconium dichloride, dimethylmethylene(2-methyl-4,5-benzo-1-indenyl)(2,7-diphenyl-9-fluorenyl)zirconium dichloride, dimethylmethylene(2,6-dimethyl-4,5-benzo-1-indenyl)(2,7-diphenyl-9-fluorenyl)zirconium dichloride, dimethylmethylene(2-methyl-4,5-benzo-1-indenyl)(2,7-di-i-propyl-9-fluorenyl)zirconium dichloride, dimethylmethylene(2,6-dimethyl-4,5-benzo-1-indenyl)(2,7-di-i-propyl-9-fluorenyl)zirconium dichloride, dimethylmethylene(2,6-dimethyl-4,5-benzo-1-indenyl)(2,7-dimethyl-9-fluorenyl)zirconium dichloride, dimethylmethylene(2,7-dimethyl-4,5-(2-methyl-benzo)-1-indenyl)(2,7-di(trimethylsilyl)-9-fluorenyl)zirconium dichloride, dimethylmethylene(2,7-dimethyl-4,5-(2-methyl-benzo)-1-indenyl)(2,7-dibromo-9-fluorenyl)zirconium dichloride, dimethylmethylene (2,7-dimethyl-4,5-(2-methyl-benzo)-1-indenyl)(2,7-di-t-butoxy-9-fluorenyl)zirconium dichloride, dimethylmethylene(2,7-dimethyl-4,5-(2-methyl-benzo)-1-indenyl)(2,7-diphenyl-9-fluorenyl)zirconium dichloride, dimethylmethylene(2,7-dimethyl-4,5-(2-methyl-benzo)-1-indenyl)(2,7-di-i-propyl-9-fluorenyl)zirconium dichloride, dimethylmethylene(2,7-dimethyl-4,5-(2-methyl-benzo)-1-indenyl)(2,7-dimethyl-9-fluorenyl)zirconium dichloride, dimethylmethylene(2,7-dimethyl-4,5-(1-methyl-benzo)-1-indenyl)(2,7-di-t-butyl-9-fluorenyl)zirconium dichloride, dimethylmethylene(2,7-dimethyl-4,5-(1-methyl-benzo)-1-indenyl)(2,7-di(trimethylsilyl)-9-fluorenyl)zirconium dichloride, dimethylmethylene(2,7-dimethyl-4,5-(1-methyl-benzo)-1-indenyl)(2,7-dibromo-9-fluorenyl)zirconium dichloride, dimethylmethylene(2,7-dimethyl-4,5-(1-methyl-benzo)-1-indenyl)(2,7-di-t-butoxy-9-fluorenyl)zirconium dichloride, dimethylmethylene(2,7-dimethyl-4,5-(1-methyl-benzo)-1-indenyl)(2,7-diphenyl-9-fluorenyl)zirconium dichloride, dimethylmethylene(2,7-dimethyl-4,5-(1-methyl-benzo)-1-indenyl)(2,7-di-i-propyl-9-fluorenyl)zirconium dichloride, dimethylmethylene(2,7-dimethyl-4,5-(1-methyl-benzo)-1-indenyl)(2,7-dimethyl-9-fluorenyl)zirconium dichloride, dimethylmethylene(2-methyl-4,5-benzo-1-indenyl)(2,7-di-t-butyl-9-fluorenyl)zirconium dichloride, dimethylmethylene(2-methyl-4,5-benzo-1-indenyl)(2,7-di(trimethyisilyl)-9-fluorenyl)zirconium dichloride, dimethylmethylene(2,6-dimethyl-4,5-benzo-1-indenyl)(2,7-di-t-butyl-9-fluorenyl)zirconium dichloride, dimethylmethylene(2,6-dimethyl-4,5-benzo-1-indenyl)(2,7-di(trimethylsilyl)-9-fluorenyl)zirconium dichloride, dimethylmethylene(2,7-dimethyl-4,5-(2-methyl-benzo)-1-indenyl)(2,7-di-t-butyl-9-fluorenyl)zirconium dichloride, dimethylmethylene(2,7-dimethyl-4,5-(2-methyl-benzo)-1-indenyl)(2,7-di(trimethylsilyl)-9-fluorenyl)zirconium dichloride, dimethylsilylene(2-methyl-4,5-benzo-1-indenyl)(2,7-di-t-butyl-9-fluorenyl)zirconium$\eta^4$-1-phenyl-1,3-pentadiene, dimethylsilylene(2-methyl-4,5-benzo-1-indenyl)(2,7-di(trimethylsilyl)-9-fluorenyl)zirconium$\eta^4$-1,4-diphenylbutadiene, dimethylsilylene(2-methyl-4,5-benzo-1-indenyl)(2,7-dibromo-9-fluorenyl)zirconium$\eta^4$-2,4-hexadiene, dimethylsilylene(2,6-dimethyl-4,5-benzo-1-indenyl)(2,7-di-t-butyl-9-fluorenyl)zirconium$\eta^4$-1,4-diphenyl-1,3-butadiene, dimethylsilylene(2,6-dimethyl-4,5-benzo-1-indenyl)(2,7-di(trimethylsilyl)-9-fluorenyl)zirconium$\eta^4$-3-methyl-1,3-pentadiene, dimethylsilylene(2,6-dimethyl-4,5-benzo-1-indenyl)(2,7-dibromo-9-fluorenyl)zirconium$\eta^4$-2,4-hexadiene, diphenylsilylene(2-methyl-4,5-benzo-1-indenyl)(2,7-ditrimethylsilyl-9-fluorenyl)zirconium dichloride, diphenylsilylene(2,6-dimethyl-4,5-benzo-1-indenyl)(2,7-di-t-butyl-9-fluorenyl)zirconium dichloride, diphenylsilylene(2,7-dimethyl-4,5-benzo-1-indenyl)(2,7-di-t-butyl-9-fluorenyl)zirconium dichloride, diphenylsilylene(2,7-dimethyl-4,5-(2-methyl-benzo)-1-indenyl)(2,7-di-t-butyl-9-fluorenyl)zirconium dichloride, methylphenylsilylene(2-methyl-4,5-benzo-1-indenyl)(2,7-di(trimethyl)silyl-9-fluorenyl)zirconium dichloride, methylphenylsilylene(2,6-dimethyl-4,5-benzo-1-indenyl)(2,7-di-t-butyl-9-fluorenyl)zirconium dichloride, methylphenylsilylene(2,7-dimethyl-4,5-benzo-1-indenyl)(2,7-di-t-butyl-9-fluorenyl)zirconium dichloride, methylphenylsilylene(2,7-dimethyl-4,5-(2-methyl-benzo)-1-indenyl)(2,7-di-t-butyl-9-fluorenyl)zirconium dichloride, ethylene(2-methyl-7-trimethylsilyl-4,5-benzo-1-indenyl)(2,7-di-t-butyl-9-fluorenyl)zirconium dichloride, and dimethylsilylene(2-methyl-7-trimethylsilyl-4,5-(1-methyl-benzo)-1-indenyl)(2,7-di-t-butyl-9-fluorenyl)zirconium dichloride.

Compounds with which the zirconium in the abovementioned zirconium compounds has been replaced by titanium or hafnium may also be given as examples.

Next, the compound represented by general formula (iii-2) shall be described.

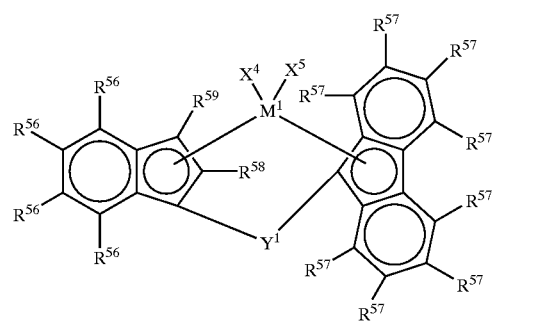

(iii-2)

In the above formula, $M^1$ indicates a transition metal atom of group 4 of the periodic table, specifically zirconium, titanium or hafnium, and is preferably zirconium.

The $R^{56}$'s may be the same or may differ from each other, with each being a hydrogen atom, halogen atom, alkyl group of 1 to 10 carbon atoms, aryl group of 6 to 10 carbon atoms, alkenyl group of 2 to 10 carbon atoms, silicon-containing group, oxygen-containing group, sulfur-containing group, nitrogen-containing group or phosphorus-containing group.

Specific examples of halogens and alkyl groups of 1 to 10 carbon atoms include the same atoms and groups as those given for $R^{51}$ in the above-described general formula (iii-1), and specific examples of silicon-containing groups, oxygen-containing groups, sulfur-containing groups, nitrogen-containing groups and phosphorus-containing group include the same groups as those given for $R^{52}$ in the above-described formula (iii-1).

Examples of aryl group of 6 to 10 carbon atoms include the phenyl and α- and β-naphthyl groups, and examples of alkenyl groups of 2 to 10 carbon atoms include the vinyl, propenyl and cyclohexenyl groups.

The abovementioned alkyl groups and alkenyl groups may be substituted with halogen.

Of the above, $R^{56}$ is preferably an alkyl group, aryl group or hydrogen atom and especially preferably a hydrocarbon group of 1 to 3 carbon atoms, namely the methyl, ethyl, n-propyl or i-propyl, an aryl group, such as the phenyl, α-naphthyl or β-naphthyl, or a hydrogen atom.

The $R^{57}$'s may be the same or may differ from each other, with each being a hydrogen atom, halogen atom, alkyl group of 1 to 10 carbon atoms, aryl group of 6 to 20 carbon atoms, alkenyl group of 2 to 10 carbon atoms, arylalkyl group of 7 to 40 carbon atoms, arylalkenyl group of 8 to 40 carbon atoms, alkylaryl group of 7 to 40 carbon atoms, silicon-containing group, oxygen-containing group, sulfur-containing group, nitrogen-containing group or phosphorus-containing group, and specific examples thereof include the same atoms and groups given for $R^{52}$ in the above-described general formula (iii-1).

The abovementioned alkyl groups, aryl groups, alkenyl groups, arylalkyl groups, arylalkenyl groups and alkylaryl groups may be substituted with halogen.

Of the above, $R^{57}$ is preferably a hydrogen atom or alkyl group and especially preferably a hydrogen atom or hydrocarbon group of 1 to 4 carbon atoms, namely the methyl, ethyl, n-propyl, i-propyl, n-butyl or tert-butyl.

The above-described $R^{56}$ and $R^{57}$ may be the same or may differ from each other.

One of either $R^{58}$ or $R^{59}$ is alkyl group of 1 to 5 carbon atoms, and the other one is the same hydrogen atom, halogen atom, alkyl group of 1 to 10 carbon atoms, alkenyl group of 2 to 10 carbon atoms, silicon-containing group, oxygen-containing group, sulfur-containing group, nitrogen-containing group or phosphorus-containing group as $R^{52}$ in the above-described general formula (iii-1).

Examples of alkyl groups of 1 to 5 carbon atoms include the methyl, ethyl propyl, butyl and pentyl. Of these, one of either $R^{58}$ or $R^{59}$ is preferably an alkyl group of 1 to 3 carbons, such as the methyl, ethyl or propyl group, etc., with the other being a hydrogen atom.

$X^4$ and $X^5$ may be the same or may differ from each other and are the same as $X^4$ and $X^5$ in the above-described general formula (iii-1). Of the examples given, each of $X^4$ and $X^5$ is preferably a halogen atom or a hydrocarbon group of 1 to 20 carbon atoms.

$Y^1$ is the same as the $Y^1$ in the above-described general-formula (III-3).

Of these, $Y^1$ is preferably a bivalent hydrocarbon group of 1 to 5 carbon atoms, a bivalent silicon-containing group or bivalent germanium-containing group, more preferably a bivalent silicon-containing group, and especially preferably an alkylsilylene, alkylarylsilylene or arylsilylene group.

Specific examples of transition metal compounds represented by the above-described general formula (iii-2) include the following; ethylene(2-methyl-1-indenyl)(9-fluorenyl)zirconium dichloride, dimethylsilylene(2-methyl-1-indenyl)(9-fluorenyl)zirconium dichloride, diphenylsilylene(2-methyl-1-indenyl)(9-fluorenyl)zirconium dichloride, methylphenylsilylene(2-methyl-1-indenyl)(9-fluorenyl)zirconium dichloride, ethylene(3-methyl-1-indenyl)(9-fluorenyl)zirconium dichloride, dimethylsilylene(3-methyl-1-indenyl)(9-fluorenyl)zirconium dichloride, diphenylsilylene(3-methyl-1-indenyl)(9-fluorenyl)zirconium dichloride, methylphenylsilylene(3-methyl-1-indenyl)(9-fluorenyl)zirconium dichloride, ethylene(2-methyl-1-indenyl)(2,7-di-tert-butyl-9-fluorenyl)zirconium dichloride, dimethylsilylene(2-methyl-1-indenyl)(2,7-di-tert-butyl-9-fluorenyl)zirconium dichloride, diphenylsilylene(2-methyl-1-indenyl)(2,7-di-tert-butyl-9-fluorenyl)zirconium dichloride, methylphenylsilylene(2-methyl-1-indenyl)(2,7-di-tert-butyl-9-fluorenyl)zirconium dichloride, ethylene(2-methyl-4-phenyl-1-indenyl)(9-fluorenyl)zirconium dichloride, dimethylsilylene(2-methyl-4-phenyl-1-indenyl)(9-fluorenyl)zirconium dichloride, diphenylsilylene(2-methyl-4-phenyl-1-indenyl)(9-fluorenyl)zirconium dichloride, methylphenylsilylene(2-methyl-4-phenyl-1-indenyl)(9-fluorenyl)zirconium dichloride, ethylene(2-methyl-4-phenyl-1-indenyl)(2,7-di-tert-butyl-9-fluorenyl)zirconium dichloride, dimethylsilylene(2-methyl-4-phenyl-1-indenyl)(2,7-di-tert-butyl-9-fluorenyl)zirconium dichloride, diphenylsilylene(2-methyl-4-phenyl-1-indenyl)(2,7-di-tert-butyl-9-fluorenyl)zirconium dichloride, methylphenylsilylene(2-methyl-4-phenyl-1-indenyl)(2,7-di-tert-butyl-9-fluorenyl)zirconium dichloride, ethylene(2-methyl-4-naphthyl-1-indenyl)(9-fluorenyl)zirconium dichloride, dimethylsilylene(2-methyl-4-naphthyl-1-indenyl)(9-fluorenyl)zirconium dichloride, diphenylsilylene(2-methyl-4-naphthyl-1-indenyl)(9-fluorenyl)zirconium dichloride, methylphenylsilylene(2-methyl-4-naphthyl-1-indenyl)(9-fluorenyl)zirconium dichloride, ethylene(2-methyl-4-naphthyl-1-indenyl)(2,7-di-tert-butyl-9-fluorenyl)zirconium dichloride, dimethylsilylene(2-methyl-4-naphthyl-1-indenyl)(2,7-di-tert-butyl-9-fluorenyl)zirconium dichloride, diphenylsilylene(2-methyl-4-naphthyl-1-indenyl)(2,7-di-tert-butyl-9-fluorenyl)zirconium dichloride, methylphenylsilylene(2-methyl-4-naphthyl-1-indenyl)(2,7-di-tert-butyl-9-fluorenyl)zirconium dichloride and the like.

Compounds with which the zirconium in the abovementioned zirconium compounds has been replaced by titanium or hafnium may also be given as examples.

Compound represented by the above-described general formula (IV) may be used alone or in combination of two or more.

Transition metal compounds represented by the general formula (iii-1) or (iii-2) given above can be synthesized for example by the method described in Japanese Laid-open Patent Publication No. 235313/1997.

Next, the. transition metal compound represented by general formula (V) shall be described.

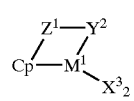

(V)

In the formula, $M^1$ indicates a transition metal atom of group 4 of the periodic table, specifically zirconium, titanium or hafnium, and is preferably zirconium.

Cp indicates a cyclopentadienyl group or derivative thereof that is π-bonded to $M^1$.

$Z^1$ indicates a ligand, which contains an oxygen atom, sulfur atom, boron atom, or an atom of group 14 of the periodic table, and is for example, $—Si(R^{22}_2)—$, $—C(R^{22}_2)—$, $—Si(R^{22}_2)Si(R^{22}_2)—$, $—C(R^{22}_2)C(R^{22}_2)—$, $—C(R^{22}_2)C(R^{22}_2)C(R^{22}_2)—$, $—C(R^{22})=C(R^{22})—$, $—C(R^{22}_2)Si(R^{22}_2)—$, $—Ge(R^{22}_2)—$, etc.

$Y^2$ indicates a ligand, which contains a nitrogen atom, phosphorus atom, oxygen atom or sulfur atom, and is for example —N($R^{23}$)—, —O—, —S—, —P($R^{23}$)—, etc.

$Z^1$ and $Y^2$ may form a fused ring.

The abovementioned $R^{22}$ is a group selected from among the hydrogen atom and alkyl, aryl, silyl, halogenated alkyl, and halogenated aryl groups having up to 20 non-hydrogen atoms and combinations of such groups. $R^{23}$ is an alkyl group of 1 to 10 carbon atoms, aryl group of 6 to 10 carbon atoms or aralkyl group of 7 to 10 carbon atoms, and may form a fused ring system with up to 30 non-hydrogen atoms with one or more $R^{22}$'s.

The $X^3$'s may be the same or may differ from each other, with each indicating a hydrogen atom, halogen atom, hydrocarbon group, which has 20 or less carbon atoms and may have one or two or more double bonds, silyl group containing 20 or less silicon atoms, or germyl group containing a germanium atom.

Specific examples of transition metal compounds represented by the general formula (V) given above include the following; (tert-butylamide)(tetramethyl-$\eta^5$-cyclopentadienyl)-1,2-ethanediylzirconium dichloride, (tert-butylamide)(tetramethyl-$\eta^5$-cyclopentadienyl)-1,2-ethanediyltitanium dichloride, (methylamide)(tetramethyl-$\eta^5$-cyclopentadienyl)-1,2-ethanediylzirconium dichloride, (methylamide)(tetramethyl-$\eta^5$-cyclopentadienyl)-1,2-ethanediyltitanium dichloride, (ethylamide)(tetramethyl-$\eta^5$-cyclopentadienyl)-methylenetitanium dichloride, (tert-butylamide)dimethyl(tetramethyl-$\eta^5$-cyclopentadienyl)silanetitanium dichloride, (tert-butylamide)dimethyl(tetramethyl-$\eta^5$-cyclopentadienyl)silanezirconium dichloride, (benzylamide)dimethyl-(tetramethyl-$\eta^5$-cyclopentadienyl)silanetitanium dichloride, and (phenylphosphide)dimethyl-(tetramethyl-$\eta^5$-cyclopentadienyl)silanezirconium dibenzyl.

The transition metal compound represented by the above-described general formula (V) may be used alone or in combination of two or more.

(B-1) Organoaluminum Oxycompound

The organoaluminum oxycompound (B-1) used in the present invention may be a known aluminoxane (also referred to as "alumoxane") or may also be a benzene-insoluble organoaluminum oxycompound exemplified in Japanese Laid-open Patent Publication No. 78687/1990.

Conventionally known aluminoxanes may be produced for example by the methods described below and are normally obtained in the form of a hydrocarbon solution.

(1) A method in which organoaluminum compound such as trialkylaluminum is added to a hydrocarbon medium suspension of a compound containing adsorbed water or a salt containing water of crystallization, such as hydrated magnesium chloride, hydrated copper sulfate, hydrated aluminum sulfate, hydrated nickel sulfate, hydrated cerous chloride, etc., to thereby reacts the adsorbed water or water of crystallization with the organoaluminum compound.

(2) A method in which water, ice or water vapor is directly reacted with organoaluminum compound such as trialkylaluminum in medium such as benzene, toluene, ethyl ether or tetrahydrofuran.

(3) A method in which organotin oxide such as dimethyltin oxide, dibutyltin oxide is reacted with organoaluminum compound such as trialkylaluminum in medium such as decane, benzene or toluene.

This aluminoxane may contain a small amount of organometallic components. Also, the solvent or unreacted organoaluminum compound may be distilled off and removed from the recovered aluminoxane solution mentioned above and the aluminoxane may thereafter be redissolved in the solvent.

Specific examples of organoaluminum compounds used in preparing aluminoxane include trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, etc.; tricycloalkylaluminums, such as tricyclohexylaluminum, tricyclooctylaluminum, etc.; dialkylaluminum halides, such as dimethylaluminum chloride, diethylaluminum chloride, diethylaluminum bromide, diisobutylaluminum chloride, etc.; dialkylaluminum hydrides, such as diethylaluminum hydride, diisobutylaluminum hydride, etc.; dialkylaluminum alkoxides, such as dimethylaluminum methoxide, diethylaluminum ethoxide, etc.; and dialkylaluminum aryloxides, such as diethylaluminum phenoxide, etc.

Among the above, trialkylaluminums and tricycloalkylaluminums are especially preferable.

Also, an isoprenylaluminum, represented by the formula (i—$C_4H_9$)$_x$Al$_y$($C_5H_{10}$)$_z$ (wherein x, y and z are each a positive number, and $z \geq 2x$) may be used as the organoaluminum compound to be used in preparing the aluminoxane.

Two or more of the abovementioned organoaluminum compounds may be used in combination.

Examples of solvents to be used in preparing aluminoxane include hydrocarbon solvents including aromatic hydrocarbons, such as benzene, toluene, xylene, cumene, cymene, etc.; aliphatic hydrocarbons, such as pentane, hexane, heptane, octane, decane, dodecane, hexadecane, octadecane, etc.; alicyclic hydrocarbons, such as cyclopentane, cyclohexane, cyclooctane, methylcyclopentane, etc.; petroleum distillates, such as gasoline, kerosene, gas oil, etc.; and halogenated products (chlorine compounds, bromine compounds, etc.) of the abovementioned aromatic hydrocarbons, aliphatic hydrocarbons, and alicyclic hydrocarbons. Ethers, such as ethyl ether, tetrahydrofuran, etc., may also be used. Of such solvents, aromatic hydrocarbons are especially preferable.

(B-2) Compounds That React With the Abovementioned Transition Metal Compound to Form an Ion Pair Examples of the compounds (B-2) used in this invention that react with the abovementioned transition metal compound to form an ion pair (may be referred to hereinafter as "ionizing ionic compounds") include the Lewis acids, ionic compounds, borane compounds and carborane compounds described in Japanese Laid-Open Publication Nos. 501956/1989, 502036/1989, 179005/1991, 179006/1991, 207703/1991 and 207704/1991 and U.S. Pat. No. 5,321,106, etc.

Examples of the Lewis acids include magnesium-containing Lewis acids, aluminum-containing Lewis acids, boron-containing Lewis acids, and among these, boron-containing Lewis acids are preferable.

Specific examples of Lewis acids containing a boron atom include compounds represented by the following formula (VI).

BR'R''R'''       (VI)

(In the above formula, R', R'', and R''' may be the same or may differ from each other, with each indicating a phenyl group which may have a substituent group such as a fluorine atom, methyl group, trifluoromethyl group, etc., or a fluorine atom.)

Specific examples of compounds represented by the above general formula (VI) include trifluoroboron, triphenylboron, tris(4-fluorophenyl)boron, tris(3,5-difluorophenyl)boron, tris (4-fluoromethylphenyl)boron, tris (pentafluorophenyl)boron, tris (p-tolyl)boron, tris (o-tolyl) boron, tris (3,5-dimethylphenyl)boron, tris{3,5-di (trifluoromethylphenyl)}boron, etc. Among these, tris (pentafluorophenyl)boron is especially preferable.

Ionic compounds are salts comprising a cationic compound and an anionic compound. The anion reacts with the above-mentioned transition compound to make the transition compound cationic and to form an ion pair to thereby stabilize the transition metal cationic species. Examples of such an anion include organoboron compound anions, organoarsenic compound anions, and organoaluminum compound anions. Preferable are anions which are relatively bulky and stabilize the transition metal cationic species. Examples of cations include metal cations, organometallic cations, carbonium cations, tripium cations, oxonium cations, sulfonium cations, phosphonium cations, ammonium cations, etc. More specifically, there can be mentioned triphenylcarbenium cation, tributylammonium cation, N,N-dimethylammonium cation, ferrocenium cation, etc.

Among the above, ionic compounds containing a boron compound as the anion are preferable, with specific examples including trialkyl-substituted ammonium salts, such as triethylammonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tributylammonium tetra(pentafluorophenyl)boron, tripropylammonium tetra(o, p-dimethylphenyl)boron, tributylammonium tetra(m,m-dimethylphenyl)boron, tributylammonium tetra(p-trifluoromethylphenyl)boron, tri(n-butyl)ammonium tetra (o-tolyl)boron, tri(n-butyl)ammonium tetra(4-fluorophenyl) boron, etc.; N,N-dialkylanilinium salts, such as N,N-dimethylanilinium tetra(phenyl)boron, N,N-diethylanilinium tetra(phenyl)boron, N,N-2,4,6-pentamethylanilinium tetra(phenyl)boron, etc.; dialkylammonium salts, such as di(n-propyl)ammonium tetra(pentafluorophenyl)boron, dicyclohexylammonium tetra(phenyl)boron, etc.; and triarylphosphonium salts, such as triphenylphosphonium tetra(phenyl)boron, tri (methylphenyl)phosphonium tetra(phenyl)boron, tri (dimethylphenyl)phosphonium tetra(phenyl)boron, etc.

Also, triphenylcarbenium tetrakis(pentafluorophenyl) borate, N,N-dimethylanilinium tetrakis(pentafluorophenyl) borate, and ferrocenium tetra(pentafluorophenyl) borate may also be given as examples of ionic compounds containing a boron atom.

Further, the following ionic compounds containing a boron atom are also employable. (In the ionic compounds enumerated below, the counter ion is tri(n-butyl)ammonium, but the counter ion is in no way limited thereto.)

That is, there can be mentioned salts of anion, for example, bis(tri(n-butyl)ammonium)nonaborate, bis(tri(n-butyl)ammonium)decaborate, bis(tri(n-butyl)ammonium) undecaborate, bis(tri(n-butyl)ammonium)dodecaborate, bis (tri(n-butyl)ammonium)decachlorodecaborate, bis(tri(n-butyl)ammonium)dodecachlorododecaborate, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, and tri(n-butyl)ammoniumbromo-1-carbadodecaborate.

As borane compounds, carbolan complex compounds and carbolan anionic salts, employable are decaborane(14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium 6-carbadecaborate(14), tri(n-butyl) ammonium 6-carbadecaborate(12), tri(n-butyl)ammonium 7-carbaundecaborate(13), tri(n-butyl)ammonium 7,8-dicarbaundecabrate(12), tri(n-butyl)ammonium 2,9-dicarbaundecaborate(12), tri(n-butyl) ammoniumdodecahydride-8-methyl7,9-dicarbaundecaborate, tri(n-butyl)ammoniumundecahydride-8-ethyl-7,9-dicarbaundecaborate, tri(n-butyl) ammoniumundecahydride-8-butyl-7,9-dicarbaundecaborate, tri(n-butyl)ammoniumundecahydride-8-allyl-7,9-dicarbaundecaborate, tri(n-butyl) ammoniumundecahydride-9-trimethylsilyl-7,8-dicarbaundecaborate, and tri(n-butyl) ammoniumundecahydride-4,6-dibromo-7-carbaundecaborate.

As carbolan compounds and salts of carbolan, employable are 4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane, and undecahydride-1,3-dimethyl-1,3-dicarbanonaborane.

Furthermore, metal carborane salts and metal borane anions, such as those listed below may given as examples of ionic compounds containing a boron atom (In the ionic compounds enumerated below, the counter ion is tri(n-butyl) ammonium, but the counter ion is no way limited thereto).

Employable are tri(n-butyl)ammoniumbis(nonahydride-1,3-dicarbanonaborate)cobaltate(III), tri(n-butyl) ammoniumbis(undecahydride-7,8-dicarbaundecaborate) ferrate(III), tri(n-butyl)ammoniumbis(undecahydride-7,8-dicarbaundecaborate)cobaltate(III), tri(n-butyl) ammoniumbis(undecahydride-7,8-dicarbaundecaborate) nickelate(III), tri(n-butyl)ammoniumbis(undecahydride-7, 8-di-carbaundecaborate)cuprate(III), tri(n-butyl) ammoniumbis(undecahydride-7,8-dicarbaundecaborate) aurate(III), tri(n-butyl)ammoniumbis(nonahydride-7,8-dimethyl-7,8-dicarbaundecaborate)ferrate(III), tri(n-butyl) ammoniumbis(nonahydride-7,8-dimethyl-7,8-dicarbaundecaborate)chromate(III), tri(n-butyl) ammoniumbis(tribromooctahydride-7,8-dicarbaundecaborate)cobaltate(III), tri(n-butyl) ammoniumbis(dodecahydridedicarbadodecaborate) cobaltate(III), bis(tri(n-butyl)ammonium)bis (dodecahydridedodecaborate)nickelate(tris(tri(n-butyl) ammonium)bis(undecahydride-7-carbaundecaborate) chromate(III), bis(tri(n-butyl)ammonium)bis (undecahydride-7-carbaundecaborate)manganate(IV), bis (tri(n-butyl)ammonium)bis(undecahydride-7-carbaundecaborate)cobaltate(III) and bis(tri(n-butyl) ammonium)bis(undecahydride-7-carbaundecaborate) nickelate(IV).

The following compounds may be given as further examples of ionic compounds containing a boron atom.

Employable are Triphenylcarbeniumtetrakis((2,3,5,6-tetrafluoro-4-triisopropylsilyl)phenyl)borate, N,N-dimethylaniliniumtetrakis((2,3,5,6-tetrafluoro-4-triisopropylsilyl)phenyl)borate, Triphenylcarbeniumtetrakis ((2,3,5,6-tetrafluoro-4-dimethyl-t-butylsilyl)phenyl)borate, N,N-dimethylaniliniumtetrakis((2,3,5,6-tetrafluoro-4-dimethyl-t-butylsilyl)phenyl)borate, Triphenylcarbeniumbis (octafluorobiphenylene)borate, N,N-dimethylaniliniumbis (octafluorobiphenylene)borate, Triphenylcarbeniumbis (octafluoro-1,1'-spiro)biboronole, and N,N-dimethylaniliniumbis(octafluoro-1,1'-spiro)biboronole.

Two or more of the abovementioned ionizing ionic compounds may be used upon mixing.

(B-3) Organoaluminum Compounds

The organoaluminum compound (B-3) used in this invention may for example be represented by the following general formula (VII).

$$R^a_n AlX_{3-n} \quad (VII)$$

(In the above formula, $R^a$ indicates a hydrocarbon group of 1 to 12 carbon atoms, X indicates a halogen atom or hydrogen atom, and n is 1 to 3.)

In the above formula (VII), $R^a$ is a hydrocarbon group of 1 to 12 carbon atoms, such as an alkyl group, cycloalkyl group or aryl group, and specific examples include the methyl group, ethyl group, n-propyl group, isopropyl group, isobutyl group, pentyl group, hexyl group, octyl group, cyclopentyl group, cyclohexyl group, phenyl group, tolyl group, etc.

The following compounds may be given as specific examples of such an organoaluminum compound; trialkylaluminiums, such as trimethylaluminium, triethylaluminium, triisopropylaluminium, triisobutylaluminium, trioctylaluminium and tri 2-ethylhexylaluminium; alkenylaluminium, such as isoprenylaluminium; dialkylaluminiumhalides, such as dimethylaluminiumchloride, diethylaluminiumchloride, diisopropylaluminiumchloride, diisobutylaluminiumchloride and dimethylaluminiumbromide; alkylalumihiumsesquihalides, such as methylaluminiumsesquichloride, ethylaluminiumsesquichloride, isopropylaluminiumsesquichloride, butylaluminiumsesquichloride and ethylaluminiumsesquibromide; alkylaluminumdihalides, such as methylaluminiumdichloride, ethylaluminiumdichloride, isopropylaluminiumdichloride and ethylaluminiumdibromide; and alkylaluminiumhydrides, such as diethylaluminiumhydride and diisobutylaluminiumhydride.

Also, a compound represented by the following general formula (VIII) may be used as organoaluminum compound (C).

$$R^a_n AlY_{3-n} \quad (VIII)$$

(In the above formula, $R^a$ is the same as the above, Y indicates an $-OR^b$ group, $-OSiR^c_3$ group, $-OAlR^d_2$ group, $-NR^e_2$, $-SiR^f_3$ group or $-N(R^g)AlR^h_2$ group, n is 1 to 2, each of $R^b$, $R^c$, $R^d$, and $R^h$ indicates a methyl group, ethyl group, isopropyl group, isobutyl group, cyclohexyl group or phenyl group, etc., $R^e$ indicates a hydrogen, methyl group, ethyl group, isopropyl group, phenyl group or trimethylsilyl group, etc., and each of $R^f$ and $R^g$ indicates a methyl group or ethyl group, etc.)

Specific examples of such an organoaluminum compound include the followings.
(i) Compounds represented by the formula,
$R^a_n Al(OR^b)_{3-n}$, for example, dimethylaluminum methoxide, diethylaluminum ethoxide, diisobutylaluminum methoxide, etc.
(ii) Compounds represented by the formula
$R^a_n Al(OSiR^c_3)_{3-n}$, for example, $(C_2H_5)_2Al(OSi(CH_3)_3)$, $(iso-C_4H_9)_2Al(OSi(CH_3)_3)$, $(iso-C_4H_9)_2Al(OSi(C_2H_5)_3)$, etc.

(iii) Compounds represented by the formula
$R^a_n Al(OAlR^d_2)_{3-n}$, for example, $(C_2H_5)_2Al(OAl(C_2H_5)_2)$, $(iso-C_4H_9)_2Al(OAl(iso-C_4H_9)_2)$, etc.
(iv) Compounds represented by the formula
$R^a_n Al(NR^e_2)_{3-n}$, for example, $(CH_3)_2Al(N(C_2R_5)_2)$, $(C_2H_5)_2Al(NH(CH_3))$, $(CH_3)_2Al(NH(C_2H_5))$, $(C_2H_5)_2Al[N(Si(CH_3)_3)_2]$, $(iso-C_4H_9)_2Al[(NSi(CH_3)_3)_2]$, etc.
(v) Compounds represented by the formula
$R^a_n Al(SiR^f_3)_{3-n}$, for example, $(iso-C_4H_9)_2Al(Si(CH_3)_3)$, etc.

Of the above, organoaluminum compounds represented by the formulae, $R^a_3Al$, $R^a_n Al(OR^b)_{3-n}$ and $R^a_n Al(OAlR^d_2)_{3-n}$, can be given as preferable examples to be used in this invention. A compound, with which $R^a$ is an iso-alkyl group and n=2, is especially preferable. Two or more such organoaluminum compounds may be used in combination.

The olefin polymerization catalyst used in the present invention is formed from the abovementioned transition metal compound (A) and at least one compound (B) selected from among organoaluminum oxycompounds (B-1), ionizing ionic compounds (B-2), and organoaluminum compounds (B-3), and for example in the case where the transition metal compound (A) is a transition metal compound containing a ligand having a cyclopentadienyl skeleton, the olefin polymerization catalyst is formed from this compound and an organoaluminum oxycompound (B-1) and/or an ionizing ionic compound (B-2), and, optionally, an organoaluminum compound (B-3). The olefin polymerization catalyst used in the present invention includes solid catalysts, in which the transition metal compound (A) and at least one components among organoaluminum oxycompound (B-1), ionizing ionic compound (B-2) and organoaluminum compound (B-3) is supported on a particulate carrier, and prepolymerization catalysts comprising a particulate carrier, transition metal compound (A), organoaluminum oxycompound (B-1) (or ionizing ionic compound (B-2)), an olefin polymer produced by prepolymerization, and, optionally, organoaluminum compound (B-3).

The particulate carrier to be used in the solid catalyst and prepolymerization catalyst is an inorganic or organic compound having a particle diameter of 10 to 300 μm, and preferably a granular or microparticulate solid having a particle diameter of 20 to 200 μm.

Of the above, a porous oxide is preferable as an inorganic carrier, and specific examples include, $SiO_2$, $A_2O_3$, $MgO$, $ZrO_2$, $TiO_2$, $B_2O_3$, $CaO$, $ZnO$, $BaO$, $ThO_2$, etc., and mixtures thereof, such as $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, etc. Among these, an inorganic carrier, having at least one component selected from among the group consisting of $SiO_2$ and $Al_2O_3$ as the main component, is preferable.

An abovementioned inorganic oxide may contain a small amount of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

Though the properties of such a particulate carrier will differ according to the type of carrier and method of preparation, it is desirable for the carrier to have a specific surface area of 50 to 1000 m²/g and preferably 100 to 700 m²/g and a pore volume of 0.3 to 2.5 cm³/g. If necessary, this particulate carrier is used upon calcining at a temperature of 100 to 1000° C. and preferably 150 to 700° C.

Granular or microparticulate solids of an organic compound having a particle size of 10 to 300 μm may also be used as the particulate carrier. Examples of such an organic compound include (co)polymers produced from an α-olefin of 2 to 14 carbon atoms, such as ethylene, propylene, 1-butene, 4-methyl-1-pentene, etc., as the main component and copolymers and polymers produced from vinylcyclohexane or styrene as the main component.

(C) Organosilicon Compound

The organosilicon compound to be used in this invention is represented by the following general formula (I).

$$R^1R^2R^3SiH \qquad (I)$$

In the above formula, $R^1$, $R^2$ and $R^3$ may be the same or may differ from each other, with each indicating a hydrogen atom; an alkyl group of 1 to 4 carbon atoms, such as the methyl, ethyl, propyl, isopropyl, butyl, isobutyl or tert-butyl; an aryl group of 6 to 12 carbon atoms, such as the phenyl or tolyl; an alkylaryl group of 7 to 20 carbon atoms, such as the ethylphenyl or ethyltolyl; an arylalkyl group of 7 to 20 carbon atoms, such as the phenylethyl or benzyl; an alkoxy group of 1 to 4 carbon atoms, such as the methoxy, ethoxy, propoxy or butoxy; a fluorinated alkyl group of 3 to 6 carbon atoms, such as the 3,3,3-trifluoropropyl; a dialkylamino group containing alkyl groups of 1 to 4 carbon atoms, such as the dimethylamino group; or a diorganopolysiloxane chain containing 1 to 10 siloxane units and is represented by the formula, $R^6{}_3SiO(SiR^6{}_2O)_n$— (where $R^6$ indicates the methyl, phenyl, 3,3,3-trifluoropropyl, methoxy or ethoxy group and n indicates an integer from 0 to 9).

Of the above, the hydrogen atom, methyl group, ethyl group, isopropyl group, isobutyl group, 3,3,3-trifluoropropyl group, dimethylamino group or group represented by $R^6{}_3SiO(SiR^6{}_2O)_n$— is preferable.

Preferable examples of organosilicon compounds represented by the general formula (I) given above include phenylsilane, diphenylsilane, phenylmethylsilane, pentamethyldisiloxane, methylsilane, dimethylsilane, etc.

The organosilicon compound may be used alone or in combination of two or more.

(D) Dialkylzinc Compound

The dialkylzinc compound used in this invention is represented by the following general formula (II).

$$ZnR^4R^5 \qquad (II)$$

In the above formula, $R^4$ and $R^5$ may be the same or may differ from each other, with each indicating an alkyl group of 1 to 20 carbon atoms. Specific examples include the methyl, ethyl, propyl, isopropyl, butyl, isobutyl, tert-butyl, hexyl, octyl, nonyl, decyl, dodecyl and icosyl groups.

Among the above, an alkyl group of 1 to 12 carbon atoms is preferable and an alkyl group of 1 to 6 carbon atoms is even more preferable.

Preferable examples of dialkylzinc compounds represented by the above general formula (II) include diethylzinc, diisobutylzinc, di-n-decylzinc, etc., and diethylzinc is especially preferable.

The dialkylzinc compound (D) may be used alone or in combination of two or more.

The above-described organosilicon compound (C) and dialkylzinc compound (D) are used as chain transfer agents together with hydrogen. When organosilicon compound (C) is used as the chain transfer agent, an olefin polymer having a silyl group at the terminal is obtained.

In the present invention, an olefin is polymerized or olefins are copolymerized under the presence of a catalyst comprising transition metal compound (A) and at least one compound (B) selected from among organoaluminum oxycompounds (B-1), ionizing ionic compounds (B-2) and organoaluminum compounds (B-3), and under the coexistence of (C) an organosilicon compound or (D) dialkylzinc compound and (E) hydrogen.

The process of preparation of the olefin polymerization catalyst used in the present invention is illustrated in FIG. 1.

In (co)polymerizing olefin, the above-described transition metal compound (A) is used at an amount of approximately 0.00005 to 0.1 millimoles and preferably approximately 0.0001 to 0.05 millimoles, in terms of the transition metal atom, based on 1 liter of polymerization volume.

The organoaluminum oxycompound (B-1) is normally used in such an amount that the amount of aluminum atoms per 1 mole of transition metal atom is approximately 1 to 10,000 moles and preferably 10 to 5,000 moles.

The ionizing ionic compound (B-2) is normally used in such an amount that the amount of boron atoms per 1 mole of transition metal atoms is approximately 0.5 to 500 moles and preferably 1 to 100 moles.

The organoaluminum compound (B-3) is normally used in such an amount that the amount of aluminum atoms per 1 mole of transition metal atoms is approximately 10 to 500 moles and preferably 20 to 200 moles.

When the organoaluminum oxycompound (B-1) and organoaluminum compound (B-3) are to be used in combination, the organoaluminum compound (B-3) is optionally used in such an amount that amount of the organoaluminum compound (B-3) be approximately 0 to 200 moles and preferably approximately 0 to 100 moles per 1 mole of aluminum atoms in the organoaluminum oxycompound (B-1). When the ionizing ionic compound (B-2) and organoaluminum compound (B-3) are to be used in combination, the organoaluminum compound (B-3) is normally used in such an amount that the amount of the organoaluminum compound (B-3) be approximately 0 to 1000 moles and preferably approximately 0 to 500 moles per 1 mole of boron atoms in the ionizing ionic compound (B-2).

The organosilicon compound (C) is used in an amount of 1 to 10000 moles and preferably 10 to 5000 moles per 1 mole of transition metal atoms.

The dialkylzinc compound (D) is used in an amount of 1 to 10000 moles and preferably 10 to 5000 moles per 1 mole of transition metal atoms.

Hydrogen (E) is used in an amount of $10^{-5}$ to 1 mole and preferably $10^{-4}$ to $10^{-1}$ moles per 1 mole of the olefin monomer subject to polymerization.

The (co)polymerization of olefin may be carried out by a liquid phase polymerization method, such as the suspension polymerization method, solution polymerization method, etc., a gas phase polymerization method, or a high pressure method.

In the case of a liquid phase polymerization method, an inert hydrocarbon medium, for example, an aliphatic hydrocarbon, such as propane, butane, pentane, hexane, heptane, octane, decane, dodecane, kerosene, etc.; an alicyclic hydrocarbon, such as cyclopentane, cyclohexane, methylcyclopentane, etc.; an aromatic hydrocarbon, such as benzene, toluene, xylene, etc.; or a halogenated hydrocarbon, such as ethylene chloride, chlorobenzene, dichloromethane, etc., may be used. Also, the olefin itself may be used as the solvent. These may also be used in combination.

The polymerization temperature for the (co)polymerization of olefin is normally set in the range, −50 to 100° C., and preferably 0 to 90° C. if a suspension polymerization method is to be carried out, is normally set in the range, 0 to 300° C., and preferably 20 to 250° C. if a solution polymerization method is to be carried out, is normally set in the range, 0 to 120° C., and preferably 20 to 100° C. if a gas phase polymerization method is to be carried out, and is normally set in the range, 50 to 1000° C., and preferably 100 to 500° C. if a high pressure method is to be carried out. The polymerization pressure is normally set in the range, atmospheric pressure to 100 kg/cm$^2$, and preferably atmospheric pressure to 50 kg/cm$^2$, and in the case of a high pressure method, the pressure is normally set in the range, 100 to 10000 kg/cm$^2$ and preferably 500 to 5000 kg/cm$^2$. The polymerization reaction may be carried out in any of the batch, semi-continuous and continuous methods. Furthermore, the polymerization may also be carried out in two or more steps that differ in reaction conditions.

The molecular weight of the olefin polymer that is obtained may be adjusted by adjusting the quantities of hydrogen and organosilicon compound or dialkylzinc compound or by varying the polymerization temperature and polymerization pressure.

Examples of olefins used in the present invention include chain or branched a-olefins with 2 to 20 carbon atoms, such as ethylene, propylene, 1-butene, 1-pentene, 1-hexene, 4-methyl-1-pentene, 3-methyl-1-heptene, 1-heptene, 1-octene, 1-nonene, 1-decene, 1-undecene, 1-dodecene, 1-tetradecene, 1-hexadecene, 1-octadecene.

Examples also include olefins having an aliphatic ring or aromatic ring, such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene, vinylcyclohexane, etc.

Also, various polyenes, including chain or cyclic dienes, such as butadiene, isoprene, 1,4-hexadiene, dicyclopentadiene, 5-ethylidene-2-norbornene, 7-methyl-1,6-octadiene, etc., chain or cyclic trienes, such as 6,10-dimethyl-1,5,9-undecatriene, 5,9-dimethyl-1,4,8-decatriene, etc., and chain or cyclic tetraenes, such as 6,10,14-trimethyl-1,5,9,13-pentadecatetraene, 5,9,13-trimethyl-1,4,8,12-tetradecatetraene, etc., may be copolymerized with the olefin.

Since this invention uses a combination of a specific organosilicon compound (C) or dialkylzinc compound (D) with hydrogen (E) as the chain transfer agents, an olefin (co)polymer of low molecular weight can be obtained at high polymerization activity. Also, since the concentration of hydrogen in the polymerization system can be lowered, rapid hydrogenation of functional groups will not occur.

Also in the case where the organosilicon compound (C) is used, a silyl-terminated olefin polymer having a silyl group ($R^1R^2R^3Si$—; where $R^1$, $R^2$ and $R^3$ are defined to be the same as the $R^1$, $R^2$ and $R^3$ in the general formula (I) given above) at the terminal can be obtained. Silyl-terminated olefin polymers are useful, for example, as compatibilizing agents for polymer blends, coating property improving agents for paints, agents for improving the coating properties and adhesion properties of polyolefins, and raw materials for molecular design.

An olefin polymer obtained by the above-described process has a melt index (MI) in the range of normally 0.1 to 100 g/10 minutes and favorably 0.5 to 500 g/10 minutes and a density in the range of normally 0.840 to 0.970 g/cm$^3$ and favorably 0.850 to 0.930 g/cm$^3$. If this olefin polymer is a copolymer of two or more of olefins, it contains repeating units derived from one olefin among the two or more olefins at an amount of normally 50 to 99 mole %, favorably 60 to 90 mole %, and more favorably 65 to 85 mole %.

When an olefin having 3 or more carbon atoms is polymerized by the above-described process, the resulting olefin polymer has an isotactic index of favorably 95 or more.

The isotactic index is measured by $^{13}$C-NMR.

Furthermore, when a transition metal compound containing a ligand having a cyclopentadienyl skeleton is used as transition metal compound (A), the resulting olefin polymer has the characteristics of being narrow in molecular weight distribution and composition distribution.

Another process for producing an olefin polymer according to the present invention shall now be. described.

In the another process for producing the olefin polymer according to the present invention, polymerization of an olefin or copolymerization of olefins is carried out under presence of a catalyst comprising:

(A-i) a transition metal compound of a transition metal selected from among groups 3 to 10 of the periodic table (with lanthanides and actinides being included in group 3) containing a ligand having a cyclopentadienyl skeleton (with the exception of such a compound having two indenyl groups that are bonded via ethylene), and (B) at least one compound selected from among
(B-1) organoaluminum oxycompounds,
(B-2) compounds that react with the abovementioned compound (A-i) to form an ion pair, and
(B-3) organoaluminum compounds and under the coexistence of (C) an organosilicon compound represented by the general formula (I) given above, or (D) a dialkylzinc compound represented by the general formula (II) given above, and under the non-presence of hydrogen.

The respective components used in this invention shall now be described.

The compound (A-i) used in this invention is a transition metal compound of a transition metal selected from among groups 3 to 10 of the periodic table (with lanthanides and actinides being included in group 3) containing a ligand having a cyclopentadienyl skeleton (with the exception of such a compound having two indenyl groups that are bonded via ethylene).

Specific examples of transition metal compound (A-i) include the above-described transition metal compounds (A-1) with the exception of those having two indenyl groups that are bonded via ethylene.

As transition metal compound (A-i), a transition metal compound (A-ii) of a transition metal selected from among group 4 of the periodic table containing a ligand having a cyclopentadienyl skeleton (with the exception of such a compound having two indenyl groups that are bonded via ethylene), is preferable, and a compound (A-iii), expressed by the general formula (IV) given above (with the exception of such a compound having two indenyl groups that are bonded via ethylene), is more preferable.

Specific examples of transition metal compounds (A-ii) include the above-described transition metal compounds (A-2) with the exception of those having two indenyl groups that are bonded via ethylene.

Specific examples of transition metal compounds (A-iii) include the above-described transition metal compounds (A-3) with the exception of those having two indenyl groups that are bonded via ethylene.

Also, transition metal compounds represented by the general formulae (i), (iii) or (iv) are preferable as transition metal compound (A-iii).

The same organoaluminum oxycompounds mentioned above may be given as examples of the organoaluminum oxycompound (B-1) to be used in this invention, the compound may be used alone or in combination of two or more.

The same compounds that react with the above-described transition metal compound (A) to form an ion pair can be given as examples of compound (B-2) that reacts with the above-described transition metal compound (A-i) to form an ion pair, and the compound may be used alone or in combination of two or more.

The same organoaluminum compounds mentioned above may be given as examples of organoaluminum compound (B-3), and the compound may be used alone or in combination of two or more.

The olefin polymerization catalyst used in the present invention is formed from the abovementioned transition metal compound (A-i) and at least one compound (B) selected from among organoaluminum oxycompounds (B-1), ionizing ionic compounds (B-2), and organoaluminum compounds (B-3). The olefin polymerization catalyst used in the present invention also includes solid catalysts, in which the transition metal compound (A-i) and at least one of the components among organoaluminum oxycompound (B-1), ionizing ionic compound (B-2) and organoaluminum compound (B-3) are supported on a particulate carrier, and prepolymerization catalysts comprising a particulate carrier, transition metal compound (A), organoaluminum oxycompound (B-1) (or ionizing ionic compound (B-2)), an olefin polymer produced by prepolymerization, and, optionally, organoaluminum compound (B-3).

The same particulate carriers as mentioned above may be given as examples of the particulate carrier to be used in the solid catalyst or prepolymerization catalyst.

The same organosilicon compounds mentioned above may be given as examples of organosilicon compound (C), and the compound may be used alone or in combination of two or more.

The same dialkylzinc compounds mentioned above may be given as examples of dialkylzinc compound (D), and the compound may be used alone or in combination of two or more.

The abovementioned organosilicon compound (C) and dialkylzinc compound (D) are used as chain transfer agents. Also, when organosilicon compound (C) is used as the chain transfer agent, an olefin polymer having a silyl group at the terminal is obtained.

In the present invention, an olefin is polymerized or olefins are copolymerized under the presence of a catalyst comprising transition metal compound (A-i) and at least one type of compound (B) selected from among organoaluminum oxycompounds (B-1), ionizing ionic compounds (B-2) and organoaluminum compounds (B-3), and under the coexistence of (C) an organosilicon compound or (D) dialkylzinc compound and (E) under the non-presence of hydrogen.

The process of preparation of the olefin polymerization catalyst used in this invention is illustrated in FIG. 2.

The same chain or branched olefins and olefins having aliphatic ring or aromatic ring used in the formerly described olefin production method may be given as examples of olefins used in this invention.

Also, the same polyenes as the polyenes used in the formerly described process for producing olefin polymer may be copolymerized with the abovementioned olefin.

In (co)polymerizing olefin, the above-described transition metal compound (A-i) is used at an amount of approximately 0.00005 to 0.1 millimoles and preferably approximately 0.0001 to 0.05 millimoles, in terms of the transition metal atom, based on 1 liter of polymerization volume.

The organoaluminum oxycompound (B-1) is normally used in such an amount that the amount of aluminum atoms per 1 mole of transition metal atom is approximately 1 to 10,000 moles and preferably 10 to 5,000 moles.

The ionizing ionic compound (B-2) is normally used in such an amount that the amount of boron atoms per 1 mole of transition metal atoms is approximately 0.5 to 500 moles and preferably 1 to 100 moles.

The organoaluminum compound (B-3) is normally used in such an amount that the amount of aluminum atoms per 1 mole of transition metal atoms is approximately 10 to 500 moles and preferably 20 to 200 moles.

When the organoaluminum oxycompound (B-1) and organoaluminum compound (B-3) are to be used in combination, the organoaluminum compound (B-3) is optionally used in such an amount that amount of the organoaluminum compound (B-3) be approximately 0 to 200 moles and preferably approximately 0 to 100 moles per 1 mole of aluminum atoms in the organoaluminum oxycompound (B-1). When the ionizing ionic compound (B-2) and organoaluminum compound (B-3) are to be used in combination, the organoaluminum compound (B-3) is normally used in such an amount that the amount of the organoaluminum compound (B-3) be approximately 0 to 1000 moles and preferably approximately 0 to 500 moles per 1 mole of boron atoms in the ionizing ionic compound (B-2).

The organosilicon compound (C) is used in an amount of 1 to 10000 moles and preferably 10 to 5000 moles per 1 mole of transition metal atoms.

The dialkylzinc compound (D) is used in an amount of 1 to 10000 moles and preferably 10 to 5000 moles per 1 mole of transition metal atoms.

The (co)polymerization of olefin may be carried out by a liquid phase polymerization method, such as the suspension polymerization method, solution polymerization method, etc., a gas phase polymerization method, or a high pressure method.

In the case of a liquid phase polymerization method, the same inert hydrocarbon medium as that used in the formerly described olefin polymer production method may be used. Also, the olefin itself may be used as the solvent. These may also be used in combination.

The polymerization temperature for the (co)polymerization of olefin is normally set in the range, −50 to 100° C., and preferably 0 to 90° C. if a suspension polymerization method is to be carried out, is normally set in the range, 0 to 250° C., and preferably 20 to 200° C. if a solution polymerization method is to be carried out, is normally set in the range, 0 to 120° C., and preferably 20 to 100° C. if a gas phase polymerization method is to be carried out, and is normally set in the range, 50 to 1000° C., and preferably 100 to 500° C. if a high pressure method is to be carried out. The polymerization pressure is normally set in the range, atmospheric pressure to 100 kg/cm$^2$, and preferably atmospheric pressure to 50 kg/cm$^2$, and in the case of a high pressure method, the pressure is normally set in the range, 100 to 10000 kg/cm², and preferably 500 to 5000 kg/cm². The polymerization reaction may be carried out in any of the batch, semi-continuous and continuous methods. Furthermore, the polymerization may also be carried out in two or more steps that differ in reaction conditions.

The molecular weight of the olefin polymer that is obtained may be adjusted by adjusting the quantity of organosilicon compound (C) or dialkylzinc compound (D) or by varying the polymerization temperature and polymerization pressure.

Since this invention uses a specific organosilicon compound (C) or dialkylzinc compound (D) as the chain transfer agent, an olefin (co)polymer of low molecular weight can be obtained at high polymerization activity. Also, since hydrogen does not exist in the polymerization system, rapid hydrogenation of functional groups, etc., will not occur.

Also in the case where the organosilicon compound (C) is used, a silyl-terminated olefin polymer having a silyl group ($R^1R^2R^3Si$—; where $R^1$, $R^2$ and $R^3$ are defined to be the same as the $R^1$, $R^2$ and $R^3$ in the general formula (I) given above) at the terminal can be obtained. Silyl-terminated olefin polymers are useful, for example, as compatibilizing agents for polymer blends, coating property improving agents for paints, agents for improving the coating properties and adhesion properties of polyolefins, and raw materials for molecular design.

An olefin polymer obtained by the above-described process has a melt index (MI) in the range of normally 0.1 to 100 g/10 minutes and favorably 0.5 to 500 g/10 minutes and a density in the range of normally 0.840 to 0.970 g/cm³ and favorably 0.850 to 0.930 g/cm³. If this olefin polymer is a copolymer of two or more olefins, it contains repeating units derived from one olefin among the two or more olefins at an amount of normally 50 to 99 mole %, favorably 60 to 90 mole %, and more favorably 65 to 85 mole %.

When an olefin having 3 or more carbon atoms is polymerized by the above-described process, the resulting olefin polymer has an isotactic index of favorably 95 or more.

Furthermore, when a transition metal compound containing a ligand having a cyclopentadienyl skeleton is used as transition metal compound (A-i), the resulting olefin polymer has the characteristics of being narrow in molecular weight distribution and composition distribution.

Effects of the Invention

In accordance with the process for producing olefin polymer of the present invention, an olefin polymer of low molecular weight can be obtained at high polymerization activity.

In accordance with the another process for producing the olefin polymer of the present by another mode of this invention, an olefin polymer can be obtained at high polymerization activity.

EXAMPLES

Though the present invention shall now be described in further detail by way of examples, this invention is not limited to these examples.

Example 1

A 1.0-liter glass reaction device equipped with a condenser tube and a stirring device, was throughly purged with nitrogen, charged with 400 ml of decane at room temperature, and the temperature of the liquid was then raised to 80° C. using an oil bath. 0.4 millimoles of triisobutylaluminum and 0.05 millimoles of diethylzinc were then charged into the reaction device. A, catalyst was prepared by priorly stirring and contacting for 10 minutes together 0.5 millimoles of methylalumoxane (10 weight % toluene solution; made by Tosoh Aczo Co., Ltd.) and 0.0005 millimoles of dimethylsilylene(2-methyl-4,5-benzo-1-indenyl)(2,7-di-t-butyl-9-fluorenyl)zirconium dichloride (shall be referred to hereinafter as "compound A") at a molar ratio of 1000, in toluene, and this catalyst was added to the reaction system. Ethylene and hydrogen were then fed continuously at rates of 100N-liter/hr and 1N-liter/hr, respectively, to carry out polymerization at 80° C. for 30 minutes. After the completion of polymerization, 5 ml of isobutyl alcohol were added to stop the polymerization. The reaction solution was transferred into 2 liters of methanol to precipitate the polymer. The precipitated polymer was vacuum dried at 130° C. for 12 hours. As a result, an ethylene polymer having an MI (melt index) of 0.45 g/10 minutes was obtained. The yield of the ethylene polymer was 11.8 g and the polymerization activity was 47.2 kg/millimole Zr.hr.

Example 2

Ethylene was polymerized in the same manner as in Example 1, except that hydrogen was fed at a rate of 2N-liter/hr. As a result, an ethylene polymer having an MI of 3.6 g/10 minutes was obtained. The yield of the ethylene polymer was 7.8 g and the polymerization activity was 31.2 kg/millimole Zr.hr.

Example 3

Ethylene was polymerized in the same manner as in Example 1, except that diethylzinc was added in an amount of 0.5 millimoles. As a result, an ethylene polymer having an MI of 96 g/10 minutes was obtained. The yield of the ethylene polymer was 4.5 g and the polymerization activity was 18 kg/millimole Zr.hr.

Example 4

The same method as that of Example 1 was carried out to copolymerize ethylene and 1-octene except that 10 ml of 1-octene was charged into the reaction device. As a result, an ethylene.1-octene copolymer having an MI of 1.48 g/10 minutes and a density of 0.882 g/cm³ was obtained. The yield of the ethylene.1-octene copolymer was 8.2 g and the polymerization activity was 32.8 kg/millimole Zr.hr.

Comparative Example 1

Ethylene was polymerized in the same manner as in Example 1, except that no diethylzinc was added to the reaction device and hydrogen was fed at a rate of 5N-liter/hr. As a result, an ethylene polymer having an MI of 0.65 g/10 minutes was obtained. The yield of the ethylene polymer was 0.8 g and the polymerization activity was 3.2 kg/millimole Zr.hr.

Comparative Example 2

Ethylene and 1-octene were copolymerized in the same manner as in Example 4, except that no diethylzinc was added to the reaction device and hydrogen was fed at a rate of 5N-liter/hr. As a result, an ethylene.1-octene copolymer having a density of 0.885 g/cm³ and an MI of 1.20 g/10 minutes was obtained. The yield of the ethylene.1-octene copolymer was 0.5 g and the polymerization activity was 2 kg/millimole Zr.hr.

The results of the above are shown in Table 1.

TABLE 1

Effects of Diethylzinc (Et$_2$Zn)

|  |  | Example 1 | Example 2 | Example 3 | Example 4 | Comparative Example 1 | Comparative Example 2 |
|---|---|---|---|---|---|---|---|
| <Polymerization conditions> | | | | | | | |
| Solvent decane | (ml) | 400 | 400 | 400 | 400 | 400 | 400 |
| 1-octene | (ml) | 0 | 0 | 0 | 10 | 0 | 10 |
| Ethylene | (N-1/hr) | 100 | 100 | 100 | 100 | 100 | 100 |
| Hydrogen | (N-1/hr) | 1 | 2 | 1 | 1 | 5 | 5 |
| Et$_2$Zn/Zr | (mole ratio) | 100 | 100 | 1000 | 100 | — | — |
| <Polymerization results> | | | | | | | |
| Yield | (g) | 11.8 | 7.8 | 4.5 | 8.2 | 0.8 | 0.5 |
| Polymerization activity | (kg/millimole Zr · hr) | 47.2 | 31.2 | 18 | 32.8 | 3.2 | 2 |
| MI | (g/10 min) | 0.45 | 3.6 | 96 | 1.48 | 0.65 | 1.2 |
| Density | (g/cm$^3$) | — | — | — | 0.882 | — | 0.885 |

Compound A Dimethylsilylene(2-methyl-4,5-benzo-1-indenyl) (2,7-di-t-butyl-9-fluorenyl)zirconium dichloride
Compound A 0.0005 millimoles;
Cocatalyst Methylalumoxane (MAO);
MAO/Zr = 1000 (mole ratio)
Triisobutylaluminum 0.4 millimoles
Polymerization temperature 80° C.;
Polymerization time 30 minutes

Example 5

Ethylene was polymerized in the same manner as in Example 1, except that 0.05 millimoles of triethylsilane was used in place of diethylzinc. As a result, a silyl-terminated ethylene polymer having an MI of 0.25 g/10 minutes was obtained. The yield of the silyl-terminated ethylene polymer was 14.1 g and the polymerization activity was 56.4 kg/millimole Zr.hr.

Example 6

Ethylene was polymerized in the same manner as in Example 1, except that 0.5 millimoles of triethylsilane was used in place of diethylzinc. As a result, a silyl-terminated ethylene polymer having an MI of 78 g/10 minutes was obtained. The yield of the silyl-terminated ethylene polymer was 10.5 g and the polymerization activity was 42 kg/millimole Zr.hr.

Example 7

The same method as that of Example 1 was carried out to copolymerize ethylene and 1-octene, except that 0.05 millimoles of triethylsilane was used in place of diethylzinc and 10 ml of 1-octene was charged into the reaction device. As a result, a silyl-terminated ethylene.1-octene copolymer having a density of 0.885 g/cm$^3$ and an MI of 1.52 g/10 minutes was obtained. The yield of the silyl-terminated ethylene.1-octene copolymer was 11.3 g and the polymerization activity was 45.2 kg/millimole Zr.hr.

Comparative Example 3

Ethylene was polymerized in the same manner as in Example 5, except that no triethylsilane was added and hydrogen was fed at a rate of 5N-liter/hr. As a result, an ethylene polymer having an MI of 0.28 g/10 minutes was obtained. The yield of the ethylene polymer was 1.2 g and the polymerization activity was 4.8 kg/millimole Zr.hr.

Comparative Example 4

Ethylene and 1-octene were copolymerized in the same manner as in Example 7, except that no triethylsilane was added and hydrogen was fed at a rate of 5N-liter/hr. As a result, an ethylene.1-octene copolymer having a density of 0.887 g/cm$^3$ and an MI of 1.05 g/10 minutes was obtained. The yield of the ethylene.1-octene copolymer was 0.9 g and the polymerization activity was 3.6 kg/millimole Zr.hr.

The results of the above are shown in Table 2.

TABLE 2

Effects of Triethylsilane (SiHEt$_3$)

|  |  | Example 5 | Example 6 | Example 7 | Comp. Example 3 | Comp. Example 4 |
|---|---|---|---|---|---|---|
| <Polymerization conditions> | | | | | | |
| Solvent decane | (ml) | 400 | 400 | 400 | 400 | 400 |
| 1-octene | (ml) | 0 | 0 | 10 | 0 | 10 |
| Ethylene | (N-1/hr) | 100 | 100 | 100 | 100 | 100 |
| Hydrogen | (N-1/hr) | 1 | 1 | 1 | 5 | 5 |
| SiHEt$_3$/Zr | (mole ratio) | 100 | 1000 | 100 | — | — |

TABLE 2-continued

Effects of Triethylsilane (SiHEt₃)

|  |  | Example 5 | Example 6 | Example 7 | Comp. Example 3 | Comp. Example 4 |
|---|---|---|---|---|---|---|
| <Polymerization results> | | | | | | |
| Yield | (g) | 14.1 | 10.5 | 11.3 | 1.2 | 0.9 |
| Polymerization activity | (kg/millimole Zr · hr) | 56.4 | 42 | 45.2 | 4.8 | 3.6 |
| MI | (g/10 min) | 0.25 | 78 | 1.52 | 0.28 | 1.05 |
| Density | (g/cm³) | — | — | 0.885 | — | 0.887 |

Compound A Dimethylsilylene(2-methyl-4,5-benzo-1-indenyl) (2,7-di-t-butyl-9-fluorenyl) zirconium dichloride
Compound A 0.0005 millimoles;
Cocatalyst Methylalumoxane (MAO);
MAO/Zr = 1000 (mole ratio)
Triisobutylaluminum 0.4 millimoles
Polymerization temperature 80° C.;
Polymerization time 30 minutes

Example 8

A stainless steel autoclave with a 2-liter inner volume was throughly purged with nitrogen, subsequently 800 ml of hexane and 200 ml of 1-octene were charged, and the internal temperature of the system was raised to 120° C. Subsequently, 0.5 millimoles of triisobutylaluminum, 0.1 millimoles of triethylsilane, and 0.001 millimoles, in terms of Zr metal, of the catalyst contacted with 0.3 millimoles of methylalumoxane as in Example 1, were fed into the system with pressure of nitrogen. 200 ml of hydrogen were then added in one time and the total pressure of the system was maintained at 15 kg/cm²-G by continuously feeding ethylene alone to carry out polymerization at 120° C. for 60 minutes. After stopping the polymerization by adding a small amount of ethanol into the system, the unreacted ethylene was purged. The resulting polymer solution was poured into a large excess of methanol to precipitate the polymer. The precipitated polymer was recovered by filtration and vacuum dried for 12 hours at 130° C. As a result, a silyl-terminated ethylene.1-octene copolymer having an MI of 42 g/10 minutes and a density of 0.872 g/cm³ was obtained. The yield of the silyl-terminated ethylene.1-octene copolymer was 114.5 g and the polymerization activity was 114.5 kg/millimole Zr.hr.

Comparative Example 5

Ethylene and 1-octene were copolymerized in the same manner as in Example 8, except that no triethylsililane was added. As a result, an ethylene.1-octene copolymer having an MI of 1.8 g/10 minutes and a density of 0.875 g/cm³ was obtained. The yield of the ethylene.1-octene copolymer was 87 g and the polymerization activity was 87 kg/millimole Zr.hr.

Example 9

950 ml of hexane solvent and 50 ml of 1-octene were charged into the same polymerization device used in Example 8, and the internal temperature of the system was raised to 80° C. Subsequently, 0.2 millimoles of triisobutylaluminum, 0.1 millimoles of triethylsilane, 0.00025 millimoles, in terms of Ti metal, of dimethylsilylene(tetramethylcyclopentadienyl)N-t-butylamide dimethyltitanium (shall be referred to hereinafter as "compound B"), and then 0.01 millimoles of triphenylcarbenium tetrakis(pentafluorophenyl)borate were added with pressure of nitrogen. 50 ml of hydrogen were then added in one time and the total pressure of the system was maintained at 8 kg/cm²-G by continuously feeding ethylene alone to carry out polymerization at 80° C. for 5 minutes. As a result, a silyl-terminated ethylene.1-octene copolymer having an MI of 35 g/10 minutes and a density of 0.874 g/cm³ was obtained. The yield of the silyl-terminated ethylene.1-octene copolymer was 18 g and the polymerization activity was 864 kg/millimole Ti hr.

Comparative Example 6

Ethylene and 1-octene were copolymerized in the same manner as in Example 9, except that no triethylsilane was added. As a result, an ethylene.1-octene copolymer having an MI of 2.09 g/10 minutes and a density of 0.870 g/cm³ was obtained. The yield of the ethylene.1-octene copolymer was 11.8 g and the polymerization activity was 566 kg/millimole Zr.hr.

Example 10

890 ml of hexane solvent and 110 ml of 1-octene were charged into the same polymerization device used in Example 8, and the internal temperature of the system was raised to 130° C. Subsequently, 0.5 millimoles of triisobutylaluminum, 0.1 millimoles of triethylsilane, and 0.002 millimoles, in terms of Zr metal, of dimethylsilylenebis(4,5-benzo-1-indenyl)zirconium dichloride (shall be referred to hereinafter as "compound C"), which was contacted with 0.6 millimoles of methylalumoxane as in Example 1, were fed into the system with pressure of nitrogen. 200 ml of hydrogen were then added in one time and the total pressure of the system was maintained at 11 kg/cm²-G by ethylene to carry out polymerization at 130° C. for 30 minutes. As a result, a silyl-terminated ethylene.1-octene copolymer having an MI of 85 g/10 minutes and a density of 0.879 g/cm³ was obtained. The yield of the silyl-terminated ethylene.1-octene copolymer was 140 g and the polymerization activity was 140 kg/millimole Zr.hr.

Comparative Example 7

Ethylene and 1-octene were copolymerized in the same manner as in Example 10, except that no triethylsilane was added. As a result, an ethylene.1-octene copolymer having an MI of 18 g/10 minutes and a density of 0.877 g/cm$^3$ was obtained. The yield of the ethylene.1-octene copolymer was 89 g and the polymerization activity was 89 kg/millimole Zr.hr.

Example 11

700 ml of hexane solvent and 300 ml of 1-octene were charged into the same polymerization device used in Example 8, and the internal temperature of the system was raised to 150° C. Subsequently, 0.5 millimoles of triisobutylaluminum, 0.1 millimoles of triethylsilane, and 0.002 millimoles, in terms of Zr metal, of diphenylmethylene(cyclopentadienyl)(fluorenyl)zirconium dichloride (shall be referred to hereinafter as "compound D"), which was contacted with 0.6 millimoles of methylalumoxane as in Example 1, were fed into the system with pressure of nitrogen. 500 ml of hydrogen were then added in one time and the total pressure of the system was maintained at 30 kg/cm$^2$-G by ethylene to carry out polymerization at 150° C. for 60 minutes. As a result, a silyl-terminated ethylene.1-octene copolymer having an MI of 18 g/10 minutes and a density of 0.908 g/cm$^3$ was obtained. The yield of the silyl-terminated ethylene 1-octene copolymer was 27 g and the polymerization activity was 13.5 kg/millimole Zr.hr.

Comparative Example 8

Ethylene and 1-octene were copolymerized in the same manner as in Example 11, except that no triethylsilane was added. As a result, an ethylene.1-octene copolymer having an MI of 1.4 g/10 minutes and a density of 0.906 g/cm$^3$ was obtained. The yield of the ethylene 1-octene copolymer was 7.5 g and the polymerization activity was 3.75 kg/millimole Zr.hr.

The results of the above are shown in Table 3.

TABLE 3

Effects of Triethylsilane (SiHEt$_3$) (Pressurized Polymerization)

|  |  | Example 8 | Comp. Ex. 5 | Example 9 | Comp. Ex. 6 | Example 10 | Comp. Ex. 7 | Example 11 | Comp. Ex. 8 |
|---|---|---|---|---|---|---|---|---|---|
| <Polymerization conditions> | | | | | | | | | |
| Catalyst | | Compound A | Compound A | Compound B | Compound B | Compound C | Compound C | Compound D | Compound D |
|  | (millimoles) | 0.001 | 0.001 | 0.00025 | 0.00025 | 0.002 | 0.002 | 0.002 | 0.002 |
| Cocatalyst | | MAO | MAO | B | B | MAO | MAO | MAO | MAO |
|  | (millimoles) | 0.3 | 0.3 | 0.01 | 0.01 | 0.6 | 0.6 | 0.6 | 0.6 |
| Solvent hexane | (ml) | 800 | 800 | 950 | 950 | 890 | 890 | 700 | 700 |
| 1-octene | (ml) | 200 | 200 | 50 | 50 | 110 | 110 | 300 | 300 |
| Ethylene pressure | (kg/cm$^2$G) | 15 | 15 | 8 | 8 | 11 | 11 | 30 | 30 |
| Hydrogen | (N-1/hr) | 200 | 200 | 50 | 50 | 200 | 200 | 500 | 500 |
| SiHEt$_3$/Zr(Ti) | (mole ratio) | 100 | — | 400 | — | 50 | — | 50 | — |
| Polymerization temperature | (° C.) | 120 | 120 | 80 | 80 | 130 | 130 | 150 | 150 |
| Polymerization time | (minutes) | 60 | 60 | 5 | 5 | 30 | 30 | 60 | 60 |
| <Polymerization results> | | | | | | | | | |
| Yield | (g) | 114.5 | 87 | 18 | 11.8 | 140 | 89 | 27 | 7.5 |
| Polymerization activity | (kg/millimole Zr · hr) | 114.5 | 87 | 864 | 566 | 140 | 89 | 13.5 | 3.75 |
| MI | (g/10 min) | 42 | 1.8 | 35 | 2.09 | 85 | 18 | 18 | 1.4 |
| Density | (g/cm$^3$) | 0.872 | 0.875 | 0.874 | 0.870 | 0.879 | 0.877 | 0.908 | 0.906 |

Compound A Dimethylsilylene (2-methyl-4,5-benzo-1-indenyl) (2,7-di-t-butyl-9-fluorenyl) zirconium dichloride
Compound B Dimethylsilylene (tetramethylcyclopentadienyl) N-t-butylamide dimethyltitanium
Compound C Dimethylsilylenebis (4,5-benzo-1-indenyl) zirconium dichloride
Compound D Diphenylmethylene (cyclopentadienyl) (fluorenyl) zirconium dichloride
MAO Methylalumoxane
B Triphenylcarbenium tetrakis (pentafluorophenyl) borate
Triisobutylaluminum 0.5 millimoles (0.2 millimoles in Example 9 and Comparative Example 6)

Example 12

A 0.5-liter glass reaction device equipped with a condenser tube and a stirring device, was throughly purged with nitrogen and charged with 250 ml of toluene at room temperature. The temperature of the liquid was then raised to 50° C. using an oil bath while feeding propylene at a rate of 100 ml/hr. After the addition of 0.375 millimoles of methylphenylsilane, a catalyst prepared by mixing 0.125 millimoles of triisobutylaluminum and 0.000625 millimoles of dimethylsilylene-bis(2-methyl-4-phenyl-1-indenyl) zirconium dichloride at a molar ratio of 200, was added into the system. Subsequently, 0.00125 millimoles of triphenylcarbenium tetrakis(pentafluorophenyl)borate were added and polymerization was carried out for 5 minutes at 50° C. As a result, 1.49 g of a silyl-terminated propylene polymer having an intrinsic viscosity [η] of 1.20 dl/g were obtained.

Comparative Example 9

A 0.5-liter glass reaction device equipped with a condenser tube and a stirring device, was throughly purged with nitrogen and charged with 250 ml of toluene at room temperature. The temperature of the liquid was then raised to 50° C. using an oil bath while feeding propylene at a rate of 100 ml/hr. A catalyst prepared by mixing 0.125 millimoles of triisobutylaluminum and 0.000625 millimoles of dimethylsilylene-bis(2-methyl-4-phenyl-1-indenyl) zirconium dichloride at a molar ratio of 200, was then added into the system. Subsequetly, 0.00125 millimoles of triphenylcarbenium tetrakis(pentafluorophenyl)borate was added and polymerization was carried out for 5 minutes at 50° C. As a result, 1.77 g of a propylene polymer having an intrinsic viscosity [η] of 2.82 dl/g were obtained.

Example 13

A 0.5-liter glass reaction device equipped with a condenser tube and a stirring device, was throughly purged with nitrogen and charged with 250 ml of toluene at room temperature. The temperature of the liquid was then raised to 50° C. using an oil bath while feeding propylene at a rate of 100 ml/hr. After the addition of 0.75 millimoles of methylphenylsilane, a catalyst prepared by mixing 0.125 millimoles of triisobutylaluminum and 0.000625 millimoles of dimethylsilylene-bis(2-methyl-4-phenyl-1-indenyl) zirconium dichloride at a molar ratio of 200, was added into the system. Subsequently, 0.00125 millimoles of triphenylcarbenium tetrakis(pentafluorophenyl)borate was added and polymerization was carried out for 5 minutes at 50° C. As a result, 0.92 g of a silyl-terminated propylene polymer having an intrinsic viscosity [η] of 0.62 dl/g were obtained. The stereoregularity was 98.8% (mmmm pentad fraction as measured by $^{13}$CNMR) and δ values of 7.52 (m, Ph), 7.35 (m, Ph), 4.52 (m, SiH), 1.64 (m, methyne group), 1.18 (m, methylene group), 0.86 (m, methyl group), 0.71 (methylene group), and 0.40 (MeSi) were observed by $^1$HNMR measurement ($C_2D_2Cl_2$, 120° C.).

Flexural Modulus (FM) measured in accordance with ASTM D 790 of the resulting silyl-terminated propylene polymer was 16050 (kg/cm$^2$).

Example 14

A 0.5-liter glass reaction device equipped with a condenser tube and a stirring device, was throughly purged with nitrogen and charged with 250 ml of toluene at room temperature. The temperature of the liquid was then raised to 50° C. using an oil bath while feeding propylene at a rate of 100 ml/hr. After the addition of 0.75 millimoles of methylphenylsilane, a catalyst prepared by mixing 0.125 millimoles of triisobutylaluminum and 0.000625 millimoles of dimethylsilylene-bis(2-methyl-4-phenyl-1-indenyl) zirconium dichloride at a molar ratio of 200, was added into the system. Subsequently, 0.00125 millimoles of triphenylcarbenium tetrakis(pentafluorophenyl)borate was added and polymerization was carried out for 5 minutes at 50° C. As a result, 1.27 g of a silyl-terminated propylene polymer having an intrinsic viscosity [η] of 0.21 dl/g were obtained.

The stereoregularity was 98.8% (mmmm pentad fraction as measured by $^{13}$CNMR) and δ values of 7.52 (m, Ph), 7.35 (m, Ph), 4.22 (m, SiH$_2$), 1.62 (m, methyne group), 1.28 (m, methylene group), and 0.88 (m, methyl group) were observed by $^1$HNMR measurement ($C_2D_2Cl_2$, 120° C.).

Flexural Modulus (FM) measured in accordance with ASTM D 790 of the resulting silyl-terminated propylene polymer was 16140 (kg/cm$^2$).

What is claimed is:

1. A process for producing an olefin polymer characterized in that olefin polymerization or copolymerization is carried out under the presence of:

a catalyst, comprising
  (A) a compound of a transition metal selected from among groups 3 to 10 of the periodic table with lanthanides and actinides being included in group 3 and
  (B) at least one compound selected from among
  (B-1) organoaluminum oxycompounds,
  (B-2) compounds that react with the abovementioned compound (A) to form an ion pair, and
  (B-3) organoaluminum compounds and under the coexistence of
  (C) an organosilicon compound represented by the general formula (1) given below, or (D) a dialkylzinc compound represented by the general formula (II) given below, $$R^1R^2R^3SiH \qquad (I)$$

wherein $R^1$, $R^2$ and $R^3$ may be the same or may differ from each other, with each indicating a hydrogen atom, an alkyl group of 1 to 4 carbon atoms, an aryl group of 6 to 12 carbon atoms, an alkylaryl group of 7 to 20 carbon atoms, an arylalkyl group of 7 to 20 carbon atoms, an alkoxy group of 1 to 4 carbon atoms, a phenoxy group, a fluoroalkyl group of 3 to 6 carbon atoms, a dialkylamino group containing alkyl groups of 1 to 4 carbon atoms, or a diorganopolysiloxane chain containing 1 to 10 siloxane units $$ZnR^4R^5 \qquad (II)$$

wherein $R^4$ and $R^5$ may be the same or may differ from each other, with each indicating an alkyl group of 1 to 20 carbon atoms and
  (E) hydrogen.

2. The process for producing an olefin polymer as claimed in claim 1, wherein said compound (A) is a transition metal compound (A-1) of a transition metal selected from among groups 3 to 10 of the periodic table with lanthanides and actinides being included in group 3 containing a ligand having a cyclopentadienyl skeleton.

3. The process for producing an olefin polymer as claimed in claim 1, wherein said compound (A) is a compound (A-2) of a transition metal selected from among group 4 of the periodic table containing a ligand having a cyclopentadienyl skeleton.

4. The process for producing an olefin polymer as claimed in claim 1, wherein said compound (A) is a compound (A-3) represented by the following general formula (IV) or (V):

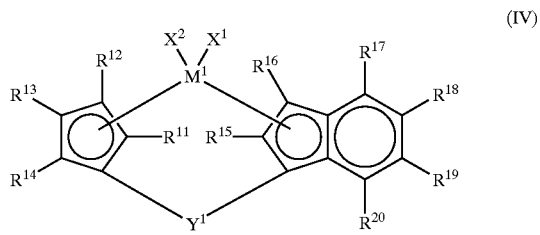

105

-continued

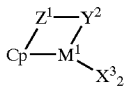
(V)

wherein in formula (IV), $M^1$ indicates an atom of a transition metal selected from among group 4 of the periodic table, $R^{11}$ to $R^{20}$ may be the same or may differ from each other, with each indicating a hydrocarbon group of 1 to 40 carbon atoms, a halogenated hydrocarbon group of 1 to 40 carbon atoms, an oxygen-containing group, a sulfur-containing group, a silicon-containing group, a halogen atom, or a hydrogen atom, the adjacent two groups among $R^{11}$ to $R^{20}$ may be bonded mutually to form an aromatic group with the carbon atoms bonded to each group, each of such an aromatic group may be substituted with hydrocarbon group of 1 to 40 carbon atoms, an oxygen-containing group, a sulfur-containing group, a silicon-containing group, or a halogen atom, $X^1$ and $X^2$ may be the same or may differ from each other, with each indicating a hydrocarbon group of 1 to 20 carbon atoms, a halogenated hydrocarbon group of 1 to 20 carbon atoms, an oxygen- containing group, a sulfur-containing group, a silicon-containing group, a hydrogen atom, or a halogen atom, and $Y^1$ indicates a bivalent hydrocarbon group of 1 to 20 carbon atoms, a bivalent silicon-containing group, a bivalent germanium-containing group, a bivalent tin-containing group, —O—, —CO—, —S—, —SO—, —SO$_2$—, —Ge—, —Sn—,

106

—NR$^{21}$—, —P(R$^{21}$)—, —P(O)(R$^{21}$)—, —BR$^{21}$—, or —AlR$^{21}$— where the R$^{21}$,s may be the same or may differ from each other, with each indicating a hydrocarbon group of 1 to 20 carbon atoms, a halogenated hydrocarbon group of 1 to 20 carbon atoms, a hydrogen atom, or a halogen atom;

in formula (V), $M^1$ indicates a transition metal atom selected from among group 4 of the periodic table, Cp indicates a cyclopentadienyl group or derivative thereof, which is π-bonded to $M^1$, $Z^1$ indicates an oxygen atom, a sulfur atom, a boron atom or a ligand containing an atom of group 14 of the periodic table, $Y^2$ is a ligand containing an atom selected from among the nitrogen atom, phosphorus atom, oxygen atom and sulfur atom, and the $X^3$'s may be the same or may differ from each other, with each indicating a hydrogen atom, a halogen atom, a hydrocarbon group of 1 to 20 carbon atoms and may have one or two or more or double bonds, a silyl group containing 20 or less silicon atoms, or a germyl group containing a germanium atom.

5. The process for producing an olefin polymer as claimed in any of one claims 1 to 4, whereby a silyl-terminated olefin polymer, with which the terminal is the residue of an organosilicon compound (C) represented by the abovementioned general formula (I) and the isotactic index is 95 or more, is produced.

\* \* \* \* \*